US012805519B2

(12) United States Patent
Dittgen et al.

(10) Patent No.: US 12,805,519 B2
(45) Date of Patent: Nov. 24, 2026

(54) HERBICIDE/SAFENER COMBINATION BASED ON SAFENERS FROM THE CLASS OF SUBSTITUTED [(1,5-DIPHENYL-1H-1,2,4-TRIAZOL-3-YL) OXY]ACETIC ACIDS AND THEIR SALTS

(71) Applicant: Bayer Aktiengesellschaft, Leverkusen (DE)

(72) Inventors: Jan Dittgen, Leverkusen (DE); Thomas Müller, Leverkusen (DE); Anna Maria Reingruber, Leverkusen (DE); Lothar Lorentz, Leverkusen (DE); Klaus Bernhard Haaf, Leverkusen (DE); Klaus Trabold, Leverkusen (DE); Hubert Menne, Leverkusen (DE); Julio Perez Catalan, Leverkusen (DE); Mathias Schmidt, Leverkusen (DE)

(73) Assignee: BAYER AKTIENGESELLSCHAFT, Leverkusen (DE)

( * ) Notice: Subject to any disclaimer, the term of this patent is extended or adjusted under 35 U.S.C. 154(b) by 338 days.

(21) Appl. No.: 18/559,961

(22) PCT Filed: May 4, 2022

(86) PCT No.: PCT/EP2022/061959

§ 371 (c)(1),
(2) Date: Nov. 9, 2023

(87) PCT Pub. No.: WO2022/238194

PCT Pub. Date: Nov. 17, 2022

(65) Prior Publication Data

US 2024/0251788 A1 Aug. 1, 2024

(30) Foreign Application Priority Data

May 10, 2021 (EP) .................................... 21172971

(51) Int. Cl.

| | |
|---|---|
| ***A01N 25/32*** | (2006.01) |
| ***A01N 37/48*** | (2006.01) |
| ***A01N 43/12*** | (2006.01) |
| ***A01N 43/16*** | (2006.01) |
| ***A01N 43/40*** | (2006.01) |
| ***A01N 43/56*** | (2006.01) |
| ***A01N 43/80*** | (2006.01) |
| ***A01N 43/82*** | (2006.01) |
| ***A01N 43/90*** | (2006.01) |

(Continued)

(52) U.S. Cl.

CPC ............. *A01N 25/32* (2013.01); *A01N 37/48* (2013.01); *A01N 43/12* (2013.01); *A01N 43/16* (2013.01); *A01N 43/40* (2013.01); *A01N 43/56* (2013.01); *A01N 43/80* (2013.01); *A01N 43/82* (2013.01); *A01N 43/90* (2013.01); *A01N 47/36* (2013.01); *A01N 57/20* (2013.01)

(58) Field of Classification Search

CPC ........ A01N 25/32; A01N 37/48; A01N 43/12; A01N 43/16; A01N 43/40; A01N 43/56; A01N 43/80; A01N 43/82; A01N 43/90; A01N 47/36; A01N 57/20

See application file for complete search history.

(56) References Cited

U.S. PATENT DOCUMENTS 5,077,413 A * 12/1991 Bohner .................. A01N 25/32
548/266.8

FOREIGN PATENT DOCUMENTS

| | | |
|---|---|---|
| EP | 0310555 A1 | 4/1989 |
| WO | 2021105101 A1 | 6/2021 |

OTHER PUBLICATIONS

Guolin Wu et al., Synthesis and structure-activity relationship studies of MI-2 analogues as MALT1 inhibitors, Bioorganic Medicinal Chemistry, 2018, pp. 3321-3344.

(Continued)

*Primary Examiner* — Sahana S Kaup
*Assistant Examiner* — Toriana N. Vigil
(74) *Attorney, Agent, or Firm* — Michael Vanengelen

(57) ABSTRACT

Herbicide/safener combinations based on safeners from the class of substituted [(1,5-diphenyl-1H-1,2,4-triazol-3-yl) oxy]acetic acids and their salts The present invention relates to combinations comprising one or more component (A) effective as safener and one or more herbicidally active compounds (component (B)), where component (A) represents one or more compounds of the general formula (I) or agrochemically acceptable salts thereof (I)

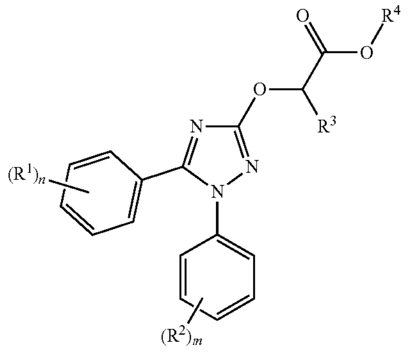

and component (B) represents one or more herbicides.

(Continued)

The application further relates to a process and the use of the herbicide/safener combinations according to the invention for control of harmful plants or for regulation of growth.

9 Claims, No Drawings

(51) Int. Cl.
*A01N 47/36* (2006.01)
*A01N 57/20* (2006.01)

(56) References Cited

OTHER PUBLICATIONS

Hatzios, “An Overview of the Mechanisms of Action of Herbicide Safeners”, Z. Naturforsch, 1991, pp. 819-827, 46c.
M. Struga et al., Synthesis of New Derivatives of 1, 2, 4-Triazol-3-one, Polish J. Chem., 2006, pp. 889-897, vol. 80.
Written Opinion from PCT Application No. PCT/EP2022/061959, mailed Aug. 30, 2022.

* cited by examiner

HERBICIDE/SAFENER COMBINATION BASED ON SAFENERS FROM THE CLASS OF SUBSTITUTED [(1,5-DIPHENYL-1H-1,2,4-TRIAZOL-3-YL)OXY] ACETIC ACIDS AND THEIR SALTS

The present application is a 35 U.S.C. § 371 national phase entry of International Application No. PCT/EP2022/061959, filed on May 4, 2022, which claims priority to European Patent Application No. 21172971.0, filed May 10, 2021, the contents of each of which are hereby incorporated by reference in their entirety.

The invention relates to the technical field of crop protection compositions that can be used to counter unwanted plant growth on cultivated land, for preparation of seed or in plant crops, and comprise a combination of at least one safener (A) and at least one herbicide (B), where the safener (A) is one or more substituted [(1,5-diphenyl-1H-1,2,4-triazol-3-yl)oxy]acetic acids of the general formula (I) and/or agrochemically compatible salts thereof (=component (A)).

The efficacy of known herbicides against harmful plants is at a high level, but generally depends on the application rate, the form of the respective preparation, the spectrum of harmful plants, the harmful plants to be controlled in each case, climate and soil conditions, etc., but in particular also on crop plant compatibility.

One way of improving the application profile of a herbicide may be to combine a safener with one or more active herbicidal ingredients which contribute the desired additional properties. However, in the case of combined application of two or more active ingredients, it is not uncommon for there to be phenomena of physical and biological incompatibility, for example lack of stability in a coformulation, decomposition of an active ingredient and/or antagonism of the active ingredients, or else the safeners have a limited scope of action that protects the crop plant only against one herbicide but not with respect to all components in the case of combined applications of two or more herbicides.

Safeners, also called antidotes, of different chemical structures have been known for about 70 years. It is likewise known that they differ significantly with regard to their protective functions, meaning that the use thereof is limited to selected herbicides and/or the crop plants to be protected. An additional requirement is for a selected herbicide/safener combination not to adversely affect herbicidal efficacy based on the harmful plants to be controlled.

[(1,5-Diphenyl-1H-1,2,4-triazol-3-yl)oxy]acetic acid derivatives and salts thereof are known from the PCT application with application number PCT/EP2020/083167 (WO2021/105101).

It has now been found that compounds from the class of the substituted [(1,5-diphenyl-1H-1,2,4-triazol-3-yl)oxy] acetic acids can indeed be used effectively for protection of different crop plants on application of one or more herbicides [component (B)] of different chemical structures.

The herbicide/safener combinations of the invention interact in a particularly favorable manner, for example when they are used to control unwanted plant growth in crop plants such as wheat (hard and soft wheat), maize, soya, sugarbeet, sugarcane, cotton, rice, beans (for example, bush beans and broad beans), flax, barley, oats, rye, triticale, potato and millet/sorghum.

The present invention thus provides combinations comprising one or more component(s) (A) that are active as safeners and one or more herbicidally active compound(s) as component (B) where (A) represents one or more compounds of the general formula (I) or agrochemically acceptable salts thereof (I)

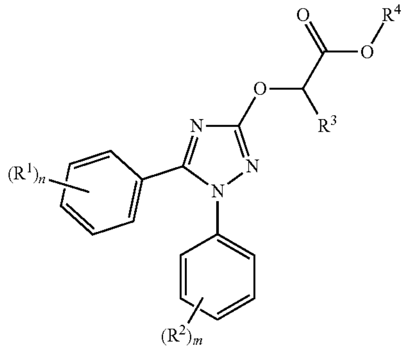

and in which $(R^1)_n$-phenyl represents the Q-1.1 to Q-1.53 groups

Q-1.1

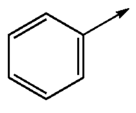

Q-1.2

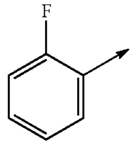

Q-1.3

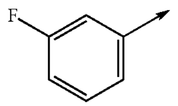

Q-1.4

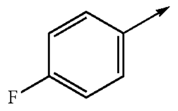

Q-1.5

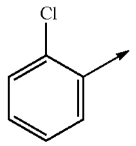

Q-1.6

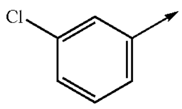

Q-1.7

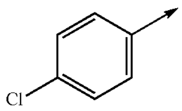

Q-1.8

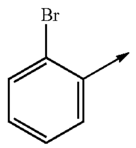

-continued
Q-1.9
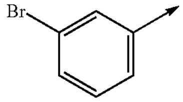
Q-1.10
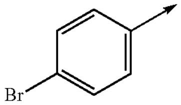
Q-1.11
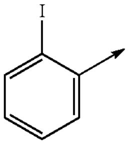
Q-1.12
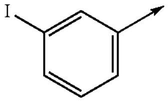
Q-1.13
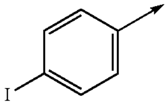
Q-1.14
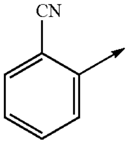
Q-1.15
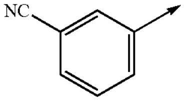
Q-1.16
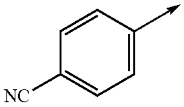
Q-1.17
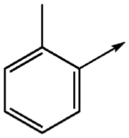
Q-1.18
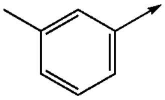
Q-1.19
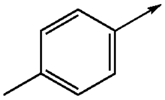
Q-1.20
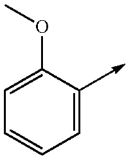
-continued
Q-1.21
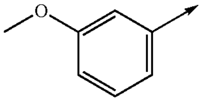
Q-1.22
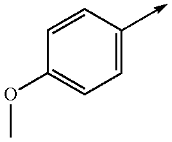
Q-1.23
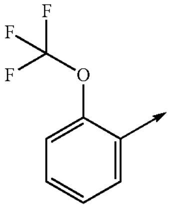
Q-1.24
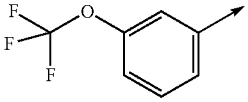
Q-1.25
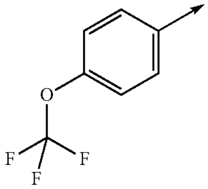
Q-1.26
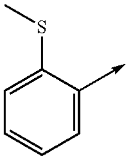
Q-1.27
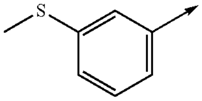
Q-1.28
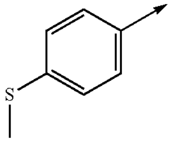
Q-1.29
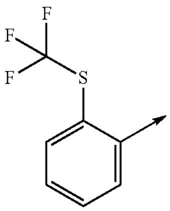
Q-1.30
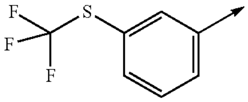

-continued
Q-1.31
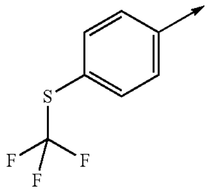
Q-1.32
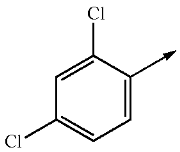
Q-1.33
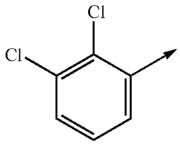
Q-1.34
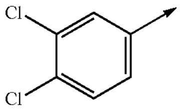
Q-1.35
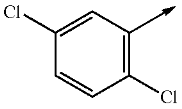
Q-1.36
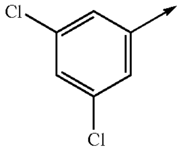
Q-1.37
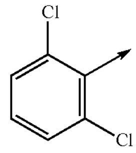
Q-1.38
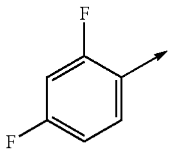
Q-1.39
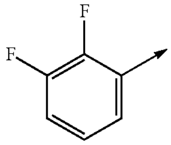
Q-1.40
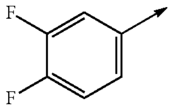
-continued
Q-1.41
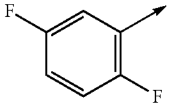
Q-1.42
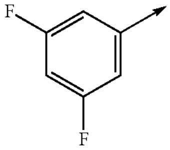
Q-1.43
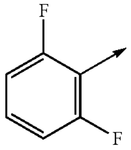
Q-1.44
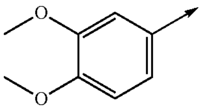
Q-1.45
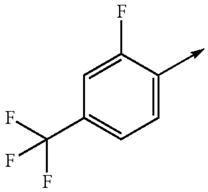
Q-1.46
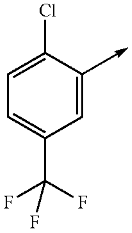
Q-1.47
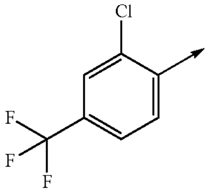
Q-1.48
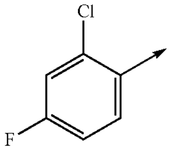
Q-1.49
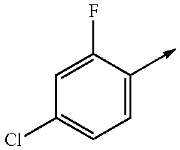

-continued
Q-1.50
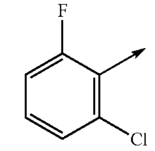
Q-1.51
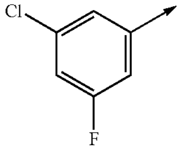
Q-1.52
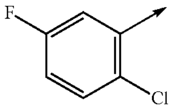
Q-1.53
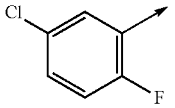
and $(R^2)_m$-phenyl represents the Q-2.1 to Q-2.53 groups
Q-2.1
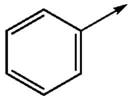
Q-2.2
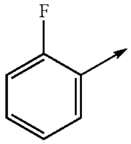
Q-2.3
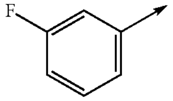
Q-2.4
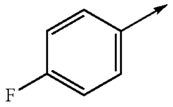
Q-2.5
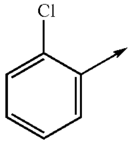
Q-2.6
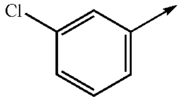
Q-2.7
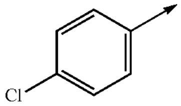
-continued
Q-2.8
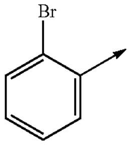
Q-2.9
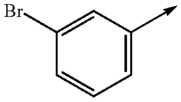
Q-2.10
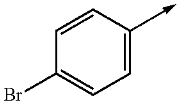
Q-2.11
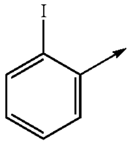
Q-2.12
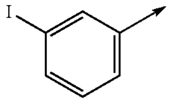
Q-2.13
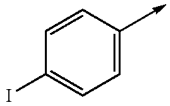
Q-2.14
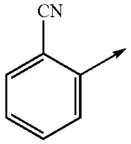
Q-2.15
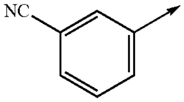
Q-2.16
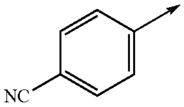
Q-2.17
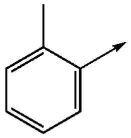
Q-2.18
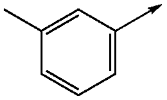
Q-2.19
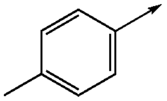

-continued
Q-2.20
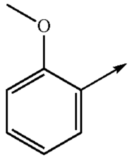
Q-2.21
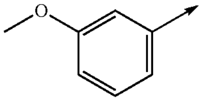
Q-2.22
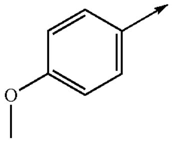
Q-2.23
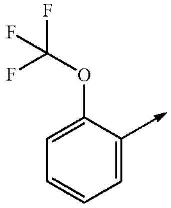
Q-2.24
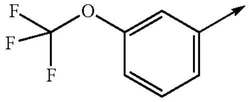
Q-2.25
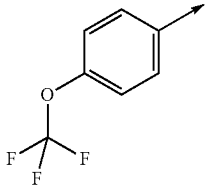
Q-2.26
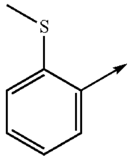
Q-2.27
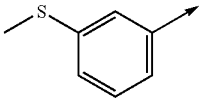
Q-2.28
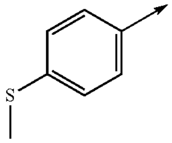
Q-2.29
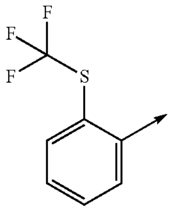
-continued
Q-2.30
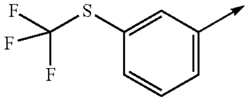
Q-2.31
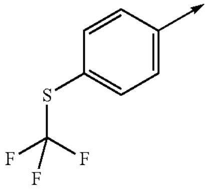
Q-2.32
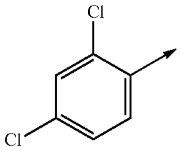
Q-2.33
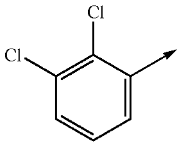
Q-2.34
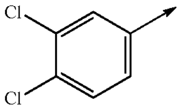
Q-2.35
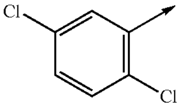
Q-2.36
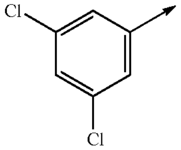
Q-2.37
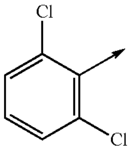
Q-2.38
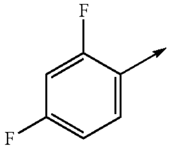
Q-2.39
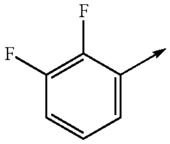
Q-2.40
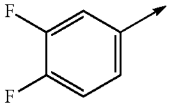

-continued

Q-2.41

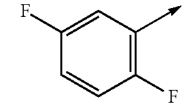

Q-2.42

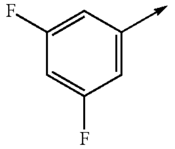

Q-2.43

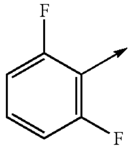

Q-2.44

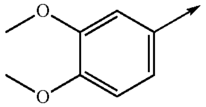

Q-2.45

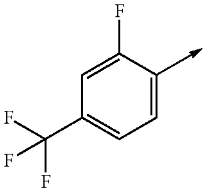

Q-2.46

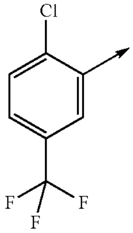

Q-2.47

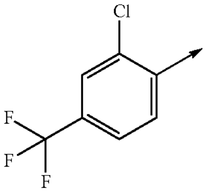

Q-2.48

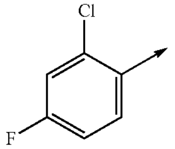

Q-2.49

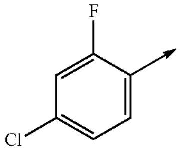

-continued

Q-2.50

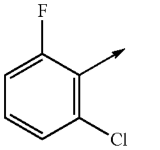

Q-2.51

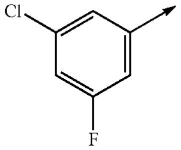

Q-2.52

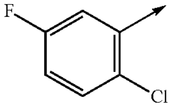

Q-2.53

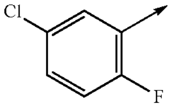

$R^3$ is hydrogen, and $R^4$ is hydrogen, methyl, ethyl, n-propyl, i-propyl, n-butyl, n-pentyl, phenyl, benzyl, $CH_2$(4-Cl-Ph), $CH_2$(4-F-Ph), $CH_2$(4-OMe-Ph), 2-methoxyethyl, tetrahydrofuran-2-yl-methyl, tetrahydrofuran-3-ylmethyl, tetrahydropyran-2-ylmethyl, tetrahydropyran-3-ylmethyl, tetrahydropyran-4-ylmethyl, methylpropionate-3-yl, ethylpropionate-3-yl, methylacet-2-yl, ethylacet-2-yl, methylpivalate-2-yl, ethylpivalate-3-yl, methyl-2-methylpropanoate-3-yl, methyl-2,2-dimethylpropanoate-3-yl, ethyl-2-methylpropanoate-3-yl, methyl-2-propanoate-2-yl, ethyl-2-propanoate-2-yl, methylacetate-2-yl, ethylacetate-2-yl, methyl-1-methylcyclopropanecarboxylate-2-yl, ethyl-1-methylcyclopropanecarboxylat-2-yl, 2-(dimethylamino)ethyl, oxetan-3-yl, (3-methyloxetan-3-yl)methyl, 2,2,2-trifluoroethyl, 2,2-difluoroethyl, 2-fluoroethyl, 2,2,3,3,3-pentafluoropropyl, cyclopropylmethyl, 1-cyclopropylethyl, (1-methylcyclopropyl)methyl, (2,2-dichlorocyclopropyl)methyl, (2,2-dimethylcyclopropyl)methyl, allyl, propargyl (prop-2-yn-1-yl), 2-chloroprop-2-en-1-yl, 3-phenylprop-2-yn-1-yl, 3,3-dichloroprop-2-en-1-yl, 3,3-dichloro-2-fluoroprop-2-en-1-yl, methylprop-2-yn-1-yl, 2-methylprop-2-en-1-yl, but-2-en-1-yl, but-3-en-1-yl, but-2-yn-1-yl, but-3-yn-1-yl, 4-chlorobut-2-yn-1-yl, 3-methylbut-2-en-1-yl, 3-methylbut-1-en-1-yl, 1-(2E)-1-methylbut-2-en-1-yl, (E)-pent-3-en-2-yl or (Z)-pent-3-en-2-yl, cyclobutylmethyl, cyclopentylmethyl, cyclohexylmethyl, heptan-2-yl, isobutyl, 1,3-dioxolan-2-ylmethyl or 1-ethyl-5-methyl-1H-pyrazole-4-methyl, and (B) represents one or more herbicides [component (B)] from the group of the active herbicidal ingredients (B1) to (B11), in which (B1) represents active herbicidal ingredients from the group of the following 1,3-diketo compounds:

| | | |
|---|---|---|
| (B1.1) | alloxydim, | (CAS 55634-91-8), (CAS 55635-13-7) |
| (B1.2) | bicyclopyrone, | (CAS 352010-68-5) |
| (B1.3) | butroxydim, | (CAS 138164-12-2) |
| (B1.4) | clethodim, | (CAS 99129-21-2) |
| (B1.5) | cycloxydim, | (CAS 101205-02-1) |
| (B1.6) | fenquinotrione, | (CAS 1342891-70-6) |
| (B1.7) | mesotrione, | (CAS 104206-82-8) |
| (B1.8) | pinoxaden, | (CAS 243973-20-8) |
| (B1.9) | profoxydim, | (CAS 139001-49-3) |
| (B1.10) | sethoxydim, | (CAS 74051-80-2) |
| (B1.11) | sulcotrione, | (CAS 99105-77-8) |
| (B1.12) | SYP-9121 | (CAS 1976053-87-8) |
| (B1.13) | tefuryltrione, | (CAS 473278-76-1) |
| (B1.14) | tembotrione, | (CAS 335104-84-2) |
| (B1.15) | tepraloxydim, | (CAS 149979-41-9) |
| (B1.16) | tralkoxydim, | (CAS 87820-88-0) |
| (B1.17) | Y13161, | (CAS 1639426-14-4) |
| (B1.18) | Y13287 | (CAS 1639426-42-8) |

(B2) represents active herbicidal ingredients from the group of the following (sulfon)amides:

| | | |
|---|---|---|
| (B2.1) | acetochlor, | (CAS 34256-82-1) |
| (B2.2) | alachlor, | (CAS 15972-60-8), |
| (B2.3) | amidosulfuron, | (CAS 120923-37-7) |
| (B2.4) | asulam, | (CAS 3337-71-1) (CAS 14089-43-1), (CAS 2302-17-2) |
| (B2.5) | azimsulfuron, | (CAS 120162-55-2) |
| (B2.6) | beflubutamid, | (CAS 113614-08-7), (CAS 113614-09-8) |
| (B2.7) | bensulfuron, | (CAS 83055-99-6), (CAS 83055-99-6) |
| (B2.8) | butachlor, | (CAS 23184-66-99) |
| (B2.9) | carbetamide, | (CAS 16118-49-3) |
| (B2.10) | chlorimuron, | (CAS 99283-00-8), (CAS 90982-32-4), |
| (B2.11) | chlorpropham, | (CAS 101-21-3) |
| (B2.12) | chlorsulfuron, | (CAS 64902-72-3) |
| (B2.13) | cinosulfuron, | (CAS 94593-91-6) |
| (B2.14) | cloransulam, | (CAS159518-97-5), (CAS 147150-35-4) |
| (B2.15) | cyclosulfamuron, | (CAS 136849-15-5) |
| (B2.16) | desmedipham, | (CAS 13684-56-5) |
| (B2.17) | diclosulam, | (CAS 145701-21-9) |
| (B2.18) | diflufenican, | (CAS 83164-33-4) |
| (B2.19) | dimethachlor, | (CAS 50563-36-5) |
| (B2.20) | dimethenamid, | (CAS 87674-68-8), (CAS 163515-14-8) |
| (B2.21) | esprocarb | (CAS 85785-20-2) |
| (B2.22) | ethametsulfuron, | (CAS 111353-84-5), (CAS 97780-06-8) |
| (B2.23) | ethoxysulfuron, | (CAS 126801-58-9) |
| (B2.24) | flazasulfuron, | (CAS 104040-78-0) |
| (B2.25) | florasulam, | (CAS 145701-23-1) |
| (B2.26) | flucarbazone, | (CAS 145026-88-6 ), (CAS 181274-17-9) |
| (B2.27) | flucetosulfuron, | (CAS 412928-75-7) |
| (B2.28) | flufenacet, | (CAS 142459-58-3) |
| (B2.29) | flumetsulam, | (CAS 98967-40-9) |
| (B2.30) | flupyrsulfuron, | (CAS 150315-10-9), (CAS 144740-53-4), (CAS 144740-54-5) |
| (B2.31) | foramsulfuron, | (CAS 173159-57-4) |
| (B2.32) | halosulfuron, | (CAS 135397-30-7), (CAS 100784-20-1) |
| (B2.33) | imazosulfuron, | (CAS 122548-33-8) |
| (B2.34) | iodosulfuron, | (CAS 185119-76-0), (CAS 144550-06-1), (CAS 144550-36-7) |

-continued

| | | |
|---|---|---|
| (B2.35) | ipfencarbazone, | (CAS 212201-70-2) |
| (B2.36) | mefenacet, | (CAS 73250-68-7) |
| (B2.37) | mesosulfuron, | (CAS 400852-66-6), (CAS 208465-21-8) |
| (B2.38) | metazachlor, | (CAS 67129-08-2) |
| (B2.39) | metazosulfuron, | (CAS 868680-84-6) |
| (B2.40) | metolachlor, | (CAS 51218-45-2) |
| (B2.41) | metosulam, | (CAS 139528-85-1) |
| (B2.42) | metsulfuron, | (CAS 79510-48-8), (CAS 74223-64-6) |
| (B2.43) | nicosulfuron, | (CAS 111991-09-4) |
| (B2.44) | orthosulfamuron, | (CAS 213464-77-8) |
| (B2.45) | oxasulfuron, | (CAS 144651-06-9) |
| (B2.46) | penoxsulam, | (CAS 219714-96-2) |
| (B2.47) | pethoxamide, | (CAS 106700-29-2) |
| (B2.48) | phenmedipham, | (CAS 13684-63-4) |
| (B2.49) | picolinafen, | (CAS 137641-05-5) |
| (B2.50) | pretilachlor, | (CAS 51218-49-6) |
| (B2.51) | primisulfuron, | (CAS 113036-87-6), (CAS 86209-51-0) |
| (B2.52) | propachlor, | (CAS 1918-16-7) |
| (B2.53) | propanil, | (CAS 709-98-8) |
| (B2.54) | propham, | (CAS 122-42-9) |
| (B2.55) | propisochlor, | (CAS 86763-47-5) |
| (B2.56) | propoxycarbazone, | (CAS 145026-81-9), (CAS 181274-15-7) |
| (B2.57) | propyrisulfuron, | (CAS 570415-88-2) |
| (B2.58) | propyzamide, | (CAS 23950-58-5) |
| (B2.59) | prosulfocarb, | (CAS 52888-80-9) |
| (B2.60) | prosulfuron, | (CAS 94125-34-5) |
| (B2.61) | pyrazosulfuron, | (CAS 98389-04-9), (CAS 93697-74-6) |
| (B2.62) | pyroxsulam, | (CAS 422556-08-9) |
| (B2.63) | rimsulfuron, | (CAS 122931-48-0) |
| (B2.64) | S-metolachlor, | (CAS 87392-12-9) |
| (B2.65) | sulfometuron, | (CAS 74223-56-6), (CAS 74222-97-2), (CAS 144651-06-9) |
| (B2.66) | sulfosulfuron, | (CAS 141776-32-1) |
| (B2.67) | thenylchlor, | (CAS 96491-05-3) |
| (B2.68) | thiencarbazone, | (CAS 936331-72-5), (CAS 317815-83-1) |
| (B2.69) | thifensulfuron, | (CAS 79277-67-1), (CAS 79277-27-3) |
| (B2.70) | tri-allate, | (CAS 2303-17-5) |
| (B2.71) | triasulfuron, | (CAS 82097-50-5) |
| (B2.72) | tribenuron, | (CAS 106040-48-6), (CAS 101200-48-0) |
| (B2.73) | trifloxysulfuron, | (CAS 145099-21-4, (CAS 199119-58-9) |
| (B2.74) | triflusulfuron, | (CAS 135990-29-3), (CAS 126535-15-7) |
| (B2.75) | tritosulfuron, | (CAS 142469-14-5) |
| (B2.76) | esprocarb, | (CAS 85785-20-2) |
| (B2.77) | profluazole, | (CAS 190314-43-3) |
| (B2.78) | tri-allate, | (CAS 2303-17-5) |
| (B2.79) | methyl rel-(2R,4R)-4-[[3-(3,5-dichlorophenyl)-5-methoxy-4H-isoxazole-5-carbonyl]amino]tetrahydrofuran-2-carboxylate, | |
| (B2.80) | methyl rel-(2R,4R)-4-[[3-(3,5-dichlorophenyl)-5-vinyl-4H-isoxazole-5-carbonyl]amino]tetrahydrofuran-2-carboxylate, | |
| (B2.81) | methyl (2R*,4R*)-4-[[(5S)-3-(3,5-difluorophenyl)-5-vinyl-4H-isoxazole-5-carbonyl]amino]tetrahydrofuran-2-carboxylate, | |
| (B2.82) | isopropyl rel-(2R,4R)-4-[[3-(3-fluorophenyl)-5-methyl-4H-isoxazole-5-carbonyl]amino]tetrahydrofuran-2-carboxylate, | |
| (B2.83) | methyl (3R)-3-[[(5S)-3-(3,5-difluorophenyl)-5-vinyl-4H-isoxazole-5-carbonyl]amino]-2,3-dihydrofuran-5-carboxylate, | |
| (B2.84) | methyl (3R)-3-[[(5R)-3-(3,5-difluorophenyl)-5-methyl-4H-isoxazole-5-carbonyl]amino]-2,3-dihydrofuran-5-carboxylate, | |
| (B2.85) | methyl (1S,4R)-4-[[[(5S)-3-(3,5-difluorophenyl)-5-vinyl-4H-1,2-oxazol-5-yl]carbonyl]amino]cyclopent-2-ene-1-carboxylate, | |

-continued

| | |
|---|---|
| (B2.86) | ethyl (1S,4R)-4-[[[3-(3,5-difluorophenyl)-5-methoxy-4H-1,2-oxazol-5-yl]carbonyl]amino]cyclopent-2-ene-1-carboxylate, |
| (B2.87) | 2-methoxyethyl (1S,4R)-4-[[[(5R)-3-(3-cyano-5-fluorophenyl)-5-(trifluoromethyl)-4H-1,2-oxazol-5-yl]carbonyl]amino]cyclopent-2-ene-1-carboxylate, |
| (B2.88) | methyl (4S)-4-[[[3-(3,5-difluorophenyl)-5-methyl-4H-1,2-oxazol-5-yl]carbonyl]amino]cyclopentene-1-carboxylate, |
| (B2.89) | methyl (3S)-3-[[[(5R)-3-(3,5-difluorophenyl)-5-methyl-4H-1,2-oxazol-5-yl]carbonyl]amino]cyclopentene-1-carboxylate, |
| (B2.90) | 3-(3,5-difluorophenyl)-N-[(1R,4S)-4-(oxazinan-2-ylcarbonyl)cyclopent-2-en-1-yl]-5-(trifluoromethyl)-4H-1,2-oxazole-5-carboxamide, |
| (B2.91) | 3-(3,5-difluorophenyl)-N-[(1R,4S)-4-[(propylsulfonylamino)carbonyl]cyclopent-2-en-1-yl]-5-(trifluoromethyl)-4H-1,2-oxazole-5-carboxamide, |
| (B2.92) | (1S,4R)-4-[[(5R)-3-(3,5-difluorophenyl)-5-methyl-4H-isoxazole-5-carbonyl]amino]cyclopent-2-ene-1-carboxylic acid, |

(B3) represents active herbicidal ingredients from the group of the following aryl nitriles:

| | | |
|---|---|---|
| (B3.1) | bromoxynil, | (CAS 1689-84-5) (CAS 3861-41-4), (CAS 56634-95-8), (CAS 1689-99-2), (CAS 2961-68-4) |
| (B3.2) | chlorthiamid, | (CAS 1918-13-4) |
| (B3.3) | dichlobenil, | (CAS 1194-65-6) |
| (B3.4) | ioxynil, | (CAS 1689-83-4), (CAS 2961-61-7), (CAS 3861-47-0), (CAS 2961-62-8) |
| (B3.5) | pyraclonil | (CAS 158353-15-2) |

(B4) represents active herbicidal ingredients from the group of the following azoles:

| | | |
|---|---|---|
| (B4.1) | amicarbazone, | (CAS 129909-90-6) |
| (B4.2) | amitrole, | (CAS 61-82-5) |
| (B4.3) | azafenidin, | (CAS 68049-83-2) |
| (B4.4) | benzofenap, | (CAS 82692-44-2) |
| (B4.5) | benzuofucaotong, | (CAS 1992017-55-6) |
| (B4.6) | biscarfentrazone, | (CAS 1622908-18-2) |
| (B4.7) | cafenstrole, | (CAS 125306-83-4) |
| (B4.8) | carfentrazone, | (CAS 128621-72-7), (CAS128639-02-1) |
| (B4.9) | fentrazamide, | (CAS 158237-07-1) |
| (B4.10) | imazamethabenz, | (CAS 100728-84-5), (CAS 81405-85-8) |
| (B4.11) | imazamox, | (CAS 114311-32-9), (CAS 247057-22-3) |
| (B4.12) | imazapic, | (CAS 104098-48-8), (CAS 115136-53-3) |
| (B4.13) | imazapyr, | (CAS 81334-34-1), (CAS 81510-83-0) |
| (B4.14) | imazaquin, | (CAS 81335-37-7), (CAS 81335-47-9), (CAS 81335-43-5), (CAS 81335-46-8) |
| (B4.15) | imazethapyr, | (CAS 81335-77-5), (CAS 101917-66-2) |
| (B4.16) | isouron, | (CAS 55861-78-4) |
| (B4.17) | isoxaben, | (CAS 82558-50-7) |
| (B4.18) | isoxaflutole, | (CAS 141112-29-0) |
| (B4.19) | oxadiargyl, | (CAS 39807-15-3) |
| (B4.20) | oxadiazon, | (CAS 19666-30-9) |
| (B4.21) | pyraflufen, | (CAS 129630-17-7), (CAS 129630-19-9) |
| (B4.22) | pyrasulfotole, | (CAS 365400-11-9) |
| (B4.23) | pyrazolynate, | (CAS 58011-68-0) |
| (B4.24) | pyrazoxyfen, | (CAS 71561-11-0) |
| (B4.25) | pyroxasulfone, | (CAS 447399-55-5) |
| (B4.26) | sulfentrazone, | (CAS 122836-35-5) |
| (B4.27) | tolpyralate, | (CAS 1101132-67-5) |
| (B4.28) | topramezone, | (CAS 210631-68-8) |
| (B4.29) | triazolesulcotrione | (CAS 1911613-97-2) |
| (B4.30) | QYM-201, | (CAS 1855925-45-1) |
| (B4.31) | bencarbazone, | (CAS 173980-17-1) |
| (B4.32) | fluazolate, | (CAS 174514-07-9) |
| (B4.33) | flupoxam, | (CAS 119126-15-7) |
| (B4.34) | isoxachlortole | (CAS 141112-06-3) |

(B5) represents further active herbicidal ingredients specified below:

| | | |
|---|---|---|
| (B5.1) | amino-cyclopyrachlor, | (CAS 858956-08-8), (CAS 858954-83-3), (CAS 858956-35-1) |
| (B5.2) | aminopyralid, | (CAS 150114-71-9), (CAS 566191-87-5), (CAS 566191-89-7) |
| (B5.3) | benazolin-ethyl, | (CAS 3813-05-6), (CAS 38561-76-1), (CAS 25059-80-7), (CAS 67338-65-2) |
| (B5.4) | benfluralin, | (CAS 1861-40-1) |
| (B5.5) | bentazone, | (CAS 25057-89-0), (CAS 50723-80-3) |
| (B5.6) | benzobicyclon, | (CAS 156963-66-5) |
| (B5.7) | bixlozone, | (CAS 81777-95-9) |
| (B5.8) | bromofenoxim, | (CAS 13181-17-4) |
| (B5.9) | butralin, | (CAS 33629-47-9) |
| (B5.10) | chloridazon/pyrazon, | (CAS 1698-60-8) |
| (B5.11) | chlorthal, | (CAS 2136-79-0), (CAS 1861-32-1), (CAS 887-54-7) |
| (B5.12) | cinidon-ethyl, | (CAS 142891-20-1) |
| (B5.13) | cinmethylin, | (CAS 87818-31-3) |
| (B5.14) | clomazone, | (CAS 81777-89-1) |
| (B5.15) | cyclopyrimorate, | (CAS 499231-24-2) |
| (B5.16) | dinitramine, | (CAS 29091-05-2) |
| (B5.17) | diquat, | (CAS 2764-72-9), (CAS 85-00-7), (CAS 4032-26-2) |
| (B5.18) | dithiopyr, | (CAS 97886-45-8) |
| (B5.19) | acetic acid, | (CAS 64-19-7) |
| (B5.20) | ethalfluralin, | (CAS 55283-68-6) |
| (B5.21) | ethofumesate, | (CAS 26225-79-6) |
| (B5.22) | flamprop, | (CAS 58667-63-3, (CAS 90134-59-1), (CAS 63782-90-1), (CAS 63729-98-6) |
| (B5.23) | florpyrauxifen, | (CAS 943832-81-3), (CAS 1390661-72-9) |
| (B5.24) | flufenpyr, | (CAS 188490-07-5), (CAS 188489-07-8) |
| (B5.25) | flumiclorac, | (CAS 87547-04-4), (CAS 87546-18-7) |
| (B5.26) | flumioxazin, | (CAS 103361-09-7) |
| (B5.27) | fluridone, | (CAS 59756-60-4) |
| (B5.28) | flurochloridone, | (CAS 61213-25-0) |
| (B5.29) | flurtamone, | (CAS 96525-23-4) |
| (B5.30) | fluthiacet-methyl, | (CAS 149253-65-6) |
| (B5.31) | halauxifen, | (CAS 943832-60-8), (CAS 943831-98-9) |
| (B5.32) | indanofan, | (CAS 13320-30-1) |
| (B5.33) | norflurazon, | (CAS 27314-13-2) |
| (B5.34) | oleic acid, | (CAS 112-80-1) |
| (B5.35) | oryzalin, | (CAS 19044-88-3) |
| (B5.36) | oxaziclomefone, | (CAS 153197-14-9) |
| (B5.37) | paraquat, | (CAS 4685-14-7), (CAS 1910-42-5), (CAS 2074-50-2) |
| (B5.38) | pelargonic acid, | (CAS 112-05-0) |
| (B5.39) | pendimethalin, | (CAS 40487-42-1) |
| (B5.40) | pentoxazone, | (CAS 110956-75-7) |
| (B5.41) | pyridafol, | (CAS 40020-01-7) |
| (B5.42) | pyridate, | (CAS 55512-33-9) |
| (B5.43) | tetflupyrolimet, | (CAS 2053901-33-8) |
| (B5.44) | thiazopyr, | (CAS 117718-60-2) |
| (B5.45) | triafamone, | (CAS 874195-61-6) |
| (B5.46) | trifluralin, | (CAS 1582-09-8) |
| (B5.47) | 4-amino-3-chloro-5-fluoro-6-(7-fluoro-1H-indol-6-yl)pyridine-2-carboxylic acid, | |
| (B5.48) | cyclopyrimorate, | (CAS 499231-24-2) |
| (B5.49) | diquat, | (CAS 2764-72-9, CAS 85-00-7, CAS4032-26-2) |
| (B5.50) | oxaziclomefone, | (CAS 153197-14-9) |
| (B5.51) | pentanochlor, | (CAS 2307-68-8) |
| (B5.52) | tebutam, | (CAS 35256-85-0) |
| (B5.53) | thidiazimin, | (CAS 123249-43-4) |
| (B5.54) | 4-hydroxy-1-methyl-3-[4-(trifluoromethyl)-2-pyridinyl]-2-imidazolidinone | (CAS 1708087-22-2) |

(B6) represents active herbicidal ingredients from the group of the following (het)arylcarboxylic acids:

| | | |
|---|---|---|
| (B6.1) | chloramben, | (CAS 133-90-4), (CAS 1076-46-6), (CAS 53404-16-3), (CAS 7286-84-2), (CAS 25182-03-0), (1954-81-0) |
| (B6.2) | clopyralid, | (CAS 1702-17-6), (CAS 1532-24-7), (CAS 57754-85-5), (CAS 58509-83-4), (CAS 73455-09-1) |
| (B6.3) | dicamba, | (CAS 1918-00-9), (CAS 1286239-22-2), (CAS 104040-79-1), (CAS 2300-66-5), (CAS 25059-78-3), (CAS 55871-02-8), (CAS 6597-78-0), (CAS 53404-28-7), (CAS 10007-85-9), (CAS 1982-69-0), (53404-29-8), (CAS 56141-00-5) |
| (B6.4) | fluroxypyr, | (CAS 69377-81-7), (CAS -27-8), (CAS 81406-37-3) |
| (B6.5) | picloram, | (CAS 1918-02-1), (CAS 55870-98-9), (CAS 36374-99-9), (CAS 26952-20-5), (CAS 14143-55-6), (CAS 55871-00-6), (CAS 2545-60-0), (CAS 35832-11-2), (CAS 6753-47-5), (CAS 82683-78-1) |
| (B6.6) | quinclorac, | (CAS 84087-01-4), (CAS 84087-48-9), (CAS 84087-33-2) |
| (B6.7) | quinmerac, | (CAS 90717-03-6) |
| (B6.8) | TBA, | (CAS 50-31-7), (CAS 3426-62-8), (CAS 71750-37-3), (CAS 4559-30-2), (CAS 2078-42-4) |
| (B6.9) | triclopyr | (CAS 55335-06-3), (CAS [64700-56-7), (CAS 1048373-85-8), (CAS 60825-27-6), (CAS 57213-69-1) |

(B7) represents active herbicidal ingredients from the group of the following organic phosphorus compounds:

| | | |
|---|---|---|
| (B7.1) | anilofos, | (CAS 64249-01-0) |
| (B7.2) | bialaphos, | (CAS 35597-43-4), (CAS 71048-99-2) |
| (B7.3) | butamifos, | (CAS 36335-67-8) |
| (B7.4) | glufosinate, | (CAS 51276-47-2), (CAS 35597-44-5), (CAS 77182-82-2), (CAS 70033-13-5) |
| (B7.5) | glyphosate, | (CAS 1071-83-6), (CAS 69254-40-6), (CAS 34494-04-7), (CAS 38641-94-0), (CAS 40465-66-5), (CAS 39600-42-5), (CAS 70393-85-0), (CAS 81591-81-3) |
| (B7.6) | piperophos, | (CAS 24151-93-7) |
| (B7.7) | sulfosate, | (CAS 1591-81-3) |
| (B7.8) | amiprofos | (CAS 33857-23-7, CAS 36001-88-4) |

(B8) represents active herbicidal ingredients from the group of the following phenyl ethers:

| | | |
|---|---|---|
| (B8.1) | 2,4-D, | (CAS 94-75-7), (CAS 2307-55-3), (CAS 1929-73-3), (CAS 1320-18-9), (CAS 1928-45-6), (CAS 94-80-4), (CAS 1048373-72-3), (CAS 20940-37-8), (CAS 2008-39-1), (CAS 5742-19-8), (CAS 2212-54-6), (CAS 533-23-3), (CAS 1928-43-4), (CAS 37102-63-9), (CAS 713-15-1), (CAS 25168-26-7), (CAS 94-11-1), (CAS 5742-17-6), (CAS 3766-27-6), (CAS 1917-97-1), (CAS 1928-38-7), (CAS 1928-44-5), (CAS 1917-92-6), (CAS 1928-61-6), (CAS 2702-72-9), (CAS 15146-99-3), (CAS 28685-18-9), (CAS 2646-78-8), (CAS 18584-79-7), (CAS 2569-01-9), (CAS 215655-76-8) |
| (B8.2) | 2,4-DB, | (CAS 94-82-6), (CAS 2758-42-1), (CAS 1320-15-6), (CAS 19480-40-1), (CAS 10433-59-7) |
| (B8.3) | 2,4-DP, | (CAS 120-36-5), (CAS 53404-31-2), (CAS 53404-32-3), (CAS 79270-78-3), (CAS 28631-35-8), (CAS 57153-17-0), (CAS 5746-17-8), (CAS 39104-30-8) |

-continued

| | | |
|---|---|---|
| (B8.4) | acifluorfen, | (CAS 50594-66-6), (CAS 50594-67-7), (CAS 62476-59-9) |
| (B8.5) | aclonifen, | (CAS 74070-46-5) |
| (B8.6) | bifenox, | (CAS 42576-02-3) |
| (B8.7) | chlomethoxyfen, | (CAS 32861-85-1) |
| (B8.8) | clodinafop-propargyl, | (CAS 114420-56-3), (CAS 105512-06-9) |
| (B8.9) | clomeprop, | (CAS 84496-56-0) |
| (B8.10) | cyhalofop, | (CAS 122008-78-0), (CAS 122008-85-9) |
| (B8.11) | diclofop, | (CAS 40843-25-2), (CAS 51338-27-3) |
| (B8.12) | ethoxyfen, | (CAS 188634-90-4), (CAS 131086-42-5) |
| (B8.13) | fenoxaprop, | (CAS 95617-09-7), (CAS 113158-40-0), (CAS 71283-80-2) |
| (B8.14) | fluazifop, | (CAS 69335-91-7), (CAS 83066-88-0), (CAS 79241-46-6) |
| (B8.15) | fluoroglycofen, | (CAS 77501-60-1), (CAS 77501-90-7) |
| (B8.16) | fomesafen, | (CAS 72178-02-0), (CAS 108731-70-0) |
| (B8.17) | halosafen, | (CAS 77227-69-1) |
| (B8.18) | haloxyfop, | (CAS 69806-34-4), (CAS 95977-29-0), (CAS 72619-32-0) |
| (B8.19) | lactofen, | (CAS 77501-63-4) |
| (B8.20) | MCPA, | (CAS 94-74-6), (CAS 19480-43-4), (CAS 1713-12-8), (CAS 2039-46-5), (CAS 20405-19-0), (CAS 2698-38-6), (CAS 29450-45-1), (CAS 1713-11-7), (CAS 26544-20-7), (CAS 2698-40-0), (CAS 2436-73-9), (CAS 6365-62-4), (CAS 5221-16-9), (CAS 3653-48-3), (CAS 42459-68-7) |
| (B8.21) | MCPB, | (CAS 94-81-5), (CAS 10443-70-6), (CAS 57153-18-1), (CAS 6062-26-6) |
| (B8.22) | mecoprop, | (CAS 93-65-2), (CAS 32351-70-5), (CAS 1432-14-0), (CAS 71526-69-7), (CAS 28473-03-2), (CAS 2786-19-8), (CAS 1929-86-8), (CAS 19095-88-6), (CAS 53404-61-8), (CAS 16484-77-8) |
| (B8.23) | metamifop, | (CAS 256412-89-2) |
| (B8.24) | oxyfluorfen, | (CAS 42874-03-3) |
| (B8.25) | propaquizafop, | (CAS 111479-05-1) |
| (B8.26) | quizalofop, | (CAS 76578-12-6), (CAS 76578-14-8), |
| (B8.27) | quizalofop-p, | (CAS 94051-08-8), (CAS 100646-51-3), (CAS 200509-41-7) |
| (B8.28) | benzfendizone | (CAS 158755-95-4) |

(B9) represents active herbicidal ingredients from the group of the following pyrimidines:

| | | |
|---|---|---|
| (B9.1) | bispyrac-sodium, | (CAS 125401-92-5) |
| (B9.2) | bromacil, | (CAS 314-40-9), (CAS 53404-19-6), (CAS 69484-12-4) |
| (B9.3) | butafenacil, | (CAS 134605-64-4) |
| (B9.4) | lenacil, | (CAS 2164-08-1) |
| (B9.5) | pyribenzoxim, | (CAS 168088-61-7) |
| (B9.6) | pyriftalid, | (CAS 135186-78-6) |
| (B9.7) | pyriminobac, | (CAS 136191-56-5), (CAS 136191-64-5) |
| (B9.8) | pyrimisulfan, | (CAS 221205-90-9) |
| (B9.9) | pyrithiobac-sodium, | (CAS 123342-93-8), (CAS 123343-16-8) |
| (B9.10) | saflufenacil, | (CAS 372137-35-4) |
| (B9.11) | terbacil, | (CAS 5902-51-2) |
| (B9.12) | tiafenacil, | (CAS 1220411-29-9) |
| (B9.13) | trifludimoxazin, | (CAS 1258836-72-4) |
| (B9.14) | ethyl [3-[2-chloro-4-fluoro-5-(1-methyl-6-trifluoromethyl-2,4-dioxo-1,2,3,4-tetrahydropyrimidin-3-yl)phenoxy]-2-pyridyloxy]acetate | (CAS 353292-31-6) |

(B10) represents active herbicidal ingredients from the group of the following (thio)ureas:

| | | |
|---|---|---|
| (B10.1) | chlorobromuron, | (CAS 13360-45-7) |
| (B10.2) | chlorotoluron, | (CAS 15545-48-9) |

-continued

| | | |
|---|---|---|
| (B10.3) | daimuron, | (CAS 42609-52-9) |
| (B10.4) | dimefuron, | (CAS 34205-21-5) |
| (B10.5) | diuron, | (CAS 330-54-1) |
| (B10.6) | diflufenzopyr, | (CAS 1957168-02-3) |
| (B10.7) | fluometuron, | (CAS 2164-17-2) |
| (B10.8) | isoproturon, | (CAS 34123-59-6) |
| (B10.9) | linuron, | (CAS 330-55-2) |
| (B10.10) | methabenzthiazuron, | (CAS 18691-97-9) |
| (B10.11) | metobromuron, | (CAS 3060-89-7) |
| (B10.12) | metoxuron, | (CAS 19937-59-8) |
| (B10.13) | monolinuron, | (CAS 1746-81-2) |
| (B10.14) | neburon, | (CAS 555-37-3) |
| (B10.15) | siduron, | (CAS 1982-49-6) |
| (B10.16) | tebuthiuron, | (CAS 34014-18-1) |
| (B10.17) | fenuron, | (CAS 101-42-8) |
| (B10.18) | chloroxuron, | (CAS 1982-47-4) |
| (B10.19) | diflufenzopyr, | (CAS 1957168-02-3, (CAS 109293-98-3) |
| (B10.20) | ethidimuron | (CAS 30043-49-3) |

(B11) represents active herbicidal ingredients from the group of the following triazines:

| | | |
|---|---|---|
| (B11.1) | ametryne, | (CAS 834-12-8) |
| (B11.2) | atrazine, | (CAS 1912-24-9) |
| (B11.3) | cyanazine, | (CAS 21725-46-2) |
| (B11.4) | dimethametryn, | (CAS 22936-75-0) |
| (B11.5) | hexazinone, | (CAS 51235-04-2) |
| (B11.6) | indaziflam, | (CAS 950782-86-2) |
| (B11.7) | metamitron, | (CAS 41394-05-2) |
| (B11.8) | metribuzin, | (CAS 21087-64-9) |
| (B11.9) | prometon, | (CAS 1610-18-0) |
| (B11.10) | prometryne, | (CAS 7287-19-6) |
| (B11.11) | propazine, | (CAS 139-40-2) |
| (B11.12) | simazine, | (CAS 122-34-9) |
| (B11.13) | simetryne, | (CAS 1014-70-6) |
| (B11.14) | terbumeton, | (CAS 33693-04-8) |
| (B11.15) | terbuthylazine, | (CAS 5915-41-3) |
| (B11.16) | terbutryne, | (CAS 886-50-0) |
| (B11.17) | triaziflam, | (CAS 131475-57-5) |
| (B11.18) | trietazine, | (CAS 1912-26-1) |
| (B11.19) | desmetryne. | (CAS 1014-69-3) |

The common name of the herbicides listed above is supplemented by the "CAS RN" (Chemical Abstracts Service Registry Number) ("CAS" for short) between parentheses. The CAS RN is a widely used reference number that enables unambiguous assignment of the substances in question since the "CAS RN" distinguishes inter alia between isomers, including stereoisomers, and salts and esters. For active ingredients that exist in various forms, the name of the neutral compound is given in each case in the above list. The CAS given between parentheses are directed to these and to all further known forms of the active ingredient, for example salts or adducts. Non-limiting examples include: 2,4-D-ammonium; 2,4-D-choline (the choline salt of 2,4-D); 2,4-D-BAPMA (N,N-bis-(3-aminopropyl)methylamine salt of 2,4-D); 2,4-D-diethylammonium; 2,4-D-dimethylammonium; 2,4-D-dodecylammonium; 2,4-D-heptylammonium; 2,4-D-isopropylammonium; 2,4-D-lithium; 2,4-D-potassium; 2,4-D-sodium; 2,4-D-tetradecylammonium; 2,4-D-triethylammonium; 2,4-D-tris(2-hydroxypropyl)ammonium; 2,4-D-monoethanolammonium (the monoethanolamine salt of 2,4-D); 2,4-D-diethanolammonium (the diethanolamine salt of 2,4-D or 2,4-D-diolamin); 2,4-D-triethanolammonium (the triethanolamine salt of 2,4-D or 2,4-D-triolamine); the tetrabutylamine salt of dicamba; the dimethylamine salt of dicamba; the isopropylamine salt of dicamba; the diglycolamine salt of dicamba; the N,N-bis(3-aminopropyl)methylamine salt of dicamba; the choline salt of dicamba; the monoethanolamine salt of dicamba; the diethanolamine salt of dicamba; the triethanolamine salt of dicamba; the potassium salt of dicamba; the sodium salt of dicamba; glyphosate-diammonium; glyphosate-dimethylammonium; glyphosate-isopropylammonium; glyphosate-monoammonium; glyphosate-potassium; glyphosate-dipotassium; glyphosate-sesquisodium (N-(phosphonomethyl)glycine sodium salt (2:3)); the trimethylsulfonium salt of glyphosate (glyphosate-trimesium); the triethanolamine salt of glyphosate; the diethanolamine salt of glyphosate; and the monoethanolamine salt of glyphosate.

Only the neutral compound is ever mentioned hereinafter, and hence encompasses all existing forms as listed, unless a specific form of the active ingredient is relevant in a particular context, for example in table examples below for biological efficacy.

The herbicide/safener combinations of the invention may contain further components, for example other active ingredients to counter harmful organisms such as harmful plants, plant-damaging animals or plant-damaging fungi, especially active ingredients from the group of the herbicides other than the herbicides mentioned under B1-B11, fungicides, insecticides, acaricides, nematicides and miticides, and related substances, or else other kinds of active ingredients for crop protection (e.g. resistance inductors), crop plant-protecting active ingredients (safeners, antidotes, other than component (A)), plant growth regulators, and/or additions and/or formulation auxiliaries that are customary in crop protection.

The components may be formulated together here (ready-to-use formulation) and employed as such, or they may be formulated separately and employed together, for example in a tankmix or in sequential application.

The individual safeners of the general formula (I) present as component (A) are also referred to hereinafter as compounds (A), active ingredients (A), components (A) or safeners (A). Correspondingly, the individual active herbicidal ingredients present as component (B) are also referred to hereinafter as compounds (B), active ingredients (B), components (B) or herbicides (B).

An advantageous property of the inventive combination of safeners (A) and herbicides (B) is found to be that safeners (A) and herbicides (B) are compatible with one another, meaning that they can be employed together without occurrence of significant chemical incompatibility between the safeners (A) and/or herbicides (B) that leads to destruction of the safener (A) or the herbicide(s) (B).

This favorable compatibility also extends to the biological properties of the active ingredients on combined use. For instance, antagonistic effects are generally not observed in the case of control of harmful plants with the herbicide/safener combinations of the invention.

In the formula (I) for compounds of the safeners (A) and all the formulae that follow, the following definitions are applicable:

According to the nature of the substituents and the way in which they are joined, the compounds of the formula (I) may be present as stereoisomers. If, for example, there are one or more asymmetrically substituted carbon atoms and/or sulfoxides, it is possible for enantiomers and diastereomers to occur. Stereoisomers can be obtained from the mixtures obtained in the preparation by customary separation methods, for example by chromatographic separation processes. It is likewise possible to selectively prepare stereoisomers by using stereoselective reactions with use of optically active starting materials and/or auxiliaries.

The invention also relates to all stereoisomers and mixtures thereof which are encompassed by the formula (I) but not defined specifically. For the sake of simplicity, however, reference will always be made hereinafter to compounds of the formula (I), even though this means not only the pure compounds but also, if appropriate, mixtures with different proportions of isomeric compounds.

According to the nature of the substituents defined above, the compounds of the formula (I) have acidic properties and can form salts, and if appropriate also internal salts or adducts with inorganic or organic bases or with metal ions. If the compounds of the formula (I) bear hydroxyl, carboxyl or other groups which induce acidic properties, these compounds can be reacted with bases to give salts. Suitable bases are, for example, hydroxides, carbonates, hydrogencarbonates of the alkali metals and alkaline earth metals, especially those of sodium, potassium, magnesium and calcium, and also ammonia, primary, secondary and tertiary amines having ($C_1$-$C_4$)-alkyl groups, mono-, di- and trialkanolamines of ($C_1$-$C_4$)-alkanols, choline and chlorocholine, and organic amines, such as trialkylamines, morpholine, piperidine or pyridine. These salts are compounds in which the acidic hydrogen is replaced by an agriculturally suitable cation, for example metal salts, especially alkali metal salts or alkaline earth metal salts, especially sodium and potassium salts, or else ammonium salts, salts with organic amines or quaternary ammonium salts, for example with cations of the formula $[NRR'R''R''']^+$ in which R to R''' are each independently an organic radical, especially alkyl, aryl, aralkyl or alkylaryl. Also useful are alkylsulfonium and alkylsulfoxonium salts, such as ($C_1$-$C_4$)-trialkylsulfonium and ($C_1$-$C_4$)-trialkylsulfoxonium salts.

The compounds of the formula (I) can form salts by addition of a suitable inorganic or organic acid, for example mineral acids, for example HCl, HBr, $H_2SO_4$, $H_3PO_4$ or $HNO_3$, or organic acids, for example carboxylic acids such as formic acid, acetic acid, propionic acid, oxalic acid, lactic acid or salicylic acid or sulfonic acids, for example p-toluenesulfonic acid, onto a basic group, for example amino, alkylamino, dialkylamino, piperidino, morpholino or pyridino. These salts then contain the conjugate base of the acid as anion.

Suitable substituents present in deprotonated form, for example sulfonic acids or carboxylic acids, are capable of forming inner salts with groups, such as amino groups, which can be protonated for their part.

If a group is polysubstituted by radicals, this means that this group is substituted by one or more identical or different radicals from those mentioned.

There follows a description of preferred, particularly preferred and very particularly preferred definitions of each of the individual safeners (A) and the herbicides (B).

If the compounds can form, through a hydrogen shift, tautomers whose structure would not formally be covered by the general formula (A), these tautomers are nevertheless encompassed by the definition of the inventive compounds of the general formula (A), unless a particular tautomer is under consideration. For example, many carbonyl compounds may be present both in the keto form and in the enol form, both forms being encompassed by the definition of the compound of the general formula (A). Depending on the nature of the substituents and the manner in which they are attached, the compounds of the general formula (I) may be present as stereoisomers. The possible stereoisomers defined by the specific three-dimensional form thereof, such as enantiomers, diastereomers, Z and E isomers, are all encompassed by the general formula (I). If, for example, one or more alkenyl groups are present, diastereomers (Z and E isomers) may occur. If, for example, one or more asymmetric carbon atoms are present, enantiomers and diastereomers may occur. Stereoisomers can be obtained from the mixtures obtained in the preparation by customary separation methods. The chromatographic separation can be effected either on the analytical scale to find the enantiomeric excess or the diastereomeric excess, or else on the preparative scale to produce test specimens for biological testing. It is likewise possible to selectively prepare stereoisomers by using stereoselective reactions with use of optically active starting materials and/or auxiliaries. The invention thus also relates to all stereoisomers which are embraced by the general formula (I) but are not shown in their specific stereomeric form, and to mixtures thereof.

If the compounds are obtained as solids, the purification can also be carried out by recrystallization or digestion. If individual compounds of the general formula (I) cannot be obtained in a satisfactory manner by the routes described below, they can be prepared by derivatization of other compounds of the general formula (I).

Suitable isolation methods, purification methods and methods for separating stereoisomers of compounds of the general formula (I) are methods generally known to the person skilled in the art from analogous cases, for example by physical processes such as crystallization, chromatographic methods, in particular column chromatography and HPLC (high pressure liquid chromatography), distillation, optionally under reduced pressure, extraction and other methods, any mixtures that remain can generally be separated by chromatographic separation, for example on chiral solid phases. Suitable for preparative amounts or on an industrial scale are processes such as crystallization, for example of diastereomeric salts which can be obtained from the diastereomer mixtures using optically active acids and, if appropriate, provided that acidic groups are present, using optically active bases.

In a first embodiment of the present invention, the herbicide/safener combination of the invention, as well as at least one component (B) as defined above, preferably comprises a compound [component A] of the general formula (I) or the agronomically compatible salts thereof [safener (A)] according to table 1.

TABLE 1

| IUPAC names and the structural formulae of the preferred compounds of the formula (I) (safener (A)) | | |
|---|---|---|
| Compound No. | IUPAC name | Structural formula |
| A1 | methyl {[1,5-bis(4-chloro-2-fluorophenyl)-1H-1,2,4-triazol-3-yl]oxy}acetate | 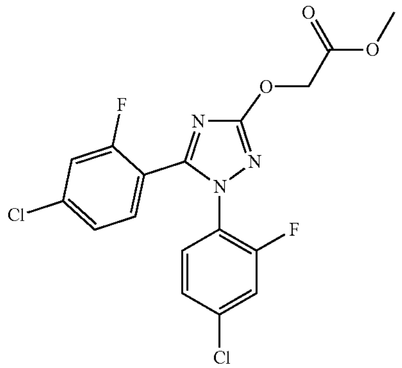 [SMILES: COC(=O)COc1nc(-c2ccc(Cl)cc2F)n(-c2ccc(Cl)cc2F)n1] |
| A2 | {[1,5-bis(4-chloro-2-fluorophenyl)-1H-1,2,4-triazol-3-yl]oxy}acetic acid | 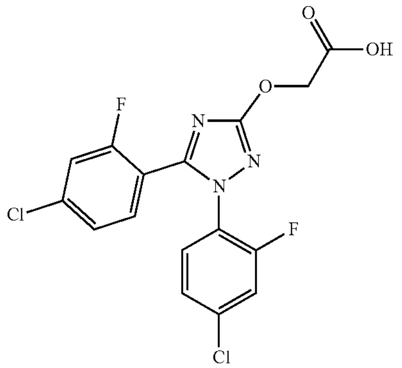 [SMILES: O=C(O)COc1nc(-c2ccc(Cl)cc2F)n(-c2ccc(Cl)cc2F)n1] |
| A3 | methyl {[5-(4-chloro-2-fluorophenyl)-1-(2,4-difluorophenyl)-1H-1,2,4-triazol-3-yl]oxy}acetate | 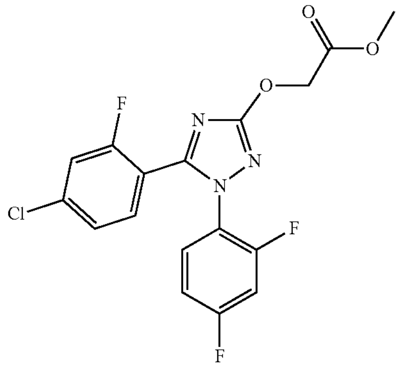 [SMILES: COC(=O)COc1nc(-c2ccc(Cl)cc2F)n(-c2ccc(F)cc2F)n1] |
| A4 | {[5-(4-chloro-2-fluorophenyl)-1-(2,4-difluorophenyl)-1H-1,2,4-triazol-3-yl]oxy}acetic acid | 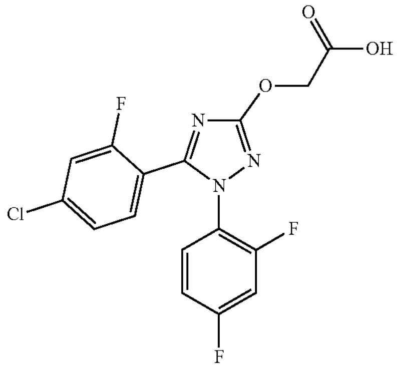 [SMILES: O=C(O)COc1nc(-c2ccc(Cl)cc2F)n(-c2ccc(F)cc2F)n1] |

TABLE 1-continued

IUPAC names and the structural formulae of the preferred compounds of the formula (I) (safener (A))

| Compound No. | IUPAC name | Structural formula |
| --- | --- | --- |
| A5 | methyl {[1-(4-chloro-2-fluorophenyl)-5-(2,4-difluorophenyl)-1H-1,2,4-triazol-3-yl]oxy}acetate | 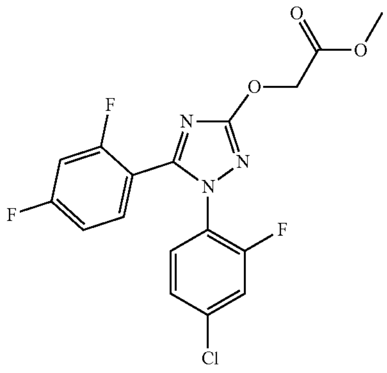 [SMILES: COC(=O)COc1nc(-c2ccc(F)cc2F)n(-c2ccc(Cl)cc2F)n1] |
| A6 | {[1-(4-chloro-2-fluorophenyl)-5-(2,4-difluorophenyl)-1H-1,2,4-triazol-3-yl]oxy}acetic acid | 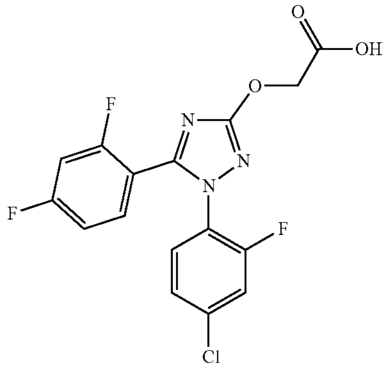 [SMILES: O=C(O)COc1nc(-c2ccc(F)cc2F)n(-c2ccc(Cl)cc2F)n1] |

The compounds of the formula (I) are known from the international application with application number PCT/EP2020/083167 (WO2021/105101) and can be prepared by the processes described therein.

The application rates of the herbicides (B) are in the range from 1 to 4000 g of active substance per hectare (g a.i./ha hereinafter), preferably 2 to 4000 g a.i./ha, especially 5 to 4000 g a.i./ha, and that of the safeners (A) in the range from 1 to 1000 g a.i./ha, preferably 10 to 500 g a.i./ha, especially of 20 to 200 g a.i./ha, of active substance.

Particularly preferred safeners (A) in the context of the present invention are the compounds numbered A1, A3 and A5, according to the above table 1.

Suitable combination partners (B) [=component (B) or herbicides (B)] are in principle all active ingredients from subgroups (B1) to (B11), where the herbicidal active ingredients are largely named by the common name (in the English notation) according to the reference "The Pesticide Manual" 14th Ed., British Crop Protection Council 2006, abbreviated to "PM", or the chemical name according to the standard nomenclatures (IUPAC or Chemical Abstracts).

However, some herbicides (B) have surprisingly been found to be particularly good combination partners for the safeners (A). The preferred and more preferred herbicides (B) are listed hereinafter as further embodiments of the present invention.

In a second embodiment of the present invention, the active herbicidal ingredients (B1) are preferably:

| | |
| --- | --- |
| (B1.2) | bicyclopyrone, |
| (B1.4) | clethodim, |
| (B1.7) | mesotrione, |
| (B1.8) | pinoxaden, |
| (B1.10) | sethoxydim, |
| (B1.11) | sulcotrione, |
| (B1.14) | tembotrione, |
| (B1.16) | tralkoxydim. |

Particularly preferred active herbicidal ingredients from group B1 are

| | |
| --- | --- |
| (B1.2) | bicyclopyrone, |
| (B1.4) | clethodim, |
| (B1.8) | pinoxaden |

In a third embodiment of the present invention, the active herbicidal ingredients (B2) are preferably:

| | |
| --- | --- |
| (B2.1) | acetochlor, |
| (B2.4) | asulam, |
| (B2.6) | beflubutamid, |
| (B2.10) | chlorimuron, |

-continued

| | |
|---|---|
| (B2.12) | chlorsulfuron, |
| (B2.14) | cloransulam, |
| (B2.17) | diclosulam, |
| (B2.18) | diflufenican, |
| (B2.20) | dimethenamid, |
| (B2.23) | ethoxysulfuron, |
| (B2.24) | flazasulfuron, |
| (B2.25) | florasulam, |
| (B2.26) | flucarbazone, |
| (B2.28) | flufenacet, |
| (B2.29) | flumetsulam, |
| (B2.30) | flupyrsulfuron, |
| (B2.31) | foramsulfuron, |
| (B2.34) | iodosulfuron, |
| (B2.37) | mesosulfuron, |
| (B2.38) | metazachlor, |
| (B2.40) | metolachlor, |
| (B2.41) | metosulam, |
| (B2.42) | metsulfuron, |
| (B2.43) | nicosulfuron, |
| (B2.46) | penoxsulam, |
| (B2.49) | picolinafen, |
| (B2.56) | propoxycarbazone, |
| (B2.59) | prosulfocarb, |
| (B2.60) | prosulfuron, |
| (B2.62) | pyroxsulam, |
| (B2.63) | rimsulfuron, |
| (B2.64) | S-metolachlor, |
| (B2.65) | sulfometuron, |
| (B2.66) | sulfosulfuron, |
| (B2.68) | thiencarbazone, |
| (B2.69) | thifensulfuron, |
| (B2.72) | tribenuron, |
| (B2.76) | esprocarb, |
| (B2.78) | tri-allate, |
| (B2.79) | methyl rel-(2R,4R)-4-[[3-(3,5-dichlorophenyl)-5-methoxy-4H-isoxazole-5-carbonyl]amino]tetrahydrofuran-2-carboxylate, |
| (B2.80) | methyl rel-(2R,4R)-4-[[3-(3,5-dichlorophenyl)-5-vinyl-4H-isoxazole-5-carbonyl]amino]tetrahydrofuran-2-carboxylate, |
| (B2.81) | methyl (2R*,4R*)-4-[[(5S)-3-(3,5-difluorophenyl)-5-vinyl-4H-isoxazole-5-carbonyl]amino]tetrahydrofuran-2-carboxylate, |
| (B2.82) | isopropyl rel-(2R,4R)-4-[[3-(3-fluorophenyl)-5-methyl-4H-isoxazole-5-carbonyl]amino]tetrahydrofuran-2-carboxylate, |
| (B2.83) | methyl (3R)-3-[[(5S)-3-(3,5-difluorophenyl)-5-vinyl-4H-isoxazole-5-carbonyl]amino]-2,3-dihydrofuran-5-carboxylate, |
| (B2.84) | methyl (3R)-3-[[(5R)-3-(3,5-difluorophenyl)-5-methyl-4H-isoxazole-5-carbonyl]amino]-2,3-dihydrofuran-5-carboxylate, |
| (B2.85) | methyl (1S,4R)-4-[[[(5S)-3-(3,5-difluorophenyl)-5-vinyl-4H-1,2-oxazol-5-yl]carbonyl]amino]cyclopent-2-ene-1-carboxylate, |
| (B2.86) | ethyl (1S,4R)-4-[[[3-(3,5-difluorophenyl)-5-methoxy-4H-1,2-oxazol-5-yl]carbonyl]amino]cyclopent-2-ene-1-carboxylate, |
| (B2.87) | 2-methoxyethyl (1S,4R)-4-[[[(5R)-3-(3-cyano-5-fluorophenyl)-5-(trifluoromethyl)-4H-1,2-oxazol-5-yl]carbonyl]amino]cyclopent-2-ene-1-carboxylate, |
| (B2.88) | methyl (4S)-4-[[[3-(3,5-difluorophenyl)-5-methyl-4H-1,2-oxazol-5-yl]carbonyl]amino]cyclopentene-1-carboxylate, |
| (B2.89) | methyl (3S)-3-[[[(5R)-3-(3,5-difluorophenyl)-5-methyl-4H-1,2-oxazol-5-yl]carbonyl]amino]cyclopentene-1-carboxylate, |
| (B2.90) | 3-(3,5-difluorophenyl)-N-[(1R,4S)-4-(oxazinan-2-ylcarbonyl)cyclopent-2-en-1-yl]-5-(trifluoromethyl)-4H-1,2-oxazole-5-carboxamide, |
| (B2.91) | 3-(3,5-difluorophenyl)-N-[(1R,4S)-4-[(propylsulfonylamino)carbonyl]cyclopent-2-en-1-yl]-5-(trifluoromethyl)-4H-1,2-oxazole-5-carboxamide, |
| (B2.92) | (1S,4R)-4-[[(5R)-3-(3,5-difluorophenyl)-5-methyl-4H-isoxazole-5-carbonyl]amino]cyclopent-2-ene-1-carboxylic acid, |

Particularly preferred active herbicidal ingredients from group B2 are

| | |
|---|---|
| (B2.18) | diflufenican, |
| (B2.28) | flufenacet, |
| (B2.34) | iodosulfuron, |
| (B2.37) | mesosulfuron, |
| (B2.38) | metazachlor |

-continued

| | |
|---|---|
| (B2.68) | thiencarbazone, |
| (B2.81) | methyl (2R*,4R*)-4-[[(5S)-3-(3,5-difluorophenyl)-5-vinyl-4H-isoxazole-5-carbonyl]amino]tetrahydrofuran-2-carboxylate, |
| (B2.85) | methyl (1S,4R)-4-[[[(5S)-3-(3,5-difluorophenyl)-5-vinyl-4H-1,2-oxazol-5-yl]carbonyl]amino]cyclopent-2-ene-1-carboxylate, |
| (B2.92) | (1S,4R)-4-[[(5R)-3-(3,5-difluorophenyl)-5-methyl-4H-isoxazole-5-carbonyl]amino]cyclopent-2-ene-1-carboxylic acid. |

In a fourth embodiment of the present invention, the active herbicidal ingredients (B3) are preferably:

(B3.1) bromoxynil.

In a fifth embodiment of the present invention, the active herbicidal ingredients (B4) are preferably:

| | |
|---|---|
| (B4.2) | amitrole, |
| (B4.8) | carfentrazone, |
| (B4.10) | imazamethabenz, |
| (B4.11) | imazamox, |
| (B4.12) | imazapic, |
| (B4.13) | imazapyr, |
| (B4.15) | imazethapyr, |
| (B4.17) | isoxaben, |
| (B4.18) | isoxaflutole, |
| (B4.20) | oxadiazon, |
| (B4.21) | pyraflufen, |
| (B4.22) | pyrasulfotole, |
| (B4.25) | pyroxasulfone, |
| (B4.26) | sulfentrazone, |
| (B4.27) | tolpyralate, |
| (B4.28) | topramezone and |
| (B4.33) | flupoxam. |

Particularly preferred active herbicidal ingredients from group B4 are

| | |
|---|---|
| (B4.21) | pyraflufen, |
| (B4.22) | pyrasulfotole, |
| (B4.25) | pyroxasulfone, |
| (B4.26) | sulfentrazone, |
| (B4.28) | topramezone. |

In a sixth embodiment of the present invention, the active herbicidal ingredients (B5) are preferably:

| | |
|---|---|
| (B5.1) | aminocyclopyrachlor, |
| (B5.2) | aminopyralid, |
| (B5.3) | benazolin, |
| (B5.5) | bentazone, |
| (B5.7) | bixlozone, |
| (B5.12) | cinidon, |
| (B5.13) | cinmethylin, |
| (B5.14) | clomazone, |
| (B5.21) | ethofumesate, |
| (B5.22) | flamprop, |
| (B5.23) | florpyrauxifen, |
| (B5.26) | flumioxazin, |
| (B5.27) | fluridone, |
| (B5.28) | flurochloridone, |
| (B5.29) | flurtamone, |
| (B5.30) | fluthiacet-methyl, |
| (B5.31) | halauxifen, |
| (B5.32) | indanofan, |
| (B5.37) | paraquat, |
| (B5.38) | pelargonic acid, |
| (B5.39) | pendimethalin, |
| (B5.45) | triafamone, |
| (B5.46) | trifluralin, |
| (B5.47) | 4-amino-3-chloro-5-fluoro-6-(7-fluoro-1H-indol-6-yl)pyridine-2-carboxylic acid, |

-continued

| | |
|---|---|
| (B5.48) | cyclopyrimorate, |
| (B5.49) | diquat, |
| (B5.50) | oxaziclomefone. |
| (B5.54) | 4-hydroxy-1-methyl-3-[4-(trifluoromethyl)-2-pyridinyl]-2-imidazolidinone |

Particularly preferred active herbicidal ingredients from group B5 are

| | |
|---|---|
| (B5.7) | bixlozone, |
| (B5.13) | cinmethylin, |
| (B5.21) | ethofumesate, |
| (B5.26) | flumioxazin, |
| (B5.31) | halauxifen, |
| (B5.46) | trifluralin. |

In a seventh embodiment of the present invention, the active herbicidal ingredients (B6) are preferably:

| | |
|---|---|
| (B6.2) | clopyralid, |
| (B6.3) | dicamba, |
| (B6.4) | fluroxypyr, |
| (B6.5) | picloram. |

A particularly preferred active herbicidal ingredient from group B6 is

| | |
|---|---|
| (B6.3) | dicamba, |
| (B6.4) | fluroxypyr, |
| (B6.5) | picloram. |

In an eighth embodiment of the present invention, the active herbicidal ingredients (B7) are preferably:

| | |
|---|---|
| (B7.2) | bialaphos, |
| (B7.4) | glufosinate, |
| (B7.5) | glyphosate, |
| (B7.7) | sulfosate |

Particularly preferred active herbicidal ingredients from group B7 are

| | |
|---|---|
| (B7.5) | glyphosate, |

In a ninth embodiment of the present invention, the active herbicidal ingredients (B8) are preferably:

| | |
|---|---|
| (B8.1) | 2,4-D, |
| (B8.2) | 2,4-DB, |
| (B8.3) | 2,4-DP, |
| (B8.4) | acifluorfen, |
| (B8.5) | aclonifen, |
| (B8.6) | bifenox, |
| (B8.8) | clodinafop, |
| (B8.11) | diclofop, |
| (B8.13) | fenoxaprop, |
| (B8.16) | fomesafen, |
| (B8.19) | lactofen, |
| (B8.20) | MCPA, |
| (B8.22) | mecoprop, |

-continued

| | |
|---|---|
| (B8.24) | oxyfluorfen, |
| (B8.26) | quizalofop, |
| (B8.27) | quizalofop-p, |

Particularly preferred active herbicidal ingredients from group B8 are

| | |
|---|---|
| (B8.1) | 2,4-D, |
| (B8.5) | aclonifen, |
| (B8.6) | bifenox, |
| (B8.13) | fenoxaprop, |
| (B8.20) | MCPA, |
| (B8.27) | quizalofop-p, |

In a tenth embodiment of the present invention, the active herbicidal ingredients (B9) are preferably:

| | |
|---|---|
| (B9.3) | butafenacil, |
| (B9.10) | saflufenacil, |
| (B9.11) | terbacil, |
| (B9.12) | tiafenacil, |
| (B9.13) | trifludimoxazin, |
| (B9.14) | ethyl [3-[2-chloro-4-fluoro-5-(1-methyl-6-trifluoromethyl-2,4-dioxo-1,2,3,4-tetrahydropyrimidin-3-yl)phenoxy]-2-pyridyloxylacetate |

Particularly preferred active herbicidal ingredients from group B9 are

| | |
|---|---|
| (B9.10) | saflufenacil, |
| (B9.12) | tiafenacil, |
| (B9.13) | trifludimoxazin, |

In an eleventh embodiment of the present invention, the active herbicidal ingredients (B10) are preferably:

| | |
|---|---|
| (B10.1) | chlorobromuron, |
| (B10.2) | chlorotoluron, |
| (B10.5) | diuron, |
| (B10.8) | isoproturon, |
| (B10.9) | linuron, |
| (B10.10) | methabenzthiazuron, |
| (B10.11) | metobromuron, |
| (B10.12) | metoxuron, |
| (B10.13) | monolinuron. |

Particularly preferred active herbicidal ingredients from group B10 are

| | |
|---|---|
| (B10.2) | chlorotoluron, |
| (B10.8) | isoproturon |

In a twelfth embodiment of the present invention, the active herbicidal ingredients (B11) are preferably:

| | |
|---|---|
| (B11.1) | ametryne, |
| (B11.2) | atrazine, |
| (B11.5) | hexazinone, |
| (B11.6) | indaziflam, |
| (B11.8) | metribuzin, |

-continued

| | |
|---|---|
| (B11.12) | simazine, |
| (B11.15) | terbuthylazine, |
| (B11.16) | terbutryne. |

Particularly preferred active herbicidal ingredients from group B11 are

| | |
|---|---|
| (B11.8) | metribuzin. |

In the context of the present invention, it is possible to combine the individual preferred and more preferred embodiments with one another as desired. This means that herbicidal compositions comprising safeners (A) one or more compounds of the general formula (I) or agrochemically acceptable salts thereof [component (A)] and (B) one or more herbicides [component (B)] selected from the group of the active herbicidal ingredients (B1) to (B11) are encompassed by the present invention, in which any desired preferred and more preferred embodiments disclosed can be combined with one another as detailed above.

Some binary combinations comprising a compound (A) of the general formula (I), or agrochemically compatible salts thereof, which acts as safener [safener (A)], and a herbicide (B) have been found to be particularly advantageous in a manner that was surprising at the filing date.

These are shown in table 1 below.

TABLE 1

| Safener (A) | Herbicide (B) |
|---|---|
| A3 | B1.2 (bicyclopyrone) |
| A1 | B1.8 (pinoxaden) |
| A3 | B1.8 (pinoxaden) |
| A5 | B1.8 (pinoxaden) |
| A3 | B2.28 (flufenacet) |
| A3 | B2.34 (iodosulfuron) |
| A3 | B2.38 (metazachlor) |
| A1 | B2.68 (thiencarbazone-methyl) |
| A3 | B2.68 (thiencarbazone-methyl) |
| A5 | B2.68 (thiencarbazone-methyl) |
| A1 | B2.81 |
| A3 | B2.81 |
| A5 | B2.81 |
| A1 | B2.85 |
| A3 | B2.85 |
| A5 | B2.85 |
| A1 | B2.92 |
| A3 | B2.92 |
| A5 | B2.92 |
| A3 | B4.28 (topramezone) |
| A3 | B5.13 (cinmethylin) |
| A1 | B5.14 (clomazone) |
| A3 | B5.14 (clomazone) |
| A5 | B5.14 (clomazone) |
| A1 | B5.21 (ethofumesate) |
| A3 | B5.21 (ethofumesate) |
| A5 | B5.21 (ethofumesate) |
| A3 | B5.26 (flumioxazin) |
| A1 | B6.4 (fluroxypyr) |
| A3 | B6.4 (fluroxypyr) |
| A5 | B6.4 (fluroxypyr) |
| A3 | B6.5 (picloram) |
| A3 | B7.5 (glyphosate) |
| A3 | B8.6 (bifenox) |
| A1 | B9.10 (saflufenacil) |
| A5 | B9.10 (saflufenacil) |

The following binary herbicide/safener combinations may thus be specified as being advantageous:

A1+B1.2, A1+B1.4, A1+B1.8, A1+B2.18, A1+B2.28, A1+B2.34, A1+B2.37, A1+B2.68, A1+B2.81, A1+B2.85, A1+B2.92, A1+B3.1, A1+B4.21, A1+B4.22, A1+B4.25, A1+B4.26, A1+B5.7, A1+B5.13, A1+B5.21, A1+B5.31, A1+B5.46, A1+B6.3, A1+B6.4, A1+B8.1, A1+B8.5, A1+B8.13, A1+B8.20, A1+B8.27, A1+B9.10, A1+B9.12, A1+B9.13, A1+B10.2, A1+B10.8, A1+B11.8,

A3+B1.2, A3+B1.4, A3+B1.8, A3+B2.18, A3+B2.28, A3+B2.34, A3+B2.37, A3+B2.38, A3+B2.68, A3+B2.81, A3+B2.85, A3+B2.92, A3+B3.1, A3+B4.21, A3+B4.22, A3+B4.25, A3+B4.26, A3+B4.28, A3+B5.7, A3+B5.13, A3+B5.21, A3+B5.26, A3+B5.31, A3+B5.46, A3+B6.3, A3+B6.4, A3+B6.5, A3+B7.5, A3+B8.1, A3+B8.5, A3+B8.6, A3+B8.13, A3+B8.20, A3+B8.27, A3+B9.10, A3+B9.12, A3+B9.13, A3+B10.2, A3+B10.8, A3+B11.8,

A5+B1.2, A5+B1.4, A5+B1.8, A5+B2.18, A5+B2.28, A5+B2.34, A5+B2.37, A5+B2.68, A5+B2.81, A5+B2.85, A5+B2.92, A5+B3.1, A5+B4.21, A5+B4.22, A5+B4.25, A5+B4.26, A5+B5.7, A5+B5.13, A5+B5.21, A5+B5.31, A5+B5.46, A5+B6.3, A5+B6.4, A5+B8.1, A5+B8.5, A5+B8.13, A5+B8.20, A5+B8.27, A5+B9.10, A5+B9.12, A5+B9.13, A5+B10.2, A5+B10.8, A5+B11.8.

Higher-order herbicide/safener combinations composed of the aforementioned binary combinations are likewise possible in accordance with the invention, for example by use of the same safener and the blending of two binary combinations mentioned hereinafter in association with that particular safener, for example A3+B2.81+B2.68, or A3+B2.81+B2.68+B9.10.

Furthermore, the herbicide/safener combinations of the invention can be used together with other active ingredients such as fungicides, insecticides, acaricides etc. and/or plant growth regulators or auxiliaries from the group of additives customary in crop protection, such as adjuvants and formulation aids. Their use forms such as formulations or tank-mixes are herbicidal products (compositions).

The invention therefore also provides the herbicide/safener combinations comprising the additives customary in crop protection, such as adjuvants and formulation aids, and optionally further active crop protection ingredients.

The invention also provides for the use of, or the application method using, the herbicide/safener combinations of the invention as herbicides and plant growth regulators, preferably as herbicides and plant growth regulators having a synergistically active content of the respective herbicide combination present.

For the active ingredients from group (B1), the application rate is preferably in the range of 5 to 250 g a.i./ha, especially in the range of 5 to 150 g/ha and most preferably in the range of 5 to 60 g a.i./ha.

For the active ingredients from group (B2), the application rate is preferably in the range of 1 to 4000 g a.i./ha, especially in the range of 1 to 2000 g a.i./ha and most preferably in the range of 1 to 400 g a.i./ha.

For the active ingredient from group (B3), the application rate is preferably in the range of 10 to 1000 g a.i./ha, especially in the range of 10 to 500 g a.i./ha and most preferably in the range of 10 to 300 g a.i./ha.

For the active ingredient from group (B4), the application rate is preferably in the range of 1 to 700 g a.i./ha, especially in the range of 1 to 400 g a.i./ha and most preferably in the range of 1 to 200 g a.i./ha.

For the active ingredient from group (B5), excluding pelargonic acid (B5.38), the application rate is preferably in the range of 1 to 2400 g a.i./ha, especially in the range of 1 to 1200 g a.i./ha and most preferably in the range of 1 to 400 g a.i./ha. For pelargonic acid (B5.38), the application rate is preferably 1 to 100 000 g a.i./ha, more preferably 1 to 40 000 g a.i./ha and especially in the range from 1 to 30 000 g a.i./ha.

For the active ingredient from group (B6), the application rate is preferably in the range of 10 to 1000 g a.i./ha, especially in the range of 10 to 600 g a.i./ha.

For the active ingredient from group (B7), the application rate is preferably in the range of 20 to 3500 g a.i./ha, especially in the range of 20 to 2500 g a.i./ha and most preferably in the range of 20 to 2000 g a.i./ha.

For the active ingredient from group (B8), the application rate is preferably in the range of 5 to 1500 g a.i./ha, especially in the range of 5 to 1000 g a.i./ha and most preferably in the range of 5 to 900 g a.i./ha.

For the active ingredient from group (B9), the application rate is preferably in the range of 2 to 2000 g a.i./ha, especially in the range of 2 to 1000 g a.i./ha, more preferably in the range of 2 to 200 g a.i./ha and most preferably in the range of 2 to 50 g a.i./ha.

For the active ingredient from group (B10), the application rate is preferably in the range of 20 to 3500 g a.i./ha, especially in the range of 20 to 2000 g a.i./ha.

For the active ingredient from group (B11), the application rate is preferably in the range of 25 to 3000 g a.i./ha, especially in the range of 25 to 2500 g a.i./ha and most preferably in the range of 25 to 2000 g a.i./ha.

The ratios of (A):(B) based on weight, depending on the effective application rates, are generally in the range of 1:400 to 500:1, preferably in the range from 1:100 to 100:1, more preferably in the range of 1:40 to 20:1.

The stated amounts are application rates (g a.i./ha=grams of active substance per hectare) and hence also define the ratios in a co-formulation, a premix, a tankmix or a sequential application of the combined active ingredients.

The herbicide/safener combinations of the invention may comprise further components, for example other active ingredients against harmful organisms such as harmful plants, plant-damaging animals or plant-damaging fungi, in this case especially active ingredients from the group of the fungicides, insecticides, acaricides, nematicides, miticides and related substances.

Fungicidally active compounds that can be used in conjunction with the herbicide/safener combinations of the invention are preferably standard commercial active ingredients, for example (analogously to the herbicides, the compounds are generally named by their common names):

1) Inhibitors of ergosterol biosynthesis, for example cyproconazole, difenoconazole, epoxiconazole, fenhexamid, fenpropidin, fenpropimorph, fenpyrazamin, fluquinconazole, flutriafol, imazalil, imazalil sulfate, ipconazole, metconazole, myclobutanil, paclobutrazole, prochloraz, propiconazole, prothioconazole, pyrisoxazole, spiroxamine, tebuconazole, tetraconazole, triadimenol, tridemorph, triticonazole, (1R,2S,5S)-5-(4-chlorobenzyl)-2-(chloromethyl)-2-methyl-1-(1H-1,2,4-triazol-1-ylmethyl)cyclopentanol, (1S,2R,5R)-5-(4-chlorobenzyl)-2-(chloromethyl)-2-methyl-1-(1H-1,2,4-triazol-1-ylmethyl)cyclopentanol, (2R)-2-(1-chlorocyclopropyl)-4-[(1R)-2,2-dichlorcyclopropyl]-1-(1H-1,2,4-triazol-1-yl)butan-2-ol, (2R)-2-(1-chlorocyclopropyl)-4-[(1S)-2,2-dichlorcyclopropyl]-1-(1H-1,2,4-triazol-1-yl)butan-2-ol, (2R)-2-[4-(4-chlorophenoxy)-2-(trifluoromethyl)phenyl]-1-(1H-1,2,4-triazol-1-yl)propan-2-ol, (2S)-2-(1-chlorocyclopropyl)-4-[(1R)-2,2-dichlorcyclopropyl]-1-(1H-1,2,4-triazol-1-yl)butan-2-ol, (2S)-2-(1-chlorocyclopropyl)-4-[(1S)-2,2-dichlorcyclopropyl]-1-(1H-1,2,4-triazol-1-yl)butan-2-ol, (2S)-2-[4-(4-chlorophenoxy)-2-(trifluoromethyl)phenyl]-1-(1H-1,2,4-triazol-1-yl)propan-2-ol, (R)-[3-(4-chloro-2-fluorophenyl)-5-(2,4-difluorophenyl)-1,2-oxazol-4-yl](pyridin-3-yl)methanol, (S)-[3-(4-chloro-2-fluorophenyl)-5-(2,4-difluorophenyl)-1,2-oxazol-4-yl](pyridin-3-yl)methanol, [3-(4-chloro-2-fluorophenyl)-5-(2,4-difluorophenyl)-1,2-oxazol-4-yl](pyridin-3-yl)methanol, 1-({(2R,4S)-2-[2-chloro-4-(4-chlorophenoxy)phenyl]-4-methyl-1,3-dioxolan-2-yl}methyl)-1H-1,2,4-triazole, 1-({(2S,4S)-2-[2-chloro-4-(4-chlorophenoxy)phenyl]-4-methyl-1,3-dioxolan-2-yl}methyl)-1H-1,2,4-triazole, 1-{[3-(2-chlorophenyl)-2-(2,4-difluorophenyl)oxiran-2-yl]methyl}-1H-1,2,4-triazol-5-yl thiocyanate, 1-{[rel(2R,3R)-3-(2-chlorophenyl)-2-(2,4-difluorophenyl)oxiran-2-yl]methyl}-1H-1,2,4-triazol-5-yl thiocyanate, 1-{[rel(2R,3S)-3-(2-chlorophenyl)-2-(2,4-difluorophenyl)oxiran-2-yl]methyl}-1H-1,2,4-triazol-5-yl thiocyanate, 2-[(2R,4R,5R)-1-(2,4-dichlorophenyl)-5-hydroxy-2,6,6-trimethylheptan-4-yl]-2,4-dihydro-3H-1,2,4-triazole-3-thione, 2-[(2R,4R,5S)-1-(2,4-dichlorophenyl)-5-hydroxy-2,6,6-trimethylheptan-4-yl]-2,4-dihydro-3H-1,2,4-triazole-3-thione, 2-[(2R,4S,5R)-1-(2,4-dichlorophenyl)-5-hydroxy-2,6,6-trimethylheptan-4-yl]-2,4-dihydro-3H-1,2,4-triazole-3-thione, 2-[(2R,4S,5S)-1-(2,4-dichlorophenyl)-5-hydroxy-2,6,6-trimethylheptan-4-yl]-2,4-dihydro-3H-1,2,4-triazole-3-thione, 2-[(2S,4R,5R)-1-(2,4-dichlorophenyl)-5-hydroxy-2,6,6-trimethylheptan-4-yl]-2,4-dihydro-3H-1,2,4-triazole-3-thione, 2-[(2S,4R,5S)-1-(2,4-dichlorophenyl)-5-hydroxy-2,6,6-trimethylheptan-4-yl]-2,4-dihydro-3H-1,2,4-triazole-3-thione, 2-[(2S,4S,5R)-1-(2,4-dichlorophenyl)-5-hydroxy-2,6,6-trimethylheptan-4-yl]-2,4-dihydro-3H-1,2,4-triazole-3-thione, 2-[(2S,4S,5S)-1-(2,4-dichlorophenyl)-5-hydroxy-2,6,6-trimethylheptan-4-yl]-2,4-dihydro-3H-1,2,4-triazole-3-thione, 2-[1-(2,4-dichlorophenyl)-5-hydroxy-2,6,6-trimethylheptan-4-yl]-2,4-dihydro-3H-1,2,4-triazole-3-thione, 2-[2-chloro-4-(2,4-dichlorophenoxy)phenyl]-1-(1H-1,2,4-triazol-1-yl)propan-2-ol, 2-[2-chloro-4-(4-chlorophenoxy)phenyl]-1-(1H-1,2,4-triazol-1-yl)butan-2-ol, 2-[4-(4-chlorophenoxy)-2-(trifluoromethyl)-phenyl]-1-(1H-1,2,4-triazol-1-yl)butan-2-ol, 2-[4-(4-chlorophenoxy)-2-(trifluoromethyl)phenyl]-1-(1H-1,2,4-triazol-1-yl)pentan-2-ol, 2-[4-(4-chlorophenoxy)-2-(trifluoromethyl)phenyl]-1-(1H-1,2,4-triazol-1-yl)propan-2-ol, 2-{[3-(2-chlorophenyl)-2-(2,4-difluorophenyl)oxiran-2-yl]methyl}-2,4-dihydro-3H-1,2,4-triazole-3-thione, 2-{[rel(2R,3R)-3-(2-chlorophenyl)-2-(2,4-difluorophenyl)oxiran-2-yl]methyl}-2,4-dihydro-3H-1,2,4-triazole-3-thione, 2-{[rel(2R,3S)-3-(2-chlorophenyl)-2-(2,4-difluorophenyl)oxiran-2-yl]methyl}-2,4-dihydro-3H-1,2,4-triazole-3-thione, 5-(4-chlorobenzyl)-2-(chloromethyl)-2-methyl-1-(1H-1,2,4-triazol-1-ylmethyl)cyclopentanol, 5-(allylsulfanyl)-1-{[3-(2-chlorophenyl)-2-(2,4-difluorophenyl)oxiran-2-yl]methyl}-1H-1,2,4-triazole, 5-(allylsulfanyl)-1-{[rel(2R,3R)-3-(2-chlorophenyl)-2-(2,4-difluorophenyl)oxiran-2-yl]methyl}-1H-1,2,4-triazole, 5-(allylsulfanyl)-1-{[rel(2R,3S)-3-(2-chlorophenyl)-2-(2,4-difluorophenyl)oxiran-2-yl]methyl}-1H-1,2,4-triazole, N'-(2,5-dimethyl-4-{[3-(1,1,2,2-tetrafluoroethoxy)phenyl]sulfanyl}phenyl)-N-ethyl-N-methylimidoformamide, N'-(2,5-dimethyl-4-{[3-(2,2,2-trifluoroethoxy)phenyl]sulfanyl}phenyl)-N-ethyl-N-methylimidoformamide, N'-(2,5-dimethyl-4-{[3-(2,2,3,3-tetrafluoropropoxy)phenyl]sulfanyl}phenyl)-N-ethyl-N-methylimidoformamide, N'-(2,5-dimethyl-4-{[3-(pentafluoroethoxy)phenyl]sulfanyl}phenyl)-N-ethyl-N-methylimidoformamide, N'-(2,5-dimethyl-4-{3-[(1,1,2,2-tetrafluoroethyl)sulfanyl]phenoxy}phenyl)-N-ethyl-N-methylimidoformamide, N'-(2,5-dimethyl-4-{3-[(2,2,2-trifluoroethyl)sulfanyl]phenoxy}phenyl)-N-ethyl-N-methylimidoformamide, N'-(2,5-dimethyl-4-{3-[(2,2,3,3-tetrafluoropropyl)sulfanyl]phenoxy}phenyl)-N-ethyl-N-methylimidoformamide, N'-(2,5-dimethyl-4-{3-[(pentafluoroethyl)sulfanyl]phenoxy}phenyl)-N-ethyl-N-methylimidoformamide, N'-(2,5-dimethyl-4-phenoxyphenyl)-N-ethyl-N-methylimidoformamide, N'-(4-{[3-(difluoromethoxy)phenyl]sulfanyl}-2,5-dimethylphenyl)-N-ethyl-N-methylimidoformamide, N'-(4-{3-[(difluoromethyl)sulfanyl]phenoxy}-2,5-dimethylphenyl)-N-ethyl-N-methylimidoformamide, N'-[5-bromo-6-(2,3-dihydro-1H-inden-2-yloxy)-2-methylpyridin-3-yl]-N-ethyl-N-methylimidoformamide, N'-{4-[(4,5-dichloro-1,3-thiazol-2-yl)oxy]-2,5-dimethylphenyl}-N-ethyl-N-methylimidoformamide, N'-{5-bromo-6-[(1R)-1-(3,5-difluorophenyl)ethoxy]-2-methylpyridin-3-yl}-N-ethyl-N-methylimidoformamide, N'-{5-bromo-6-[(1S)-1-(3,5-difluorophenyl)ethoxy]-2-methylpyridin-3-yl}-N-ethyl-N-methylimidoformamide, N'-{5-bromo-6-[(cis-4-isopropylcyclohexyl)oxy]-2-methylpyridin-3-yl}-N-ethyl-N-methylimidoformamide, N'-{5-bromo-6-[(trans-4-isopropylcyclohexyl)oxy]-2-methylpyridin-3-yl}-N-ethyl-N-methylimidoformamide, N'-{5-bromo-6-[1-(3,5-difluorophenyl)ethoxy]-2-methylpyridin-3-yl}-N-ethyl-N-methylimidoformamide, mefentrifluconazole, ipfentrifluconazole.

2) Respiratory chain inhibitors acting on complex I or II, for example benzovindiflupyr, bixafen, boscalid, carboxin, fluopyram, flutolanil, fluxapyroxad, furametpyr, isofetamid, isopyrazam (anti-epimeric enantiomer 1R,4S,9S), isopyrazam (anti-epimeric enantiomer 1S,4R,9R), isopyrazam (anti-epimeric racemate 1RS,4SR,9SR), isopyrazam (mixture of the syn-epimeric racemate 1RS,4SR,9RS and the anti-epimeric racemate 1RS,4SR,9SR), isopyrazam (syn-epimeric enantiomer 1R,4S,9R), isopyrazam (syn-epimeric enantiomer 1S,4R,9S), isopyrazam (syn-epimeric racemate 1RS,4SR,9RS), penflufen, penthiopyrad, pydiflumetofen, pyraziflumid, sedaxane, 1,3-dimethyl-N-(1,1,3-trimethyl-2,3-dihydro-1H-inden-4-yl)-1H-pyrazole-4-carboxamide, 1,3-dimethyl-N-[(3R)-1,1,3-trimethyl-2,3-dihydro-1H-inden-4-yl]-1H-pyrazole-4-carboxamide, 1,3-dimethyl-N-[(3S)-1,1,3-trimethyl-2,3-dihydro-1H-inden-4-yl]-1H-pyrazole-4-carboxamide, 1-methyl-3-(trifluoromethyl)-N-[2'-(trifluoromethyl)biphenyl-2-yl]-1H-pyrazole-4-carboxamide, 2-fluoro-6-(trifluoromethyl)-N-(1,1,3-trimethyl-2,3-dihydro-1H-inden-4-yl)benzamide, 3-(difluoromethyl)-1-methyl-N-(1,1,3-trimethyl-2,3-dihydro-1H-inden-4-yl)-1H-pyrazole-4-carboxamide, 3-(difluoromethyl)-1-methyl-N-[(3R)-1,1,3-trimethyl-2,3-dihydro-1H-inden-4-yl]-1H-pyrazole-4-carboxamide, 3-(difluoromethyl)-1-methyl-N-[(3S)-1,1,3-trimethyl-2,3-dihydro-1H-inden-4-yl]-1H-pyrazole-4-carboxamide, 3-(difluoromethyl)-N-(7-fluoro-1,1,3-trimethyl-2,3-dihydro-1H-inden-4-yl)-1-methyl-1H-pyrazole-4-carboxamide, 3-(difluoromethyl)-N-[(3R)-7-fluoro-1,1,3-trimethyl-2,3-dihydro-1H-inden-4-yl]-1-methyl-1H-pyrazole-4-carboxamide, 3-(difluoromethyl)-N-[(3S)-7-fluoro-1,1,3-trimethyl-2,3-dihydro-1H-inden-4-yl]-1-methyl-1H-pyrazole-4-carboxamide, 5,8-difluoro-N-[2-(2-fluoro-4-{[4-(trifluoromethyl)pyridin-2-yl]oxy}phenyl)ethyl]quinazolin-4-amine, N-(2-cyclopentyl-5-fluorobenzyl)-N-cyclopropyl-3-(difluoromethyl)-5-fluoro-1-methyl-1H-pyrazole-4-carboxamide, N-(2-tert-butyl-5-methylbenzyl)-N-cyclopropyl-3-(difluoromethyl)-5-fluoro-1-methyl-1H-pyrazole-4-carboxamide, N-(2-tert-butylbenzyl)-N-cyclopropyl-3-(difluoromethyl)-5-fluoro-1-methyl-1H-pyrazole-4-carboxamide, N-(5-chloro-2-ethylbenzyl)-N-cyclopropyl-3-(difluoromethyl)-5-fluoro-1-methyl-1H-pyrazole-4-carboxamide, N-(5-chloro-2-isopropylbenzyl)-N-cyclopropyl-3-(difluoromethyl)-5-fluoro-1-methyl-1H-pyrazole-4-carboxamide, N-[(1R,4S)-9-(dichloromethylene)-1,2,3,4-tetrahydro-1,4-methanonaphthalen-5-yl]-3-(difluoromethyl)-1-methyl-1H-pyrazole-4-carboxamide, N-[(1S,4R)-9-(dichloromethylene)-1,2,3,4-tetrahydro-1,4-methanonaphthalen-5-yl]-3-(difluoromethyl)-1-methyl-1H-pyrazole-4-carboxamide, N-[1-(2,4-dichlorophenyl)-1-methoxypropan-2-yl]-3-(difluoromethyl)-1-methyl-1H-pyrazole-4-carboxamide, N-[2-chloro-6-(trifluoromethyl)benzyl]-N-cyclopropyl-3-(difluoromethyl)-5-fluoro-1-methyl-1H-pyrazole-4-carboxamide, N-[3-chloro-2-fluoro-6-(trifluoromethyl)benzyl]-N-cyclopropyl-3-(difluoromethyl)-5-fluoro-1-methyl-1H-pyrazole-4-carboxamide, N-[5-chloro-2-(trifluoromethyl)benzyl]-N-cyclopropyl-3-(difluoromethyl)-5-fluoro-1-methyl-1H-pyrazole-4-carboxamide, N-cyclopropyl-3-(difluoromethyl)-5-fluoro-1-methyl-N-[5-methyl-2-(trifluoromethyl)benzyl]-1H-pyrazole-4-carboxamide, N-cyclopropyl-3-(difluoromethyl)-5-fluoro-N-(2-fluoro-6-isopropylbenzyl)-1-methyl-1H-pyrazole-4-carboxamide, N-cyclopropyl-3-(difluoromethyl)-5-fluoro-N-(2-isopropyl-5-methylbenzyl)-1-methyl-1H-pyrazole-4-carboxamide, N-cyclopropyl-3-(difluoromethyl)-5-fluoro-N-(2-isopropylbenzyl)-1-methyl-1H-pyrazole-4-carbothioamide, N-cyclopropyl-3-(difluoromethyl)-5-fluoro-N-(2-isopropylbenzyl)-1-methyl-1H-pyrazole-4-carboxamide, N-cyclopropyl-3-(difluoromethyl)-5-fluoro-N-(5-fluoro-2-isopropylbenzyl)-1-methyl-1H-pyrazole-4-carboxamide, N-cyclopropyl-3-(difluoromethyl)-N-(2-ethyl-4,5-dimethylbenzyl)-5-fluoro-1-methyl-1H-pyrazole-4-carboxamide, N-cyclopropyl-3-(difluoromethyl)-N-(2-ethyl-5-fluorobenzyl)-5-fluoro-1-methyl-1H-pyrazole-4-carboxamide, N-cyclopropyl-3-(difluoromethyl)-N-(2-ethyl-5-methylbenzyl)-5-fluoro-1-methyl-1H-pyrazole-4-carboxamide, N-cyclopropyl-N-(2-cyclopropyl-5-fluorobenzyl)-3-(difluoromethyl)-5-fluoro-1-methyl-1H-pyrazole-4-carboxamide, N-cyclopropyl-N-(2-cyclopropyl-5-methylbenzyl)-3-(difluoromethyl)-5-fluoro-1-methyl-1H-pyrazole-4-carboxamide, N-cyclopropyl-N-(2-cyclopropylbenzyl)-3-(difluoromethyl)-5-fluoro-1-methyl-1H-pyrazole-4-carboxamide.

3) Respiratory chain inhibitors acting on complex III, for example ametoctradin, amisulbrom, azoxystrobin, coumethoxystrobin, coumoxystrobin, cyazofamid, dimoxystrobin, enoxastrobin, famoxadon, fenamidon, flufenoxystrobin, fluoxastrobin, kresoxim-methyl, metominostrobin, orysastrobin, picoxystrobin, pyraclostrobin, pyrametostrobin, pyraoxystrobin, trifloxystrobin (3.021), (2E)-2-{2-[{{[(1E)-1-(3-{[(E)-1-fluoro-2-phenylvinyl]oxy}phenyl)ethylidene] amino}oxy)methyl]phenyl}-2-(methoxyimino)-N-methylacetamide, (2E,3Z)-5-{[1-(4-chlorophenyl)-1H-pyrazol-3-yl]oxy}-2-(methoxyimino)-N,3-dimethylpent-3-enamide, (2R)-2-{2-[(2,5-dimethylphenoxy)methyl]phenyl}-2-methoxy-N-methylacetamide, (2S)-2-{2-[(2,5-dimethylphenoxy) methyl]phenyl}-2-methoxy-N-methylacetamide, (3S,6S,7R,8R)-8-benzyl-3-[({3-[(isobutyryloxy)methoxy]-4-methoxypyridin-2-yl}carbonyl)amino]-6-methyl-4,9-dioxo-1,5-dioxonan-7-yl 2-methylpropanoate, 2-{2-[(2,5-dimethylphenoxy)methyl]phenyl}-2-methoxy-N-methylacetamide, N-(3-ethyl-3,5,5-trimethylcyclohexyl)-3-formamido-2-hydroxybenzamide, (2E,3Z)-5-{[1-(4-chloro-2-fluorophenyl)-1H-pyrazol-3-yl]oxy}-2-(methoxyimino)-N,3-dimethylpent-3-enamide, methyl {5-[3-(2,4-dimethylphenyl)-1H-pyrazol-1-yl]-2-methylbenzyl}carbamate.

4) Mitosis and cell division inhibitors, for example carbendazim, diethofencarb, ethaboxam, fluopicolid, pencycuron, thiabendazole, thiophanate-methyl, zoxamide, 3-chloro-4-(2,6-difluorophenyl)-6-methyl-5-phenylpyridazine, 3-chloro-5-(4-chlorophenyl)-4-(2,6-difluorophenyl)-6-methylpyridazine, 3-chloro-5-(6-chloropyridin-3-yl)-6-methyl-4-(2,4,6-trifluorophenyl) pyridazine, 4-(2-bromo-4-fluorophenyl)-N-(2,6-difluorophenyl)-1,3-dimethyl-1H-pyrazol-5-amine, 4-(2-bromo-4-fluorophenyl)-N-(2-bromo-6-fluorophenyl)-1,3-dimethyl-1H-pyrazol-5-amine, 4-(2-bromo-4-fluorophenyl)-N-(2-bromophenyl)-1,3-dimethyl-1H-pyrazol-5-amine, 4-(2-bromo-4-fluorophenyl)-N-(2-chloro-6-fluorophenyl)-1,3-dimethyl-1H-pyrazol-5-amine, (4.016) 4-(2-bromo-4-fluorophenyl)-N-(2-chlorophenyl)-1,3-dimethyl-1H-pyrazol-5-amine, 4-(2-bromo-4-fluorophenyl)-N-(2-fluorophenyl)-1,3-dimethyl-1H-pyrazol-5-amine, 4-(2-chloro-4-fluorophenyl)-N-(2,6-difluorophenyl)-1,3-dimethyl-1H-pyrazol-5-amine, 4-(2-chloro-4-fluorophenyl)-N-(2-chloro-6-fluorophenyl)-1,3-dimethyl-1H-pyrazol-5-amine, 4-(2-chloro-4-fluorophenyl)-N-(2-chlorophenyl)-1,3-dimethyl-1H-pyrazol-5-amine, 4-(2-chloro-4-fluorophenyl)-N-(2-fluorophenyl)-1,3-dimethyl-1H-pyrazol-5-amine, 4-(4-chlorophenyl)-5-(2,6-difluorophenyl)-3,6-dimethylpyridazine, N-(2-bromo-6-fluorophenyl)-4-(2-chloro-4-fluorophenyl)-1,3-dimethyl-1H-pyrazol-5-amine, N-(2-bromophenyl)-4-(2-chloro-4-fluorophenyl)-1,3-dimethyl-1H-pyrazol-5-amine, N-(4-chloro-2,6-difluorophenyl)-4-(2-chloro-4-fluorophenyl)-1,3-dimethyl-1H-pyrazol-5-amine.

5) Compounds with multisite activity, for example Bordeaux mixture, captafol, captan, chlorthalonil, copper hydroxide, copper naphthenate, copper oxide, copper oxychloride, copper(2+) sulfate, dithianon, dodine, folpet, mancozeb, maneb, metiram, zinc metiram, copper oxine, propineb, sulfur and sulfur preparations including calcium polysulfide, thiram, zineb, ziram, 6-ethyl-5,7-dioxo-6,7-dihydro-5H-pyrrolo[3',4':5,6][1,4]dithiino[2,3-c][1,2]thiazole-3-carbonitrile.

6) Compounds capable of triggering host defence, for example acibenzolar-S-methyl, isotianil, probenazole, tiadinil.

7) Amino acid and/or protein biosynthesis inhibitors, for example cyprodinil, kasugamycin, kasugamycin hydrochloride hydrate, oxytetracycline, pyrimethanil, 3-(5-fluoro-3,3,4,4-tetramethyl-3,4-dihydroisoquinolin-1-yl)quinoline.

8) ATP production inhibitors, for example silthiofam.

9) Cell wall synthesis inhibitors, for example benthiavalicarb, dimethomorph, flumorph, iprovalicarb, mandipropamid, pyrimorph, valifenalate, (2E)-3-(4-tert-butylphenyl)-3-(2-chloropyridin-4-yl)-1-(morpholin-4-yl)prop-2-en-1-one, (2Z)-3-(4-tert-butylphenyl)-3-(2-chloropyridin-4-yl)-1-(morpholin-4-yl)prop-2-en-1-one.

10) Lipid and membrane synthesis inhibitors, for example propamocarb, propamocarb hydrochloride, tolclofos-methyl.

11) Melanin biosynthesis inhibitors, for example tricyclazole, 2,2,2-trifluoroethyl-{3-methyl-1-[(4-methylbenzoyl)amino]butan-2-yl}carbamate.

12) Nucleic acid synthesis inhibitors, for example benalaxyl, benalaxyl-M (kiralaxyl), metalaxyl, metalaxyl-M (mefenoxam).

13) Signal transduction inhibitors, for example fludioxonil, iprodione, procymidone, proquinazid, quinoxyfen, vinclozolin.

14) Compounds that can act as decouplers, for example fluazinam, meptyldinocap.

15) Further compounds, for example abscisic acid, benthiazole, bethoxazin, capsimycin, carvone, chinomethionat, cufraneb, cyflufenamid, cymoxanil, cyprosulfamide, flutianil, fosetyl-aluminium, fosetyl-calcium, fosetyl-sodium, methyl isothiocyanate, metrafenon, mildiomycin, natamycin, nickel dimethyldithiocarbamate, nitrothal-isopropyl, oxamocarb, oxathiapiprolin, oxyfenthiin, pentachlorophenol and salts, phosphonic acid and salts thereof, propamocarb-fosetylate, pyriofenone (chlazafenone), tebufloquin, tecloftalam, tolnifanide, 1-(4-{4-[(5R)-5-(2,6-difluorophenyl)-4,5-dihydro-1,2-oxazol-3-yl]-1,3-thiazol-2-yl}piperidin-1-yl)-2-[5-methyl-3-(trifluoromethyl)-1H-pyrazol-1-yl] ethanone, 1-(4-{4-[(5S)-5-(2,6-difluorophenyl)-4,5-dihydro-1,2-oxazol-3-yl]-1,3-thiazol-2-yl}piperidin-1-yl)-2-[5-methyl-3-(trifluoromethyl)-1H-pyrazol-1-yl] ethanone, 2-(6-benzylpyridin-2-yl)quinazoline, 2,6-dimethyl-1H,5H-[1,4]dithiino[2,3-c:5,6-c']dipyrrole-1,3,5,7(2H,6H)-tetrone, 2-[3,5-bis(difluoromethyl)-1H-pyrazol-1-yl]-1-[4-(4-{5-[2-(prop-2-yn-1-yloxy) phenyl]-4,5-dihydro-1,2-oxazol-3-yl}-1,3-thiazol-2-yl) piperidin-1-yl]ethanone, 2-[3,5-bis(difluoromethyl)-1H-pyrazol-1-yl]-1-[4-(4-{5-[2-chloro-6-(prop-2-yn-1-yloxy)phenyl]-4,5-dihydro-1,2-oxazol-3-yl}-1,3-thiazol-2-yl)piperidin-1-yl]ethanone, 2-[3,5-bis (difluoromethyl)-1H-pyrazol-1-yl]-1-[4-(4-{5-[2-fluoro-6-(prop-2-yn-1-yloxy)phenyl]-4,5-dihydro-1,2-oxazol-3-yl}-1,3-thiazol-2-yl)piperidin-1-yl]ethanone, 2-[6-(3-fluoro-4-methoxyphenyl)-5-methylpyridin-2-yl]quinazoline, 2-{(5R)-3-[2-(1-{[3,5-bis(difluoromethyl)-1H-pyrazol-1-yl]acetyl}piperidin-4-yl)-1,3-thiazol-4-yl]-4,5-dihydro-1,2-oxazol-5-yl}-3-chlorophenyl methanesulfonate, 2-{(5S)-3-[2-(1-{[3,5-bis(difluoromethyl)-1H-pyrazol-1-yl]acetyl}piperidin-4-yl)-1,3-thiazol-4-yl]-4,5-dihydro-1,2-oxazol-5-yl}-3-chlorophenyl methanesulfonate, 2-{2-[(7,8-difluoro-2-methylquinolin-3-yl)oxy]-6-fluorophenyl}propan-2-ol, 2-{2-fluoro-6-[(8-fluoro-2-methylquinolin-3-yl)oxy phenyl]}propan-2-ol, 2-{3-[2-(1-{[3,5-bis(difluoromethyl)-1H-pyrazol-1-yl]acetyl}piperidin-4-yl)-1,3-thiazol-4-yl]-4,5-dihydro-1,2-oxazol-5-yl}-3-chlorophenyl methanesulfonate, 2-{3-[2-(1-{[3,5-bis(difluoromethyl)-1H-pyrazol-1-yl]acetyl}piperidin-4-yl)-1,3-thiazol-4-yl]-4,5-dihydro-1,2-oxazol-5-yl}phenyl methanesulfonate, 2-phenylphenol and salts thereof, 3-(4,4,5-trifluoro-3,3-dimethyl-3,4-dihydroisoquinolin-1-yl)quinoline, 3-(4,4-difluoro-3,3-dimethyl-3,4-dihydroisoquinolin-1-yl)quinoline, 4-amino-5-fluoropyrimidin-2-ol (tautomeric form: 4-amino-5-fluoropyrimidin-2(1H)-one), 4-oxo-4-[(2-phenylethyl)amino]butyric acid, 5-amino-1,3,4-thiadiazole-2-thiol, 5-chloro-N'-phenyl-N'-(prop-2-yn-1-yl) thiophene 2-sulfonohydrazide, 5-fluoro-2-[(4-fluorobenzyl)oxy]pyrimidin-4-amine, 5-fluoro-2-[(4-methylbenzyl)oxy]pyrimidin-4-amine, 9-fluoro-2,2-dimethyl-5-(quinolin-3-yl)-2,3-dihydro-1,4-benzoxazepine, but-3-yn-1-yl {6-[{{[(Z)-(1-methyl-1H-tetrazol-5-yl)(phenyl)methylene]amino}oxy) methyl]pyridin-2-yl}carbamate, ethyl (2Z)-3-amino-2-cyano-3-phenylacrylate, phenazine-1-carboxylic acid, propyl 3,4,5-trihydroxybenzoate, quinolin-8-ol, quinolin-8-ol sulfate (2:1), tert-butyl {6-[({[(1-methyl-1H-tetrazol-5-yl)(phenyl)methylene]amino}oxy)methyl] pyridin-2-yl}carbamate, 5-fluoro-4-imino-3-methyl-1) sulfonyl]-3,4-dihydropyrimidin-2(1H)-one.

Preferred fungicides are selected from the group consisting of benalaxyl, bitertanol, bromuconazole, captafol, carbendazim, carpropamid, cyazofamid, cyproconazole, diethofencarb, edifenphos, fenpropimorph, fentine, fluquinconazole, fosetyl, fluoroimide, folpet, iminoctadine, iprodionem, iprovalicarb, kasugamycin, maneb, nabam, pencycuron, prochloraz, propamocarb, propineb, pyrimethanil, spiroxamine, quintozene, tebuconazole, tolylfluanid, triadimefon, triadimenol, trifloxystrobin, zineb.

Insecticidal, acaricidal, nematicidal, miticidal and related active ingredients are, for example (analogously to the herbicides and fungicides, the compounds are, if possible, referred to by their common names):

(1) Acetylcholinesterase (AChE) inhibitors, preferably carbamates selected from alanycarb, aldicarb, bendiocarb, benfuracarb, butocarboxim, butoxycarboxim, carbaryl, carbofuran, carbosulfan, ethiofencarb, fenobucarb, formetanate, furathiocarb, isoprocarb, methiocarb, methomyl, metolcarb, oxamyl, pirimicarb, propoxur, thiodicarb, thiofanox, triazamate, trimethacarb, XMC and xylylcarb; or organophosphates selected from acephate, azamethiphos, azinphos-ethyl, azinphos-methyl, cadusafos, chlorethoxyfos, chlorfenvinphos, chlormephos, chlorpyrifos-methyl, coumaphos, cyanophos, demeton-S-methyl, diazinon, dichlorvos/DDVP, dicrotophos, dimethoate, dimethylvinphos, disulfoton, EPN, ethion, ethoprophos, famphur, fenamiphos, fenitrothion, fenthion, fosthiazate, heptenophos, imicyafos, isofenphos, isopropyl O-(methoxyaminothiophosphoryl) salicylate, isoxathion, malathion, mecarbam, methamidophos, methidathion, mevinphos, monocrotophos, naled, omethoate, oxydemeton-methyl, parathion-methyl, phenthoate, phorate, phosalone, phosmet, phosphamidon, phoxim, pirimiphos-methyl, profenofos, propetamphos, prothiofos, pyraclofos, pyridaphenthion, quinalphos, sulfotep, tebupirimfos, temephos, terbufos, tetrachlorvinphos, thiometon, triazophos, triclorfon and vamidothion.

(2) GABA-gated chloride channel blockers, preferably cyclodiene-organochlorines selected from chlordane and endosulfan, or phenylpyrazoles (fiproles) selected from ethiprole and fipronil.

(3) Sodium channel modulators, preferably pyrethroids selected from acrinathrin, allethrin, d-cis-trans allethrin, d-trans allethrin, bifenthrin, bioallethrin, bioallethrin S-cyclopentenyl isomer, bioresmethrin, cycloprothrin, cyfluthrin, beta-cyfluthrin, cyhalothrin, lambda-cyhalothrin, gamma-cyhalothrin, cypermethrin, alpha-cypermethrin, beta-cypermethrin, theta-cypermethrin, zeta-cypermethrin, cyphenothrin [(1R)-trans isomer], deltamethrin, empenthrin [(EZ)-(1R) isomer], esfenvalerate, etofenprox, fenpropathrin, fenvalerate, flucythrinate, flumethrin, tau-fluvalinate, halfenprox, imiprothrin, kadethrin, momfluorothrin, permethrin, phenothrin [(1R)-trans isomer], prallethrin, pyrethrins (pyrethrum), resmethrin, silafluofen, tefluthrin, tetramethrin, tetramethrin [(1R) isomer], tralomethrin and transfluthrin or DDT or methoxychlor.

(4) Nicotinic acetylcholine receptor (nAChR) competitive modulators, preferably neonicotinoids selected from acetamiprid, clothianidin, dinotefuran, imidacloprid, nitenpyram, thiacloprid and thiamethoxam, or nicotine, or sulfoximines selected from sulfoxaflor, or butenolides selected from flupyradifurone.

(5) Allosteric modulators of the nicotinic acetylcholine receptor (nAChR), preferably spinosyns selected from spinetoram and spinosad.

(6) Allosteric modulators of the glutamate-gated chloride channel (GluCI), preferably avermectins/milbemycins selected from abamectin, emamectin benzoate, lepimectin and milbemectin.

(7) Juvenile hormone mimics, preferably juvenile hormone analogs selected from hydroprene, kinoprene and methoprene, or fenoxycarb or pyriproxyfen.

(8) Miscellaneous nonspecific (multi-site) inhibitors, preferably alkyl halides selected from methyl bromide and other alkyl halides; or chloropicrin or sulfuryl fluoride or borax or tartar emetic or methyl isocyanate generators selected from diazomet and metam.

(9) Chordotonal organ TRPV channel modulators selected from pymetrozine and pyrifluquinazon.

(10) Mite growth inhibitors selected from clofentezine, hexythiazox, diflovidazin and etoxazole.

(11) Microbial disruptors of insect midgut membranes selected from *Bacillus thuringiensis* subspecies *israelensis, Bacillus sphaericus, Bacillus thuringiensis* subspecies *aizawai, Bacillus thuringiensis* subspecies kurstaki, *Bacillus thuringiensis* subspecies tenebrionis, and B.t. plant proteins selected from Cry1Ab, Cry1Ac, Cry1Fa, Cry1A.105, Cry2Ab, VIP3A, mCry3A, Cry3Ab, Cry3Bb and Cry34Ab1/35Ab1.

(12) Inhibitors of mitochondrial ATP synthase, preferably ATP disruptors selected from diafenthiuron, or organotin compounds selected from azocyclotin, cyhexatin and fenbutatin oxide, or propargite or tetradifon.

(13) Uncouplers of oxidative phosphorylation via disruption of the proton gradient, selected from chlorfenapyr, DNOC and sulfluramid.

(14) Nicotinic acetylcholine receptor channel blockers selected from bensultap, cartap hydrochloride, thiocyclam, and thiosultap-sodium.

(15) Inhibitors of chitin biosynthesis, type 0, selected from bistrifluron, chlorfluazuron, diflubenzuron, flucycloxuron, flufenoxuron, hexaflumuron, lufenuron, novaluron, noviflumuron, teflubenzuron and triflumuron.

(16) Inhibitors of chitin biosynthesis, type 1, selected from buprofezin.

(17) Molting disruptors (especially in the case of Diptera) selected from cyromazine.
(18) Ecdysone receptor agonists selected from chromafenozide, halofenozide, methoxyfenozide and tebufenozide.
(19) Octopamine receptor agonists selected from amitraz.
(20) Mitochondrial complex III electron transport inhibitors selected from hydramethylnon, acequinocyl and fluacrypyrim.
(21) Mitochondrial complex I electron transport inhibitors, preferably METI acaricides selected from fenazaquin, fenpyroximate, pyrimidifen, pyridaben, tebufenpyrad and tolfenpyrad, or rotenone (Derris).
(22) Voltage-dependent sodium channel blockers selected from indoxacarb and metaflumizone.
(23) Inhibitors of acetyl-CoA carboxylase, preferably tetronic and tetramic acid derivatives selected from spirodiclofen, spiromesifen and spirotetramat.
(24) Mitochondrial complex IV electron transport inhibitors, preferably phosphines selected from aluminium phosphide, calcium phosphide, phosphine and zinc phosphide, or cyanides selected from calcium cyanide, potassium cyanide and sodium cyanide.
(25) Mitochondrial complex II electron transport inhibitors, preferably beta-ketonitrile derivatives selected from cyenopyrafen and cyflumetofen, or carboxanilides selected from pyflubumide.
(28) Ryanodine receptor modulators, preferably diamides selected from chlorantraniliprole, cyantraniliprole and flubendiamide.
(29) Chordotonal organ modulators (with undefined target structure) selected from flonicamid.
(30) Further active ingredients selected from acynonapyr, afidopyropen, afoxolaner, azadirachtin, benclothiaz, benzoximate, benzpyrimoxan, bifenazate, broflanilide, bromopropylate, chinomethionat, chloroprallethrin, cryolite, cyclaniliprole, cycloxaprid, cyhalodiamide, dicloromezotiaz, dicofol, epsilon metofluthrin, epsilon momfluthrin, flometoquin, fluazaindolizine, fluensulfone, flufenerim, flufenoxystrobin, flufiprole, fluhexafon, fluopyram, flupyrimin, fluralaner, fluxametamide, fufenozide, guadipyr, heptafluthrin, imidaclothiz, iprodione, kappa bifenthrin, kappa tefluthrin, lotilaner, meperfluthrin, oxazosulfyl, paichongding, pyridalyl, pyrifluquinazon, pyriminostrobin, spirobudiclofen, spiropidion, tetramethylfluthrin, tetraniliprole, tetrachlorantraniliprole, tigolaner, tioxazafen, thiofluoximate, triflumezopyrim and iodomethane; additionally preparations based on *Bacillus firmus* (I-1582, BioNeem, Votivo), and the following compounds: 1-{2-fluoro-4-methyl-5-[(2,2,2-trifluoroethyl)sulfinyl]phenyl}-3-(trifluoromethyl)-1H-1,2,4-triazole-5-amine (known from WO2006/043635) (CAS 885026-50-6), {1'-[(2E)-3-(4-chlorophenyl)prop-2-en-1-yl]-5-fluorospiro[indole-3,4'-piperidine]-1(2H)-yl}(2-chloropyridin-4-yl)methanone (known from WO2003/106457) (CAS 637360-23-7), 2-chloro-N-[2-{1-[(2E)-3-(4-chlorophenyl)prop-2-en-1-yl]piperidin-4-yl}-4-(trifluoromethyl)phenyl]isonicotinamide (known from WO2006/003494) (CAS 872999-66-1), 3-(4-chloro-2,6-dimethylphenyl)-4-hydroxy-8-methoxy-1,8-diazaspiro[4.5]dec-3-en-2-one (known from WO 2010052161) (CAS 1225292-17-0), 3-(4-chloro-2,6-dimethylphenyl)-8-methoxy-2-oxo-1,8-diazaspiro[4.5]dec-3-en-4-yl ethylcarbonate (known from EP 2647626) (CAS-1440516-42-6), 4-(but-2-yn-1-yloxy)-6-(3,5-dimethylpiperidin-1-yl)-5-fluoropyrimidine (known from WO2004/099160) (CAS 792914-58-0), PF1364 (known from JP2010/018586) (CAS Reg. No. 1204776-60-2), (3E)-3-[1-[(6-chloro-3-pyridyl)methyl]-2-pyridylidene]-1,1,1-trifluoropropan-2-one (known from WO2013/144213) (CAS 1461743-15-6), N-[3-(benzylcarbamoyl)-4-chlorophenyl]-1-methyl-3-(pentafluoroethyl)-4-(trifluoromethyl)-1H-pyrazole-5-carboxamide (known from WO2010/051926) (CAS 1226889-14-0), 5-bromo-4-chloro-N-[4-chloro-2-methyl-6-(methylcarbamoyl)phenyl]-2-(3-chloro-2-pyridyl)pyrazole-3-carboxamide (known from CN103232431) (CAS 1449220-44-3), 4-[5-(3,5-dichlorophenyl)-4,5-dihydro-5-(trifluoromethyl)-3-isoxazolyl]-2-methyl-N-(cis-1-oxido-3-thietanyl)benzamide, 4-[5-(3,5-dichlorophenyl)-4,5-dihydro-5-(trifluoromethyl)-3-isoxazolyl]-2-methyl-N-(trans-1-oxido-3-thietanyl)benzamide and 4-[(5S)-5-(3,5-dichlorophenyl)-4,5-dihydro-5-(trifluoromethyl)-3-isoxazolyl]-2-methyl-N-(cis-1-oxido-3-thietanyl)benzamide (known from WO 2013/050317 A1) (CAS 1332628-83-7), N-[3-chloro-1-(3-pyridinyl)-1H-pyrazol-4-yl]-N-ethyl-3-[(3,3,3-trifluoropropyl)sulfinyl]propanamide, (+)-N-[3-chloro-1-(3-pyridinyl)-1H-pyrazol-4-yl]-N-ethyl-3-[(3,3,3-trifluoropropyl)sulfinyl]propanamide and (−)-N-[3-chloro-1-(3-pyridinyl)-1H-pyrazol-4-yl]-N-ethyl-3-[(3,3,3-trifluoropropyl)sulfinyl]propanamide (known from WO 2013/162715 A2, WO 2013/162716 A2, US 2014/0213448 A1) (CAS 1477923-37-7), 5-[[(2E)-3-chloro-2-propen-1-yl]amino]-1-[2,6-dichloro-4-(trifluoromethyl)phenyl]-4-[(trifluoromethyl)sulfinyl]-1H-pyrazole-3-carbonitrile (known from CN 101337937 A) (CAS 1105672-77-2), 3-bromo-N-[4-chloro-2-methyl-6-[(methylamino)thioxomethyl]phenyl]-1-(3-chloro-2-pyridinyl)-1H-pyrazole-5-carboxamide (Liudaibenjiaxuanan, known from CN 103109816 A) (CAS 1232543-85-9); N-[4-chloro-2-[[(1,1-dimethylethyl)amino]carbonyl]-6-methylphenyl]-1-(3-chloro-2-pyridinyl)-3-(fluoromethoxy)-1H-pyrazole-5-carboxamide (known from WO 2012/034403 A1) (CAS 1268277-22-0), N-[2-(5-amino-1,3,4-thiadiazol-2-yl)-4-chloro-6-methylphenyl]-3-bromo-1-(3-chloro-2-pyridinyl)-1H-pyrazole-5-carboxamide (known from WO 2011/085575 A1) (CAS 1233882-22-8), 4-[3-[2,6-dichloro-4-[(3,3-dichloro-2-propen-1-yl)oxy]phenoxy]propoxy]-2-methoxy-6-(trifluoromethyl)pyrimidine (known from CN 101337940 A) (CAS 1108184-52-6); (2E)- and 2(Z)-2-[2-(4-cyanophenyl)-1-[3-(trifluoromethyl)phenyl]ethylidene]-N-[4-(difluoromethoxy)phenyl]hydrazinecarboxamide (known from CN 101715774 A) (CAS 1232543-85-9); cyclopropanecarboxylic acid 3-(2,2-dichloroethenyl)-2,2-dimethyl-4-(1H-benzimidazol-2-yl)phenyl ester (known from CN 103524422 A) (CAS 1542271-46-4); (4aS)-7-chloro-2,5-dihydro-2-[[(methoxycarbonyl)[4-[(trifluoromethyl)thio]phenyl]amino]carbonyl]indeno[1,2-e][1,3,4]oxadiazine-4a(3H)-carboxylic acid methyl ester (known from CN 102391261 A) (CAS 1370358-69-2); 6-deoxy-3-O-ethyl-2,4-di-O-methyl-1-[N-[4-[1-[4-(1,1,2,2,2-pentafluoroethoxy)phenyl]-1H-1,2,4-triazol-3-yl]phenyl]carbamate]-α-L-mannopyranose (known from US 2014/0275503 A1) (CAS 1181213-14-8); 8-(2-cyclopropylmethoxy-4-trifluoromethylphenoxy)-3-(6-trifluoromethylpyridazin-3-yl)-3-azabicyclo[3.2.1]octane (CAS 1253850-56-4), (8-anti)-8-(2-cyclopropylmethoxy-4-trifluoromethylphenoxy)-3-(6-trifluoromethylpyridazin-3-yl)-3-azabicyclo[3.2.1]octane (CAS 933798-27-7), (8-syn)-8-(2-cyclopropylmethoxy-4-trifluoromethylphenoxy)-3-(6-trifluoromethylpyridazin-3-yl)-3-azabicyclo[3.2.1]octane (known from WO 2007040280 A1, WO 2007040282 A1) (CAS 934001-66-8), N-[3-chloro-1-(3-pyridinyl)-1H-pyrazol-4-yl]-N-ethyl-3-[(3,3,3-trifluoropropyl)thio]propanamide (known from WO 2015/058021 A1, WO 2015/058028 A1) (CAS 1477919-27-9) and N-[4-(aminothioxomethyl)-2-methyl-6-[(methylamino)carbonyl]phenyl]-3-bromo-1-(3-chloro-2-pyridinyl)-1H-pyrazole-5-carboxamide (known from CN 103265527 A) (CAS 1452877-50-7), 5-(1,3-dioxan-2-yl)-4-[[4-(trifluoromethyl)phenyl]methoxy]pyrimidine (known from WO 2013/115391 A1) (CAS 1449021-97-9), 3-(4-chloro-2,6-dimethylphenyl)-8-methoxy-1-methyl-1,8-diazaspiro[4.5]decane-2,4-dione (known from WO 2014/187846 A1) (CAS 1638765-58-8), ethyl 3-(4-chloro-2,6-dimethylphenyl)-8-methoxy-1-methyl-2-oxo-1,8-diazaspiro[4.5]dec-3-en-4-ylcarboxylate (known from WO 2010/066780 A1, WO 2011151146 A1) (CAS 1229023-00-0), 4-[(5S)-5-(3,5-dichloro-4-fluorophenyl)-4,5-dihydro-5-(trifluoromethyl)-3-isoxazolyl]-N-[(4R)-2-ethyl-3-oxo-4-isoxazolidinyl]-2-methylbenzamide (known from WO 2011/067272, WO2013/050302) (CAS 1309959-62-3).

Insecticides that can be used with preference together with the herbicide/safener combinations of the invention are, for example, as follows:

acetamiprid, acrinathrin, aldicarb, amitraz, acinphos-methyl, cyfluthrin, carbaryl, cypermethrin, deltamethrin, endosulfan, ethoprophos, fenamiphos, fenthion, fipronil, imidacloprid, methamidophos, methiocarb, niclosamide, oxydemeton-methyl, prothiophos, silafluofen, thiacloprid, thiodicarb, tralomethrin, triazophos, trichlorfon, triflumuron, terbufos, fonofos, phorate, chlorpyriphos, carbofuran, tefluthrin.

The herbicide/safener combinations of the invention are preferentially suitable for control of unwanted plant growth in economically important crop plants such as wheat (hard and soft wheat), maize, soya, sugarbeet, sugarcane, cotton, rice, beans (for example, bush beans and broad beans), flax, barley, oats, rye, triticale, potato and millet/sorghum.

For application, the herbicide/safener combinations of the invention can be deployed together or separately onto the plants (e.g. harmful plants such as mono- or dicotyledonous weeds or unwanted crop plants), the seed (e.g. grains, seeds or vegetative propagation organs such as tubers or parts of shoots having buds), or the area in which the plants grow (e.g. the growing area).

The herbicidal/safener combinations can be deployed prior to sowing (if appropriate also by incorporation into the soil), prior to emergence or after emergence. Preference is given to use by the early post-seeding pre-emergence method or by the post-emergence method against harmful plants that have not yet emerged or have already emerged. The application can also be integrated into weed management systems with divided repeated applications (sequentials).

Specific examples of some representatives of the monocotyledonous and dicotyledonous weed flora which can be controlled by the herbicide/safener combinations of the invention are mentioned by way of example, though the enumeration is not intended to impose a restriction to particular species. Among the monocotyledonous weed species, for example, *Aegilops, Agropyron, Agrostis, Alopecurus, Apera, Avena, Brachicaria, Bromus, Cynodon, Dactyloctenium, Digitaria, Echinochloa, Eleocharis, Eleusine, Eragrostis, Eriochloa, Festuca, Fimbristylis, Imperata, Ischaemum, Heteranthera, Imperata, Leptochloa, Lolium, Monochoria, Panicum, Paspalum, Phalaris, Phleum, Poa, Rottboellia, Sagittaria, Scirpus, Setaria, Sorghum, Sphenoclea* and *Cyperus* species are covered by the annual group.

In the case of dicotyledonous weed species, the spectrum of action extends to species such as, for example, *Abutilon, Amaranthus, Ambrosia, Anoda, Anthemis, Aphanes, Artemisia, Atriplex, Bellis, Bidens, Capsella, Carduus, Cassia, Centaurea, Chenopodium, Cirsium, Convolvulus, Datura, Desmodium, Emex, Erodium, Erysimum, Euphorbia, Galeopsis, Galinsoga, Galium, Geranium, Hibiscus, Ipomoea, Kochia, Lamium, Lepidium, Lindernia, Matricaria, Mentha, Mercurialis, Mullugo, Myosotis, Papaver, Pharbitis, Plantago, Polygonum, Portulaca, Ranunculus, Raphanus, Rorippa, Rotala, Rumex, Salsola, Senecio, Sesbania, Sida, Sinapis, Solanum, Sonchus, Sphenoclea, Stellaria, Taraxacum, Thlaspi, Trifolium, Urtica, Veronica, Viola, Xanthium.*

If the herbicide/safener combinations of the invention are applied to the soil surface before germination, either the emergence of the weed seedlings is prevented completely or the weeds grow until they have reached the cotyledon stage, but then they stop growing and ultimately die completely after three to four weeks have passed.

If the herbicide/safener combinations are applied post-emergence to the green parts of the plants, growth stops after the treatment, and the harmful plants remain at the growth stage at the time of application, or they die completely after a certain time, and so this eliminates competition by the weeds, which is harmful to the crop plants, very early and in a sustained manner. The development of the crop plants, by contrast, is affected only slightly, if at all, by the use of the herbicide/safener combination.

The herbicide/safener combinations of the invention are notable for a rapidly commencing and long-lasting herbicidal action. In general, the rainfastness of the active ingredients in the combinations of the invention is favorable. A particular advantage is that the effective dosages of components (A) and (B) that are used in the herbicide/safener combinations can be adjusted to such a low level that their soil action is optimally low. Therefore, the use thereof in sensitive crops is not just enabled, but groundwater contamination is also virtually prevented.

Economically important crops for the applications of the herbicide/safener combinations of the invention are, for example, dicotyledonous crops from the genera of *Arachis, Beta, Brassica, Cucumis, Cucurbita, Helianthus, Daucus, Glycine, Gossypium, Ipomoea, Lactuca, Linum, Lycopersicon, Nicotiana, Phaseolus, Pisum, Solanum, Vicia*, or monocotyledonous crops from the genera of *Allium, Ananas, Asparagus, Avena, Hordeum, Oryza, Panicum, Saccharum, Secale, Sorghum, Triticale, Triticum* and *Zea.*

The herbicide/safener combinations of the invention can preferably also be used in transgenic crops which are resistant to growth regulators or to herbicides which inhibit essential plant enzymes, for example acetolactate synthases (ALS), EPSP synthases, glutamine synthases (GS), protoporphyrinogen IX oxidase (PPO), or hydroxyphenylpyruvate dioxygenases (HPPD), or to herbicides from the group of the sulfonylureas, the glyphosates, glufosinates or benzoylisoxazoles and analogous active ingredients.

The herbicide/safener combinations of the invention may either take the form of mixed formulations of components (A) and (B) and, if appropriate, with further active ingredients, additives and/or customary formulation auxiliaries, which are then applied in a customary manner diluted with water, or can be prepared as what are called tankmixes by joint dilution of the separately formulated or partially separately formulated components with water.

The herbicide/safener combinations of the invention can be formulated in various ways, according to the biological and/or physicochemical parameters required. Examples of general formulation options are: wettable powders (WP), water-soluble powders (SP), emulsifiable concentrates (EC), water-soluble concentrates, aqueous solutions (SL), emulsions (EW), such as oil-in-water and water-in-oil emulsions, sprayable solutions or emulsions, dispersions based on oil or water, oil dispersions (OD), suspoemulsions, suspension concentrates (SC), oil-miscible solutions, capsule suspensions (CS), dusting products (DP), dressings, granules for soil application or scattering, granules (GR) in the form of microgranules, spray granules, absorption and adsorption granules, water-dispersible granules (WG), water-soluble granules (SG), ULV formulations, microcapsules or waxes.

The invention therefore also provides herbicidal and plant growth-regulating compositions comprising the herbicide/safener combinations of the invention.

The individual formulation types are known in principle and are described, for example, in: Winnacker-Küchler, "Chemische Technologie" [Chemical Technology], Volume 7, C. Hanser Verlag Munich, 4th ed. 1986; van Valkenburg, "Pesticide Formulations", Marcel Dekker, N.Y., 1973, K. Martens, "Spray Drying" Handbook", 3rd ed. 1979, G. Goodwin Ltd. London.

The necessary formulation auxiliaries, such as inert materials, surfactants, solvents and further additives, are likewise known and are described, for example, in: Watkins, "Handbook of Insecticide Dust Diluents and Carriers", 2nd ed., Darland Books, Caldwell N.J.; H.v. Olphen, "Introduction to Clay Colloid Chemistry", 2nd ed., J. Wiley & Sons, N.Y., Marsden, "Solvents Guide", 2nd ed., Interscience, N.Y. 1963, Mccutcheon's "Detergents and Emulsifiers Annual", MC Publ. Corp., Ridgewood N.J., Sisley and Wood, "Encyclopedia of Surface Active Agents", Chem. Publ. Co. Inc., N.Y. 1964, Schönfeldt, "Grenzflächenaktive Äthylenoxidaddukte" [Interface-active Ethylene Oxide Adducts], Wiss. Verlagsgesellschaft, Stuttgart 1976, Winnacker-Küchler, "Chemische Technologie", Volume 7, C. Hanser Verlag Munich, 4th ed. 1986.

On the basis of these formulations, it is also possible to produce combinations with other pesticidally active substances, such as other herbicides, fungicides, insecticides or other pesticides (for example acaricides, nematicides, molluscicides, rodenticides, aphicides, avicides, larvicides, ovicides, bactericides, viricides etc.), and also with further safeners, fertilizers and/or growth regulators, for example in the form of a finished formulation or as a tankmix.

Wettable powders are preparations which can be dispersed uniformly in water and, in addition to the active ingredient, apart from a diluent or inert substance, also comprise surfactants of the ionic and/or nonionic type (wetting agents, dispersants), for example polyoxyethylated alkylphenols, polyoxyethylated fatty alcohols, polyoxyethylated fatty amines, fatty alcohol polyglycol ether sulfates, alkanesulfonates, alkylbenzenesulfonates, sodium lignosulfonate, sodium 2,2'-dinaphthylmethane-6,6'-disulfonate, sodium dibutylnaphthalenesulfonate or else sodium oleoylmethyltaurate. To produce the wettable powders, the active herbicidal ingredients are finely ground, for example in customary apparatuses such as hammer mills, blower mills and air-jet mills, and simultaneously or subsequently mixed with the formulation auxiliaries.

Emulsifiable concentrates are produced by dissolving the active ingredient in an organic solvent, for example butanol, cyclohexanone, dimethylformamide, xylene, or else relatively high-boiling aromatics or hydrocarbons or mixtures of the organic solvents, with addition of one or more ionic and/or nonionic surfactants (emulsifiers). Examples of emulsifiers which may be used are: calcium alkylarylsulfonate salts, such as calcium dodecylbenzenesulfonate, or nonionic emulsifiers such as fatty acid polyglycol esters, alkylaryl polyglycol ethers, fatty alcohol polyglycol ethers, propylene oxide-ethylene oxide condensation products, alkyl polyethers, sorbitan esters, for example sorbitan fatty acid esters, or for example polyoxyethylene sorbitan fatty acid esters.

Dusting products are obtained by grinding the active ingredient with finely distributed solids, for example talc, natural clays, such as kaolin, bentonite and pyrophyllite, or diatomaceous earth. Suspension concentrates may be water- or oil-based. They may be produced, for example, by wet-grinding by means of commercial bead mills and optional addition of surfactants as already listed above, for example, for the other formulation types.

Emulsions, for example oil-in-water emulsions (EW), can be produced, for example, by means of stirrers, colloid mills and/or static mixers using aqueous organic solvents and optionally surfactants as already listed above, for example, for the other formulation types.

Granules can be produced either by spraying the active ingredient onto granular inert material capable of adsorption or by applying active ingredient concentrates to the surface of carrier substances, such as sand, kaolinites or granular inert material, by means of adhesives, for example polyvinyl alcohol, sodium polyacrylate or else mineral oils. Suitable active ingredients can also be granulated in the manner customary for the production of fertilizer granules—if desired as a mixture with fertilizers.

Water-dispersible granules are produced generally by processes such as spray-drying, fluidized bed granulation, pan granulation, mixing with high-speed mixers and extrusion without solid inert material.

The agrochemical preparations generally contain 0.1 to 99 percent by weight, especially 0.2% to 95% by weight, of active ingredients of components (A) and/or (B), the following concentrations being customary, depending on the type of formulation:

In wettable powders, the active ingredient concentration is, for example, about 10% to 95% by weight, the remainder to 100% by weight consisting of customary formulation constituents. In the case of emulsifiable concentrates, the active ingredient concentration may be about 1% to 90% by weight, preferably 5 to 80 percent by weight.

Formulations in the form of dusts usually contain 5% to 20% by weight of active ingredient; sprayable solutions contain about 0.05 to 80, preferably 2 to 50, percent by weight (% by weight) of active ingredient.

In the case of granules such as dispersible granules, the active ingredient content depends partly on whether the active ingredient is in liquid or solid form and on which granulation auxiliaries and fillers are used. In general, the content in the water-dispersible granules is between 1% and 95% by weight, preferably between 10% and 80% by weight.

In addition, the active ingredient formulations mentioned optionally comprise the respectively customary adhesives, wetting agents, dispersants, emulsifiers, penetrants, preservatives, antifreeze agents and solvents, fillers, colorants and carriers, antifoams, evaporation inhibitors and pH- or viscosity-modifying agents.

For application, the formulations in the commercial form are diluted if appropriate in a customary manner, for example with water in the case of wettable powders, emulsifiable concentrates, dispersions and water-dispersible granules. Dust-type preparations, granules for soil application or broadcasting and sprayable solutions are not normally diluted further with other inert substances prior to application.

The herbicide/safener combinations of the invention can be deployed onto the plants, plant parts, plant seeds or the area under cultivation (soil), preferably on the green plants and plant parts, and optionally additionally onto the soil.

One possible use is the joint deployment of the herbicide/safener combinations in the form of tankmixes, where the optimally formulated concentrated formulations of the individual active ingredients together are mixed in a tank with water, and the spray liquor obtained is deployed.

A joint formulation of the herbicide/safener combinations of the invention has the advantage that it can be applied more easily since the quantities of the components are already adjusted to the correct ratio. Moreover, the auxiliaries in the formulation can be adjusted optimally to one another, whereas a tankmix of different formulations may result in unwanted combinations of auxiliaries.

A. General Formulation Examples a) A dusting product is obtained by mixing 10 parts by weight of a component (A) or (B) or a component mixture (A)+(B) (and optionally further components) and/or salts thereof and 90 parts by weight of talc as inert substance, and comminuting in a beater mill.

b) A wettable powder which is readily dispersible in water is obtained by mixing 25 parts by weight of a component/component mixture, 64 parts by weight of kaolin-containing quartz as inert substance, 10 parts by weight of potassium lignosulfonate and 1 part by weight of sodium oleoylmethyltaurate as wetting agent and dispersant, and grinding the mixture in a pinned-disk mill.

c) A dispersion concentrate which is readily dispersible in water is obtained by mixing 20 parts by weight of a component/component mixture with 6 parts by weight of alkylphenol polyglycol ether (Triton® X 207), 3 parts by weight of isotridecanol polyglycol ether (8 EO) and 71 parts by weight of paraffinic mineral oil (boiling range for example approximately 255 to 277° C.) and grinding the mixture in a friction ball mill to a fineness of below 5 microns.

d) An emulsifiable concentrate is obtained from 15 parts by weight of a component/component mixture, 75 parts by weight of cyclohexanone as solvent and 10 parts by weight of oxyethylated nonylphenol as emulsifier.

e) Water-dispersible granules are obtained by mixing 75 parts by weight of a component of a component mixture, 10 parts by weight of calcium lignosulfonate, 5 parts by weight of sodium lauryl sulfate, 3 parts by weight of polyvinyl alcohol and 7 parts by weight of kaolin, grinding the mixture in a pinned-disk mill, and granulating the powder in a fluidized bed by spray application of water as a granulating liquid.

f) Water-dispersible granules are also obtained by homogenizing and precomminuting, in a colloid mill, 25 parts by weight of a component of a component mixture, 5 parts by weight of sodium 2,2'-dinaphthylmethane-6,6'-disulfonate, 2 parts by weight of sodium oleoylmethyltaurate, 1 part by weight of polyvinyl alcohol, 17 parts by weight of calcium carbonate and 50 parts by weight of water, then grinding the mixture in a bead mill and atomizing and drying the resulting suspension in a spray tower by means of a one-phase nozzle.

BIOLOGICAL EXAMPLES (A) Effect of Selected Herbicide/Safener Combinations of the Invention Using the Example of Reduction in Damage to Summer Wheat (TRZAS)

The seeds of the crop plants to be treated are laid out in soil in woodfiber pots (diameter ~7 cm), covered with soil and grown in a greenhouse under good conditions for germination and growth. The trial plants were treated at the early leaf stage (BBCH10-BBCH12).

The herbicides used (component B) were used in the following formulations:

B2.81: WP
B2.85: WP
B2.92: WP
Cinmethylin: EC
Clomazone: WP
Ethofumesate: WP
Flufenacet: SC
Pinoxaden: WP
Saflufenacil: WP
Bicyclopyrone: WP
Picloram: WP
Metazachlor: SC
Flumioxazin: WP
Glyphosate potassium salt: SL
Topramezone: WP The dose of the respective herbicides was chosen here such that it causes an average degree of visually apparent damage (min. 20%, max. 75%) compared to untreated crop plants at the evaluation time on a control group of crop plants without safener treatment that were included in the same trial.

In the respective herbicide/safener combinations, the safeners (component A) in the form of wettable powders (WP) were added in the dose specified; in these cases, herbicide and safener are thus applied as a mixture.

Application was effected in each case on to the above-ground parts of the plant, at a water application rate corresponding to 300 l/ha and with addition of wetting agent (Mero, 1.5 l/h a).

In the applications that contained pinoxaden, bicyclopyrone or topramezone, the herbicidal effect was enhanced by additionally adding ammonium sulfate (2 kg/ha).

After application, the plants were cultivated under good growth conditions in a greenhouse. On account of the different mechanisms of action of the herbicides used, the damaging effect of the herbicides was fully manifested at different times depending on the herbicide, and this in turn forms the basis for assessment of the safener action in the mixtures. Therefore, the damage was scored visually, depending on the herbicide/mixture, between 11 and 21 days after application.

The damage effect was assessed visually on a scale of 0-100% by comparison with untreated control plants, and averaged over 2 repeats per treatment.

EXAMPLES

0% = no noticeable effect compared to the untreated plant

20% = the treated plant population has 20% damage compared to the untreated control population (e.g. growth height, leaf damage, etc.)

100% = treated plants completely damaged/killed.

The experiments show that damage to the summer wheat crop plant (TRZAS; cv. Triso) caused by the respective herbicide (component (B)) (=herbicide damage without compound of the formula (I) in table 2 below) is significantly reduced by adding a safener (component (A)).

TABLE 2

| Herbicide | Herbicide dose g a.i./ha | Damage to the plant by the herbicide (in %) | Safener | Safener dose g a.i./ha | Damage to the plant on application of herbicide + safener (in %) | Reduction in the damage by safener (difference) | Reduction in the damage by safener (in %) |
|---|---|---|---|---|---|---|---|
| B1.2 (bicyclopyrone) | 400 | 60 | A3 | 100 | 35 | 25 | 42 |
| B1.8 (pinoxaden) | 200 | 35 | A1 | 100 | 10 | 25 | 71 |
| B1.8 (pinoxaden) | 200 | 35 | A3 | 100 | 20 | 15 | 43 |
| B1.8 (pinoxaden) | 200 | 35 | A5 | 100 | 15 | 20 | 57 |
| B2.28 (flufenacet) | 2000 | 30 | A3 | 100 | 0 | 30 | 100 |
| B2.28 (flufenacet) | 4000 | 40 | A3 | 100 | 0 | 40 | 100 |
| B2.38 (metazachlor) | 4000 | 40 | A3 | 100 | 10 | 30 | 75 |
| B2.81 | 15 | 70 | A1 | 100 | 0 | 70 | 100 |
| B2.81 | 15 | 70 | A3 | 100 | 55 | 15 | 21 |
| B2.81 | 15 | 70 | A5 | 100 | 50 | 20 | 29 |
| B2.85 | 5 | 60 | A1 | 100 | 0 | 60 | 100 |
| B2.85 | 5 | 60 | A5 | 100 | 10 | 50 | 83 |
| B2.92 | 5 | 60 | A1 | 100 | 0 | 60 | 100 |
| B2.92 | 5 | 60 | A5 | 100 | 5 | 55 | 92 |
| B4.28 (topramezone) | 300 | 40 | A3 | 100 | 20 | 20 | 50 |
| B5.13 (cinmethylin) | 500 | 25 | A3 | 100 | 0 | 25 | 100 |
| B5.13 (cinmethylin) | 1000 | 25 | A3 | 100 | 0 | 25 | 100 |
| B5.14 (clomazone) | 200 | 40 | A1 | 100 | 20 | 20 | 50 |
| B5.14 (clomazone) | 200 | 40 | A3 | 100 | 25 | 15 | 38 |
| B5.14 (clomazone) | 200 | 40 | A5 | 100 | 25 | 15 | 38 |
| B5.21 (ethofumesate) | 2000 | 70 | A1 | 100 | 0 | 70 | 100 |
| B5.21 (ethofumesate) | 2000 | 70 | A3 | 100 | 0 | 70 | 100 |
| B5.21 (ethofumesate) | 2000 | 70 | A5 | 100 | 0 | 70 | 100 |
| B5.26 (flumioxazin) | 20 | 60 | A3 | 100 | 35 | 25 | 42 |
| B6.5 (picloram) | 400 | 25 | A3 | 100 | 5 | 20 | 80 |
| B7.5 (glyphosate) | 400 | 45 | A3 | 100 | 10 | 35 | 78 |
| B9.10 (saflufenacil) | 10 | 35 | A1 | 100 | 20 | 15 | 43 |
| B9.10 (saflufenacil) | 20 | 40 | A1 | 100 | 25 | 15 | 38 |

(B) Effect of Selected Herbicide/Safener Combinations of the Invention Using the Example of Reduction in Damage to Summer Barley (HORVS)

The seeds of the crop plants to be treated are laid out in soil in woodfiber pots (diameter ~7 cm), covered with soil and grown in a greenhouse under good conditions for germination and growth. The trial plants were treated at the early leaf stage (BBCH10-BBCH12).

The herbicides used (component B) were used in the following formulations:

B2.81: WP
B2.85: WP
B2.92: WP
Clomazone: WP
Ethofumesate: WP
Flufenacet: SC
Fluroxypyr: EC
Saflufenacil: WP
Thiencarbazone-methyl: WP
Iodosulfuron-methyl-sodium: WP
Bifenox: WP
Glyphosate potassium salt: SL
Topramezone: WP The dose of the respective herbicides was chosen here such that it causes an average degree of visually apparent damage (min. 20%, max. 75%) compared to untreated crop plants at the evaluation time on a control group of crop plants without safener treatment that were included in the same trial.

In the respective herbicide/safener combinations, the safeners (component A) in the form of wettable powders (WP) were added in the dose specified; in these cases, herbicide and safener are thus applied as a mixture.

Application was effected in each case on to the above-ground parts of the plant, at a water application rate corresponding to 300 l/ha and with addition of wetting agent (Mero, 1.5 l/h a).

In the applications that contained pinoxaden or topramezone, the herbicidal effect was enhanced by additionally adding ammonium sulfate (2 kg/ha).

After application, the plants were cultivated under good growth conditions in a greenhouse. On account of the different mechanisms of action of the herbicides used, the damaging effect of the herbicides was fully manifested at different times depending on the herbicide, and this in turn forms the basis for assessment of the safener action in the mixtures. Therefore, the damage was scored visually, depending on the herbicide/mixture, between 11 and 21 days after application.

The damage effect was assessed visually on a scale of 0-100% by comparison with untreated control plants, and averaged over 2 repeats per treatment.

EXAMPLES

0% = no noticeable effect compared to the untreated plant

20% = the treated plant population has 20% damage compared to the untreated control population (e.g. growth height, leaf damage, etc.)

100% = treated plants completely damaged/killed.

The experiments show that damage to the summer barley crop plant (HORVS: cv. Quench) caused by the respective herbicide (component B) (=herbicide damage without compound of the formula (I) in table 3 below) is significantly reduced by adding a safener (component A).

TABLE 3

| Herbicide | Herbicide dose g a.i./ha | Damage to the plant by the herbicide (in %) | Safener | Safener dose g a.i./ha | Damage to the plant on application of herbicide + safener (in %) | Reduction in the damage by safener (difference) | Reduction in the damage by safener (in %) |
|---|---|---|---|---|---|---|---|
| B2.28 (flufenacet) | 2000 | 30 | A3 | 100 | 15 | 15 | 50 |
| B2.28 (flufenacet) | 4000 | 50 | A3 | 100 | 15 | 35 | 70 |
| B2.34 (iodosulfuron) | 10 | 45 | A3 | 100 | 20 | 25 | 56 |
| B2.68 (thiencarbazone-methyl) | 30 | 30 | A1 | 100 | 0 | 30 | 100 |
| B2.68 (thiencarbazone-methyl) | 30 | 30 | A3 | 100 | 0 | 30 | 100 |
| B2.68 (thiencarbazone-methyl) | 30 | 30 | A5 | 100 | 0 | 30 | 100 |
| B2.81 | 15 | 70 | A1 | 100 | 0 | 70 | 100 |
| B2.81 | 15 | 70 | A3 | 100 | 0 | 70 | 100 |
| B2.81 | 15 | 70 | A5 | 100 | 50 | 20 | 29 |
| B2.85 | 5 | 60 | A1 | 100 | 10 | 50 | 83 |
| B2.85 | 5 | 60 | A3 | 100 | 45 | 15 | 25 |
| B2.85 | 5 | 60 | A5 | 100 | 20 | 40 | 67 |
| B2.92 | 5 | 65 | A1 | 100 | 0 | 65 | 100 |
| B2.92 | 5 | 65 | A3 | 100 | 35 | 30 | 46 |
| B2.92 | 5 | 65 | A5 | 100 | 15 | 50 | 77 |
| B4.28 (topramezone) | 300 | 50 | A3 | 100 | 10 | 40 | 80 |
| B5.14 (clomazone) | 200 | 40 | A1 | 100 | 10 | 30 | 75 |
| B5.21 (ethofumesate) | 2000 | 60 | A1 | 100 | 0 | 60 | 100 |

TABLE 3-continued

| Herbicide | Herbicide dose g a.i./ha | Damage to the plant by the herbicide (in %) | Safener | Safener dose g a.i./ha | Damage to the plant on application of herbicide + safener (in %) | Reduction in the damage by safener (difference) | Reduction in the damage by safener (in %) |
|---|---|---|---|---|---|---|---|
| B5.21 (ethofumesate) | 2000 | 60 | A3 | 100 | 0 | 60 | 100 |
| B5.21 (ethofumesate) | 2000 | 60 | A5 | 100 | 0 | 60 | 100 |
| B6.4 (fluroxypyr) | 500 | 20 | A1 | 100 | 0 | 20 | 100 |
| B6.4 (fluroxypyr) | 500 | 20 | A3 | 100 | 0 | 20 | 100 |
| B6.4 (fluroxypyr) | 500 | 20 | A5 | 100 | 5 | 15 | 75 |
| B7.5 (glyphosate) | 400 | 60 | A3 | 100 | 10 | 50 | 83 |
| B8.6 (bifenox) | 600 | 40 | A3 | 100 | 5 | 35 | 88 |
| B9.10 (saflufenacil) | 20 | 40 | A1 | 100 | 20 | 20 | 50 |
| B9.10 (saflufenacil) | 20 | 40 | A5 | 100 | 25 | 15 | 38 |

The invention claimed is:

1. A herbicide/safener combination composition comprising one or more compounds effective as safener [component (A)] and one or more herbicidally active compounds [component (B)], where component (A) represents one or more compounds of general formula (I) or agrochemically acceptable salts thereof (I)

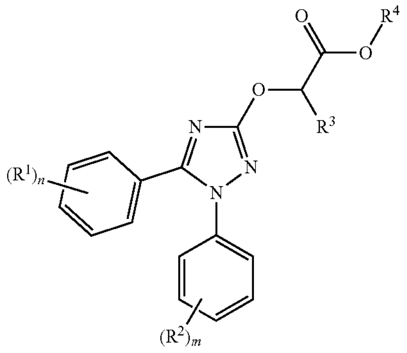

and in which $(R^1)_n$-phenyl is selected from the group consisting of Q-1.1 to Q-1.53:

Q-1.1

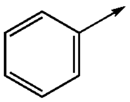

Q-1.2

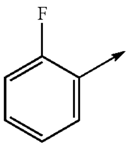

-continued

Q-1.3

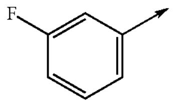

Q-1.4

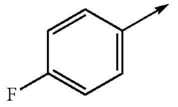

Q-1.5

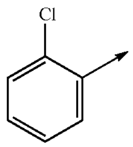

Q-1.6

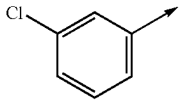

Q-1.7

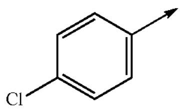

Q-1.8

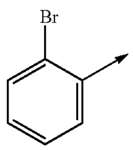

Q-1.9

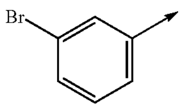

Q-1.10

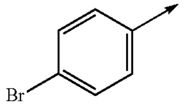

-continued
Q-1.11
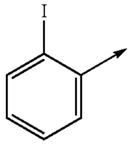
Q-1.12
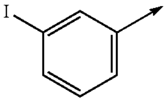
Q-1.13
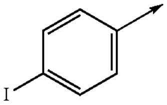
Q-1.14
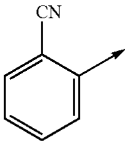
Q-1.15
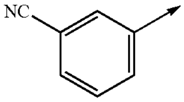
Q-1.16
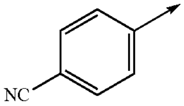
Q-1.17
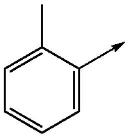
Q-1.18
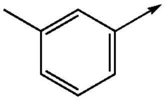
Q-1.19
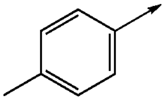
Q-1.20
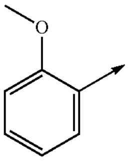
Q-1.21
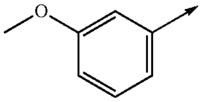
Q-1.22
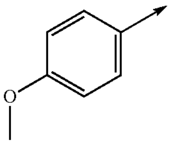
-continued
Q-1.23
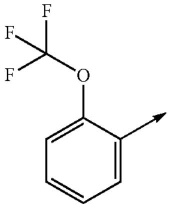
Q-1.24
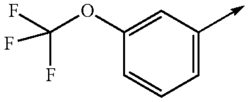
Q-1.25
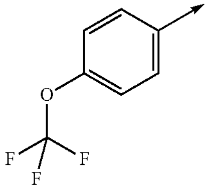
Q-1.26
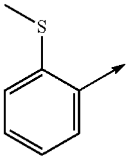
Q-1.27
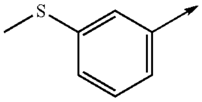
Q-1.28
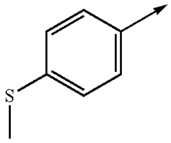
Q-1.29
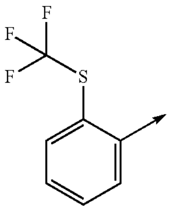
Q-1.30
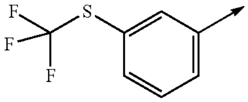
Q-1.31
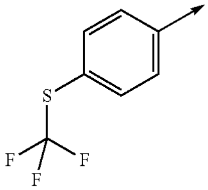

-continued
Q-1.32
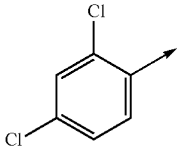
Q-1.33
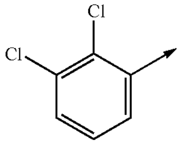
Q-1.34
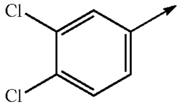
Q-1.35
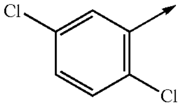
Q-1.36
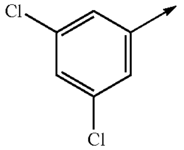
Q-1.37
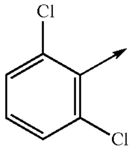
Q-1.38
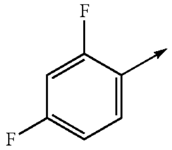
Q-1.39
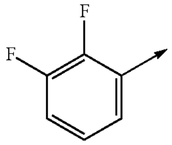
Q-1.40
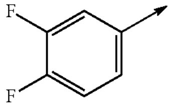
Q-1.41
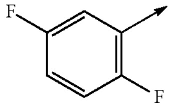
Q-1.42
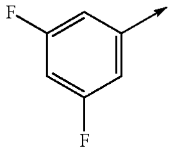
-continued
Q-1.43
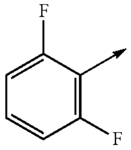
Q-1.44
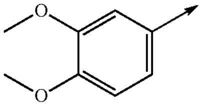
Q-1.45
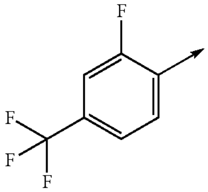
Q-1.46
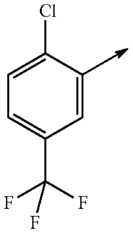
Q-1.47
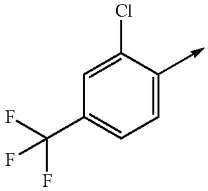
Q-1.48
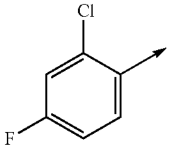
Q-1.49
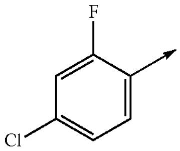
Q-1.50
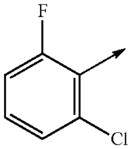
Q-1.51
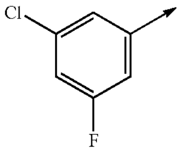

-continued
Q-1.52
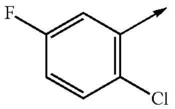
Q-1.53
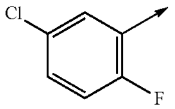
and $(R^2)_m$-phenyl is selected from the group consisting of Q-2.1 to Q-2.53:
Q-2.1
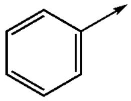
Q-2.2
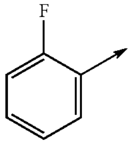
Q-2.3
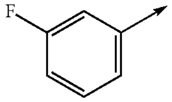
Q-2.4
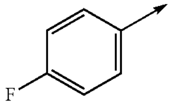
Q-2.5
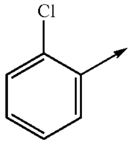
Q-2.6
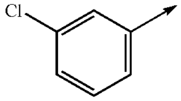
Q-2.7
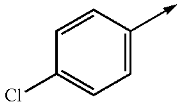
Q-2.8
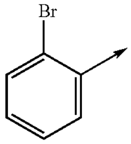
Q-2.9
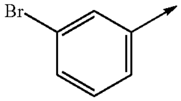
-continued
Q-2.10
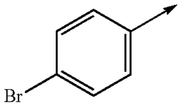
Q-2.11
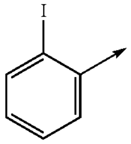
Q-2.12
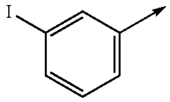
Q-2.13
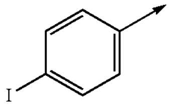
Q-2.14
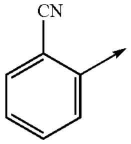
Q-2.15
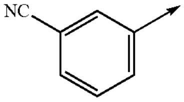
Q-2.16
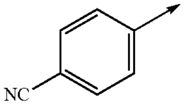
Q-2.17
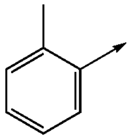
Q-2.18
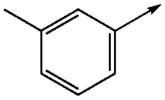
Q-2.19
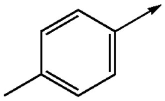
Q-2.20
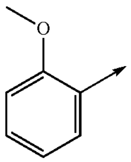
Q-2.21
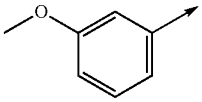

-continued
Q-2.22
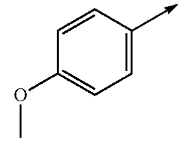
Q-2.23
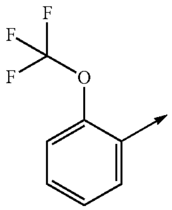
Q-2.24
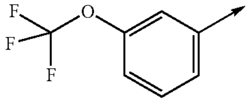
Q-2.25
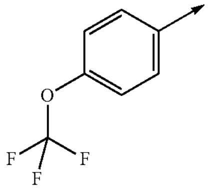
Q-2.26
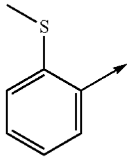
Q-2.27
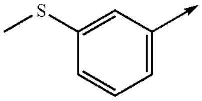
Q-2.28
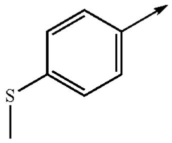
Q-2.29
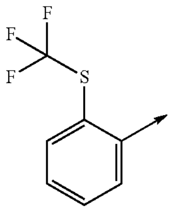
Q-2.30
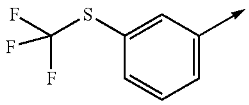
-continued
Q-2.31
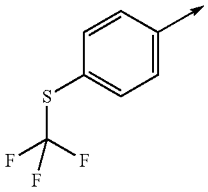
Q-2.32
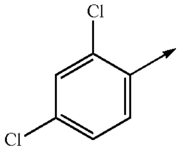
Q-2.33
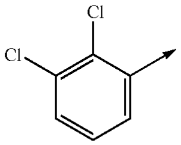
Q-2.34
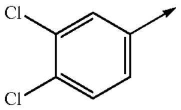
Q-2.35
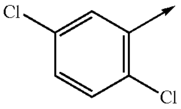
Q-2.36
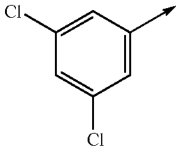
Q-2.37
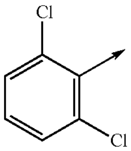
Q-2.38
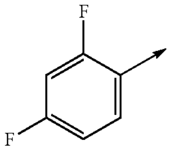
Q-2.39
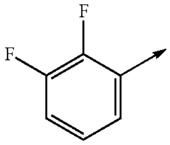
Q-2.40
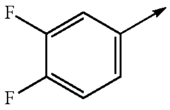

-continued

Q-2.41

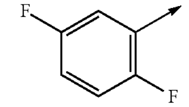

Q-2.42

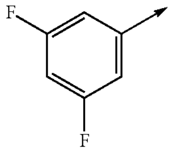

Q-2.43

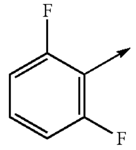

Q-2.44

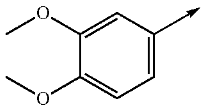

Q-2.45

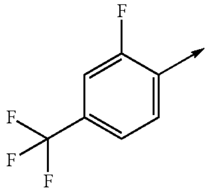

Q-2.46

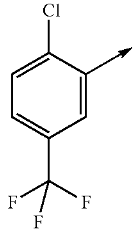

Q-2.47

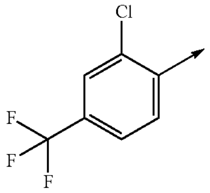

Q-2.48

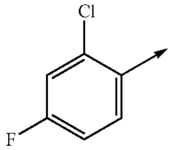

Q-2.49

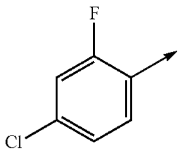

-continued

Q-2.50

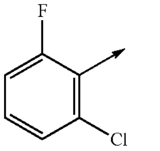

Q-2.51

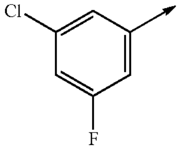

Q-2.52

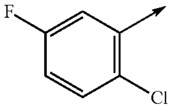

Q-2.53

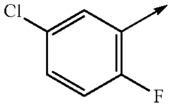

$R^3$ is hydrogen, and $R^4$ is hydrogen, methyl, ethyl, n-propyl, i-propyl, n-butyl, n-pentyl, phenyl, benzyl, $CH_2$(4-Cl-Ph), $CH_2$(4-F-Ph), $CH_2$(4-OMe-Ph), 2-methoxyethyl, tetrahydrofuran-2-yl-methyl, tetrahydrofuran-3-ylmethyl, tetrahydropyran-2-ylmethyl, tetrahydropyran-3-ylmethyl, tetrahydropyran-4-ylmethyl, methylpropionate-3-yl, ethylpropionate-3-yl, methylacet-2-yl, ethylacet-2-yl, methylpivalate-2-yl, ethylpivalate-3-yl, methyl-2-methylpropanoate-3-yl, methyl-2,2-dimethylpropanoate-3-yl, ethyl-2-methylpropanoate-3-yl, methyl-2-propanoate-2-yl, ethyl-2-propanoate-2-yl, methylacetate-2-yl, ethylacetate-2-yl, methyl-1-methylcyclopropanecarboxylate-2-yl, ethyl-1-methylcyclopropanecarboxylat-2-yl, 2-(dimethylamino)ethyl, oxetan-3-yl, (3-methyloxetan-3-yl)methyl, 2,2,2-trifluoroethyl, 2,2-difluoroethyl, 2-fluoroethyl, 2,2,3,3,3-pentafluoropropyl, cyclopropylmethyl, 1-cyclopropylethyl, (1-methylcyclopropyl)methyl, (2,2-dichlorocyclopropyl)methyl, (2,2-dimethylcyclopropyl)methyl, allyl, propargyl (prop-2-yn-1-yl), 2-chloroprop-2-en-1-yl, 3-phenylprop-2-yn-1-yl, 3,3-dichloroprop-2-en-1-yl, 3,3-dichloro-2-fluoroprop-2-en-1-yl, methylprop-2-yn-1-yl, 2-methylprop-2-en-1-yl, but-2-en-1-yl, but-3-en-1-yl, but-2-yn-1-yl, but-3-yn-1-yl, 4-chlorobut-2-yn-1-yl, 3-methylbut-2-en-1-yl, 3-methylbut-1-en-1-yl, 1-(2E)-1-methylbut-2-en-1-yl, (E)-pent-3-en-2-yl or (Z)-pent-3-en-2-yl, cyclobutylmethyl, cyclopentylmethyl, cyclohexylmethyl, heptan-2-yl, isobutyl, 1,3-dioxolan-2-ylmethyl or 1-ethyl-5-methyl-1H-pyrazole-4-methyl, and component (B) is selected from the group of active herbicidal ingredients (B1) to (B11) wherein:

(B1) is selected from the group of 1,3-diketo compounds consisting of:

| | |
|---|---|
| (B1.1) | alloxydim, |
| (B1.2) | bicyclopyrone, |
| (B1.3) | butroxydim, |

-continued

| | |
|---|---|
| (B1.4) | clethodim, |
| (B1.5) | cycloxydim, |
| (B1.6) | fenquinotrione, |
| (B1.7) | mesotrione, |
| (B1.8) | pinoxaden, |
| (B1.9) | profoxydim, |
| (B1.10) | sethoxydim, |
| (B1.11) | sulcotrione, |
| (B1.12) | SYP-9121, |
| (B1.13) | tefuryltrione, |
| (B1.14) | tembotrione, |
| (B1.15) | tepraloxydim, |
| (B1.16) | tralkoxydim, |
| (B1.17) | Y13161, and |
| (B1.18) | Y13287; |

(B2) is selected from the group of (sulfon)amides consisting of:

| | |
|---|---|
| (B2.1) | acetochlor, |
| (B2.2) | alachlor, |
| (B2.3) | amidosulfuron, |
| (B2.4) | asulam, |
| (B2.5) | azimsulfuron, |
| (B2.6) | beflubutamid, |
| (B2.7) | bensulfuron, |
| (B2.8) | butachlor, |
| (B2.9) | carbetamide, |
| (B2.10) | chlorimuron, |
| (B2.11) | chlorpropham, |
| (B2.12) | chlorsulfuron, |
| (B2.13) | cinosulfuron, |
| (B2.14) | cloransulam, |
| (B2.15) | cyclosulfamuron, |
| (B2.16) | desmedipham, |
| (B2.17) | diclosulam, |
| (B2.18) | diflufenican, |
| (B2.19) | dimethachlor, |
| (B2.20) | dimethenamid, |
| (B2.21) | esprocarb, |
| (B2.22) | ethametsulfuron, |
| (B2.23) | ethoxysulfuron, |
| (B2.24) | flazasulfuron, |
| (B2.25) | florasulam, |
| (B2.26) | flucarbazone, |
| (B2.27) | flucetosulfuron, |
| (B2.28) | flufenacet, |
| (B2.29) | flumetsulam, |
| (B2.30) | flupyrsulfuron, |
| (B2.31) | foramsulfuron, |
| (B2.32) | halosulfuron, |
| (B2.33) | imazosulfuron, |
| (B2.34) | iodosulfuron, |
| (B2.35) | ipfencarbazone, |
| (B2.36) | mefenacet, |
| (B2.38) | metazachlor, |
| (B2.39) | metazosulfuron, |
| (B2.40) | metolachlor, |
| (B2.41) | metosulam, |
| (B2.42) | metsulfuron, |
| (B2.43) | nicosulfuron, |
| (B2.44) | orthosulfamuron, |
| (B2.45) | oxasulfuron, |
| (B2.46) | penoxsulam, |
| (B2.47) | pethoxamide, |
| (B2.48) | phenmedipham, |
| (B2.49) | picolinafen, |
| (B2.50) | pretilachlor, |
| (B2.51) | primisulfuron, |
| (B2.52) | propachlor, |
| (B2.53) | propanil, |
| (B2.54) | propham, |
| (B2.55) | propisochlor, |
| (B2.56) | propoxycarbazone, |
| (B2.57) | propyrisulfuron, |
| (B2.58) | propyzamide, |
| (B2.59) | prosulfocarb, |

-continued

| | |
|---|---|
| (B2.60) | prosulfuron, |
| (B2.61) | pyrazosulfuron, |
| (B2.62) | pyroxsulam, |
| (B2.63) | rimsulfuron, |
| (B2.64) | S-metolachlor, |
| (B2.65) | sulfometuron, |
| (B2.66) | sulfosulfuron, |
| (B2.67) | thenylchlor, |
| (B2.68) | thiencarbazone, |
| (B2.69) | thifensulfuron, |
| (B2.70) | tri-allate, |
| (B2.71) | triasulfuron, |
| (B2.72) | tribenuron, |
| (B2.73) | trifloxysulfuron, |
| (B2.74) | triflusulfuron, |
| (B2.75) | tritosulfuron, |
| (B2.76) | esprocarb, |
| (B2.77) | profluazole, |
| (B2.78) | tri-allate, |
| (B2.79) | methyl rel-(2R,4R)-4-[[3-(3,5-dichlorophenyl)-5-methoxy-4H-isoxazole-5-carbonyl]amino]tetrahydrofuran-2-carboxylate, |
| (B2.80) | methyl rel-(2R,4R)-4-[[3-(3,5-dichlorophenyl)-5-vinyl-4H-isoxazole-5-carbonyl]amino]tetrahydrofuran-2-carboxylate, |
| (B2.81) | methyl (2R*,4R*)-4-[[(5S)-3-(3,5-difluorophenyl)-5-vinyl-4H-isoxazole-5-carbonyl]amino]tetrahydrofuran-2-carboxylate, |
| (B2.82) | isopropyl rel-(2R,4R)-4-[[3-(3-fluorophenyl)-5-methyl-4H-isoxazole-5-carbonyl]amino]tetrahydrofuran-2-carboxylate, |
| (B2.83) | methyl (3R)-3-[[(5S)-3-(3,5-difluorophenyl)-5-vinyl-4H-isoxazole-5-carbonyl]amino]-2,3-dihydrofuran-5-carboxylate, |
| (B2.84) | methyl (3R)-3-[[(5R)-3-(3,5-difluorophenyl)-5-methyl-4H-isoxazole-5-carbonyl]amino]-2,3-dihydrofuran-5-carboxylate, |
| (B2.85) | methyl (1S,4R)-4-[[[(5S)-3-(3,5-difluorophenyl)-5-vinyl-4H-1,2-oxazol-5-yl]carbonyl]amino]cyclopent-2-ene-1-carboxylate, |
| (B2.86) | ethyl (1S,4R)-4-[[[3-(3,5-difluorophenyl)-5-methoxy-4H-1,2-oxazol-5-yl]carbonyl]amino]cyclopent-2-ene-1-carboxylate, |
| (B2.87) | 2-methoxyethyl (1S,4R)-4-[[[(5R)-3-(3-cyano-5-fluorophenyl)-5-(trifluoromethyl)-4H-1,2-oxazol-5-y1]carbonyl]amino]cyclopent-2-ene-1-carboxylate, |
| (B2.88) | methyl (4S)-4-[[[3-(3,5-difluorophenyl)-5-methyl-4H-1,2-oxazol-5-yl]carbonyl]amino]cyclopentene-1-carboxylate, |
| (B2.89) | methyl (3S)-3-[[[(5R)-3-(3,5-difluorophenyl)-5-methyl-4H-1,2-oxazol-5-yl]carbonyl]amino]cyclopentene-1-carboxylate, |
| (B2.90) | 3-(3,5-difluorophenyl)-N-[(1R,4S)-4-(oxazinan-2-ylcarbonyl)cyclopent-2-en-1-y1]-5-(trifluoromethyl)-4H-1,2-oxazole-5-carboxamide, |
| (B2.91) | 3-(3,5-difluorophenyl)-N-[(1R,4S)-4-[(propylsulfonylamino)carbonyl]cyclopent-2-en-1-y1]-5-(trifluoromethyl)-4H-1,2-oxazole-5-carboxamide, and |
| (B2.92) | (1S,4R)-4-[[(5R)-3-(3,5-difluorophenyl)-5-methyl-4H-isoxazole-5-carbonyl]amino]cyclopent-2-ene-1-carboxylic acid, |

(B3) is selected from the group of aryl nitriles consisting of:

| | |
|---|---|
| (B3.1) | bromoxynil, |
| (B3.2) | chlorthiamid, |
| (B3.3) | dichlobenil, |
| (B3.4) | ioxynil, and |
| (B3.5) | pyraclonil; |

(B4) is selected from the group of azoles consisting of:

| | |
|---|---|
| (B4.1) | amicarbazone, |
| (B4.2) | amitrole, |
| (B4.3) | azafenidin, |
| (B4.4) | benzofenap, |
| (B4.5) | benzuofucaotong, |
| (B4.6) | biscarfentrazone, |
| (B4.7) | cafenstrole, |
| (B4.8) | carfentrazone, |
| (B4.9) | fentrazamide, |
| (B4.10) | imazamethabenz, |
| (B4.11) | imazamox, |
| (B4.12) | imazapic, |
| (B4.13) | imazapyr, |
| (B4.14) | imazaquin, |
| (B4.15) | imazethapyr, |
| (B4.16) | isouron, |
| (B4.17) | isoxaben, |
| (B4.18) | isoxaflutole, |
| (B4.19) | oxadiargyl, |
| (B4.20) | oxadiazon, |
| (B4.21) | pyraflufen, |
| (B4.22) | pyrasulfotole, |
| (B4.23) | pyrazolynate, |
| (B4.24) | pyrazoxyfen, |
| (B4.25) | pyroxasulfone, |
| (B4.26) | sulfentrazone, |
| (B4.27) | tolpyralate, |
| (B4.28) | topramezone, |
| (B4.29) | triazolesulcotrione, |
| (B4.30) | QYM-201, |
| (B4.31) | bencarbazone, |
| (B4.32) | fluazolate, |
| (B4.33) | flupoxam, and |
| (B4.34) | isoxachlortole; |

(B5) is selected from the group of active herbicidal ingredients consisting of:

| | |
|---|---|
| (B5.1) | amino-cyclopyrachlor, |
| (B5.2) | aminopyralid, |
| (B5.3) | benazolin-ethyl, |
| (B5.4) | benfluralin, |
| (B5.5) | bentazone, |
| (B5.6) | benzobicyclon, |
| (B5.8) | bromofenoxim, |
| (B5.9) | butralin, |
| (B5.10) | chloridazon/pyrazon, |
| (B5.11) | chlorthal, |
| (B5.12) | cinidon-ethyl, |
| (B5.13) | cinmethylin, |
| (B5.14) | clomazone, |
| (B5.15) | cyclopyrimorate, |
| (B5.16) | dinitramine, |
| (B5.17) | diquat, |
| (B5.18) | dithiopyr, |
| (B5.19) | acetic acid, |
| (B5.20) | ethalfluralin, |
| (B5.21) | ethofumesate, |
| (B5.22) | flamprop, |
| (B5.23) | florpyrauxifen, |
| (B5.24) | flufenpyr, |
| (B5.25) | flumiclorac, |
| (B5.26) | flumioxazin, |
| (B5.27) | fluridone, |
| (B5.28) | flurochloridone, |
| (B5.29) | flurtamone, |
| (B5.30) | fluthiacet-methyl, |
| (B5.31) | halauxifen, |
| (B5.32) | indanofan, |
| (B5.33) | norflurazon, |
| (B5.34) | oleic acid, |
| (B5.35) | oryzalin, |
| (B5.36) | oxaziclomefone, |
| (B5.37) | paraquat, |

-continued

| | |
|---|---|
| (B5.38) | pelargonic acid, |
| (B5.39) | pendimethalin, |
| (B5.40) | pentoxazone, |
| (B5.41) | pyridafol, |
| (B5.42) | pyridate, |
| (B5.43) | tetflupyrolimet, |
| (B5.44) | thiazopyr, |
| (B5.45) | triafamone, |
| (B5.46) | trifluralin, |
| (B5.47) | 4-amino-3-chloro-5-fluoro-6-(7-fluoro-1H-indol-6-yl)pyridine-2-carboxylic acid, |
| (B5.48) | cyclopyrimorate, |
| (B5.49) | diquat, |
| (B5.50) | oxaziclomefone, |
| (B5.51) | pentanochlor, |
| (B5.52) | tebutam, |
| (B5.53) | thidiazimin, and |
| (B5.54) | 4-hydroxy-1-methyl-3-[4-(trifluoromethyl)-2-pyridinyl]-2-imidazolidinone; |

(B6) is selected from the group of (het) arylcarboxylic acids consisting of:

| | |
|---|---|
| (B6.1) | chloramben, |
| (B6.2) | clopyralid, |
| (B6.3) | dicamba, |
| (B6.4) | fluroxypyr, |
| (B6.5) | picloram, |
| (B6.6) | quinclorac, |
| (B6.7) | quinmerac, |
| (B6.8) | TBA, and |
| (B6.9) | triclopyr; |

(B7) is selected from the group of organic phosphorus compounds consisting of:

| | |
|---|---|
| (B7.1) | anilofos, |
| (B7.2) | bialaphos, |
| (B7.3) | butamifos, |
| (B7.4) | glufosinate, |
| (B7.5) | glyphosate, |
| (B7.6) | piperophos, |
| (B7.7) | sulfosate, and |
| (B7.8) | amiprofos; |

(B8) is selected from the group of phenyl ethers consisting of:

| | |
|---|---|
| (B8.1) | 2,4-D, |
| (B8.2) | 2,4-DB, |
| (B8.3) | 2,4-DP, |
| (B8.4) | acifluorfen, |
| (B8.5) | aclonifen, |
| (B8.6) | bifenox, |
| (B8.7) | chlomethoxyfen, |
| (B8.8) | clodinafop-propargyl, |
| (B8.9) | clomeprop, |
| (B8.10) | cyhalofop, |
| (B8.11) | diclofop, |
| (B8.12) | ethoxyfen, |
| (B8.13) | fenoxaprop, |
| (B8.14) | fluazifop, |
| (B8.15) | fluoroglycofen, |
| (B8.16) | fomesafen, |
| (B8.18) | haloxyfop, |
| (B8.19) | lactofen, |

-continued

| | |
|---|---|
| (B8.20) | MCPA, |
| (B8.21) | MCPB, |
| (B8.22) | mecoprop, |
| (B8.23) | metamifop, |
| (B8.24) | oxyfluorfen, |
| (B8.25) | propaquizafop, |
| (B8.26) | quizalofop, |
| (B8.27) | quizalofop-p, and |
| (B8.28) | benzfendizone; |

(B9) is selected from the group of pyrimidines consisting of:

| | |
|---|---|
| (B9.1) | bispyrac-sodium, |
| (B9.2) | bromacil, |
| (B9.3) | butafenacil, |
| (B9.4) | lenacil, |
| (B9.5) | pyribenzoxim, |
| (B9.6) | pyriftalid, |
| (B9.7) | pyriminobac, |
| (B9.8) | pyrimisulfan, |
| (B9.9) | pyrithiobac-sodium, |
| (B9.10) | saflufenacil, |
| (B9.11) | terbacil, |
| (B9.12) | tiafenacil, |
| (B9.13) | trifludimoxazin, and |
| (B9.14) | ethyl [3-[2-chloro-4-fluoro-5-(1-methyl-6-trifluoromethyl-2,4-dioxo-1,2,3,4-tetrahydropyrimidin-3-yl)phenoxy]-2-pyridyloxylacetate; |

(B10) is selected from the group of (thio) ureas consisting of:

| | |
|---|---|
| (B10.1) | chlorobromuron, |
| (B10.2) | chlorotoluron, |
| (B10.3) | daimuron, |
| (B10.4) | dimefuron, |
| (B10.5) | diuron, |
| (B10.6) | diflufenzopyr, |
| (B10.7) | fluometuron, |
| (B10.8) | isoproturon, |
| (B10.9) | linuron, |
| (B10.10) | methabenzthiazuron, |
| (B10.11) | metobromuron, |
| (B10.12) | metoxuron, |
| (B10.13) | monolinuron, |
| (B10.14) | neburon, |
| (B10.15) | siduron, |
| (B10.16) | tebuthiuron, |
| (B10.17) | fenuron, |
| (B10.18) | chloroxuron, |
| (B10.19) | diflufenzopyr, and |
| (B10.20) | ethidimuron; |

(B11) is selected from the group of triazines consisting of:

| | |
|---|---|
| (B11.1) | ametryne, |
| (B11.2) | atrazine, |
| (B11.3) | cyanazine, |
| (B11.4) | dimethametryn, |
| (B11.5) | hexazinone, |
| (B11.6) | indaziflam, |
| (B11.7) | metamitron, |
| (B11.8) | metribuzin, |
| (B11.9) | prometon, |
| (B11.10) | prometryne, |
| (B11.11) | propazine, |
| (B11.12) | simazine, |
| (B11.13) | simetryne, |
| (B11.14) | terbumeton, |
| (B11.15) | terbuthylazine, |
| (B11.16) | terbutryne, |
| (B11.17) | triaziflam, |
| (B11.18) | trietazine, and |
| (B11.19) | desmetryne. |

2. The safener/herbicide composition as claimed in claim 1, wherein component (A) comprises one or more compounds A1-A6 of the general formula (I):

A1 methyl {[1,5-bis(4-chloro-2-fluorophenyl)-1H-1,2,4-triazol-3-yl]oxy}acetate,

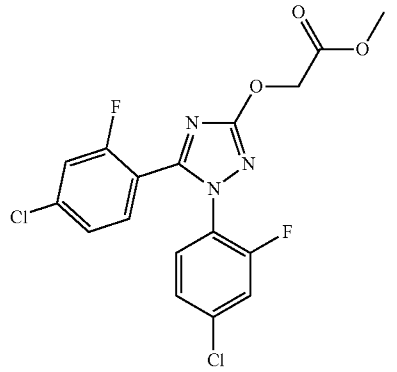 [SMILES: COC(=O)COc1nc(-c2ccc(Cl)cc2F)n(-c2ccc(Cl)cc2F)n1]

A2 {[1,5-bis(4-chloro-2-fluorophenyl)-1H-1,2,4-triazol-3-yl]oxy}acetic acid,

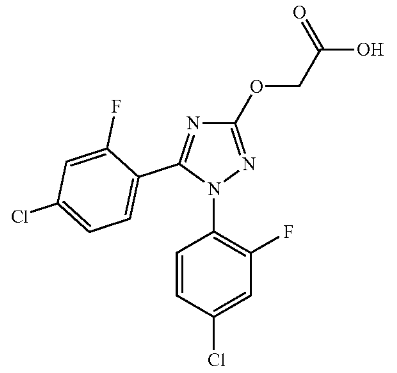

A3 methyl {[5-(4-chloro-2-fluorophenyl)-1-(2,4-difluorophenyl)-1H-1,2,4-triazol-3-yl]oxy}acetate,

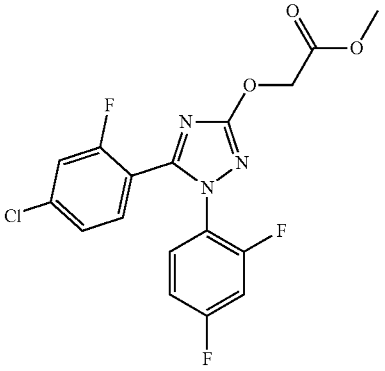

A4 {[5-(4-chloro-2-fluorophenyl)-1-(2,4-difluorophenyl)-1H-1,2,4-triazol-3-yl]oxy}acetic acid,

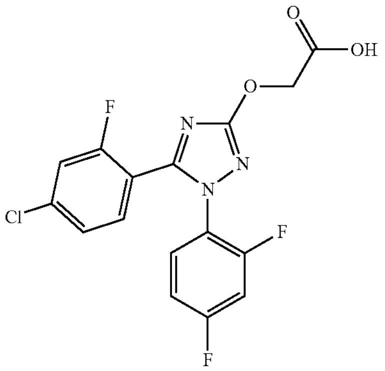 [SMILES: O=C(O)COc1nc(-c2ccc(Cl)cc2F)n(-c2ccc(F)cc2F)n1]

A5 methyl {[1-(4-chloro-2-fluorophenyl)-5-(2,4-difluorophenyl)-1H-1,2,4-triazol-3-yl]oxy}acetate, and

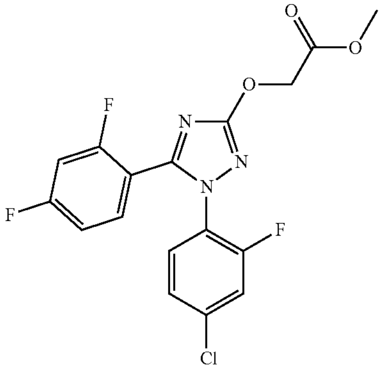 [SMILES: COC(=O)COc1nc(-c2ccc(F)cc2F)n(-c2ccc(Cl)cc2F)n1]

A6 {[1-(4-chloro-2-fluorophenyl)-5-(2,4-difluorophenyl)-1H-1,2,4-triazol-3-yl]oxy}acetic acid

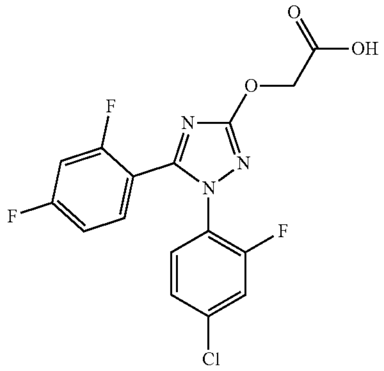

3. The safener/herbicide composition as claimed in claim 1, wherein component (B) comprises one or more of the following active ingredients:

| | |
|---|---|
| (B1.2) | bicyclopyrone, |
| (B1.4) | clethodim, |
| (B1.8) | pinoxaden |
| (B2.18) | diflufenican, |
| (B2.28) | flufenacet, |
| (B2.34) | iodosulfuron, |
| (B2.38) | metazachlor, |
| (B2.68) | thiencarbazone, |
| (B2.81) | methyl (2R*,4R*)-4-[[(5S)-3-(3,5-difluorophenyl)-5-vinyl-4H-isoxazole-5-carbonyl]amino]tetrahydrofuran-2-carboxylate, |
| (B2.85) | methyl (1S,4R)-4-[[[(5S)-3-(3,5-difluorophenyl)-5-vinyl-4H-1,2-oxazol-5-yl]carbonyl]amino]cyclopent-2-ene-1-carboxylate, |
| (B2.92) | (1S,4R)-4-[[(5R)-3-(3,5-difluorophenyl)-5-methyl-4H-isoxazole-5-carbonyl]amino]cyclopent-2-ene-1-carboxylic acid, |
| (B3.1) | bromoxynil, |
| (B4.21) | pyraflufen, |
| (B4.22) | pyrasulfotole, |
| (B4.25) | pyroxasulfone, |
| (B4.26) | sulfentrazone, |
| (B4.28) | topramezone, |
| (B5.13) | cinmethylin, |
| (B5.21) | ethofumesate, |
| (B5.26) | flumioxazin, |
| (B5.31) | halauxifen, |
| (B5.46) | trifluralin, |
| (B6.3) | dicamba, |
| (B6.4) | fluroxypyr, |
| (B6.5) | picloram, |
| (B7.5) | glyphosate, |
| (B8.1) | 2,4-D, |
| (B8.5) | aclonifen, |
| (B8.6) | bifenox, |
| (B8.13) | fenoxaprop, |
| (B8.20) | MCPA, |
| (B8.27) | quizalofop-p, |
| (B9.10) | saflufenacil, |
| (B9.12) | tiafenacil, |
| (B9.13) | trifludimoxazin, |
| (B10.2) | chlorotoluron, |
| (B10.8) | Isoproturon, and |
| (B11.8) | metribuzin. |

4. The safener/herbicide composition as claimed in claim 2, wherein (i) component (A) is compound A1, A3 or A5; and (ii) component (B) is B1.2 (bicyclopyrone), B1.8 (pinoxaden), B2.28 (flufenacet), B2.34 (iodosulfuron), B2.38 (metazachlor), B2.68 (thiencarbazone-methyl), B2.81 (methyl (2R*,4R*)-4-[[(5S)-3-(3,5-difluorophenyl)-5-vinyl-4H-isoxazole-5-carbonyl]amino]tetrahydrofuran-2-carboxylate), B2.85 (methyl (1S,4R)-4-[[[(5S)-3-(3,5-difluorophenyl)-5-vinyl-4H-1,2-oxazol-5-yl]carbonyl]amino]cyclopent-2-ene-1-carboxylate), B2.92 ((1S,4R)-4-[[(5R)-3-(3,5-difluorophenyl)-5-methyl-4H-isoxazole-5-carbonyl]amino]cyclopent-2-ene-1-carboxylic acid), B4.28 (topramezone), B5.13 (cinmethylin), B5.14 (clomazone), B5.21 (ethofumesate), B5.26 (flumioxazin), B6.4 (fluroxypyr), B6.5 (picloram), B7.5 (glyphosate), B8.6 (bifenox), or B9.10 (saflufenacil).

5. The safener/herbicide composition as claimed in claim 1, further comprising one or more crop protection additives.

6. A method of protecting crop plants from phytotoxic side effects of a herbicide (B), characterized in that an effective amount of a safener (A) is applied before, after or simultaneously with the herbicide (B) to the plants, plant parts, plant seeds or cultivation area, where the composition of herbicide (B) and safener (A) is as defined in claim 1.

7. The method as claimed in claim 6, characterized in that the crop plants are cereal plants.

8. The method as claimed in claim 6, characterized in that the herbicides (B) are applied at an application rate of 1 to 4000 g/ha of active substance and in a weight ratio of safener (A)/herbicide (B) of 1:400 to 500:1.

9. A method for control of harmful plants or regulation of plant growth, the method comprising use of the safener/herbicide composition as claimed in claim 1.

* * * * *